(12) United States Patent
Nishida et al.

(10) Patent No.: US 9,132,347 B2
(45) Date of Patent: *Sep. 15, 2015

(54) GAME SYSTEM, GAME APPARATUS, STORAGE MEDIUM HAVING GAME PROGRAM STORED THEREIN, AND GAME PROCESS METHOD

(75) Inventors: Kenichi Nishida, Kyoto (JP); Takayuki Shimamura, Kyoto (JP); Yoshikazu Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/212,648

(22) Filed: Aug. 18, 2011

(65) Prior Publication Data

US 2012/0052952 A1 Mar. 1, 2012

(30) Foreign Application Priority Data

Aug. 30, 2010 (JP) .................. 2010-192220
May 30, 2011 (JP) .................. 2011-120681

(51) Int. Cl.
*A63F 13/00* (2014.01)
*A63F 13/40* (2014.01)
*A63F 13/20* (2014.01)

(52) U.S. Cl.
CPC ............. *A63F 13/10* (2013.01); *A63F 13/06* (2013.01); *A63F 2300/105* (2013.01);
(Continued)

(58) Field of Classification Search
CPC ............ A63F 2300/00; A63F 2300/10; A63F 2300/1075; A63F 2300/20; A63F 2300/203; A63F 2300/204; A63F 2300/53; A63F 2300/60
USPC .......................................... 463/31
See application file for complete search history.

(56) References Cited

U.S. PATENT DOCUMENTS 4,210,329 A 7/1980 Steiger et al.
5,009,501 A 4/1991 Fenner et al.
(Continued)

FOREIGN PATENT DOCUMENTS

CN 1593709 3/2005
CN 1868244 11/2006
(Continued)

OTHER PUBLICATIONS

Apple Support, "iPhone—Technical Specifications", http://support.apple.com/kb/SP2, 2010. 3 pages.
(Continued)

*Primary Examiner* — Damon Pierce
*Assistant Examiner* — Jeffrey Wong
(74) *Attorney, Agent, or Firm* — Nixon & Vanderhye, P.C.

(57) ABSTRACT

An example game system includes a game apparatus, an operating device, and a hand-held device. The game apparatus receives first operation data from the operating device and second operation data from the hand-held device, and performs a predetermined game control process. Furthermore, the game apparatus generates a first game image of a virtual game space representing a result of the game control process, based on a first virtual camera, and the game apparatus also generates a second game image based on a second virtual camera. The first game image is outputted to a first display device provided independently of the hand-held device. The second game image is outputted to a second display device of the hand-held device. Moreover, the game apparatus performs as the game control process a process for controlling a position of the second virtual camera based on the first operation data and an attitude of the second virtual camera based on the second operation data.

19 Claims, 23 Drawing Sheets

(52) U.S. Cl.
CPC .. *A63F 2300/1006* (2013.01); *A63F 2300/301* (2013.01); *A63F 2300/403* (2013.01); *A63F 2300/6669* (2013.01); *A63F 2300/8017* (2013.01); *A63F 2300/8088* (2013.01)

(56) References Cited

U.S. PATENT DOCUMENTS

| | | | |
|---|---|---|---|
| 5,440,326 A | 8/1995 | Quinn |
| 5,452,104 A | 9/1995 | Lee |
| 5,602,566 A | 2/1997 | Motosyuku et al. |
| 5,608,449 A | 3/1997 | Swafford, Jr. et al. |
| 5,619,397 A | 4/1997 | Honda et al. |
| 5,820,462 A | 10/1998 | Yokoi et al. |
| 5,825,350 A | 10/1998 | Case, Jr. et al. |
| 5,825,352 A | 10/1998 | Bisset et al. |
| D411,530 S | 6/1999 | Carter et al. |
| 5,943,043 A | 8/1999 | Furuhata et al. |
| 6,020,891 A | 2/2000 | Rekimoto |
| 6,069,790 A | 5/2000 | Howell et al. |
| 6,084,584 A | 7/2000 | Nahi et al. |
| 6,084,594 A | 7/2000 | Goto |
| 6,104,380 A | 8/2000 | Stork et al. |
| 6,126,547 A | 10/2000 | Ishimoto |
| 6,164,808 A | 12/2000 | Shibata et al. |
| 6,183,365 B1 | 2/2001 | Tonomura et al. |
| 6,201,554 B1 | 3/2001 | Lands |
| 6,208,329 B1 | 3/2001 | Ballare |
| 6,238,291 B1 | 5/2001 | Fujimoto et al. |
| 6,252,153 B1 | 6/2001 | Toyama |
| 6,254,481 B1 | 7/2001 | Jaffe |
| 6,323,846 B1 | 11/2001 | Westerman et al. |
| 6,340,957 B1 | 1/2002 | Adler et al. |
| 6,347,290 B1 | 2/2002 | Bartlett |
| 6,379,249 B1 | 4/2002 | Satsukawa et al. |
| 6,396,480 B1 | 5/2002 | Schindler et al. |
| 6,400,376 B1 | 6/2002 | Singh et al. |
| 6,411,275 B1 | 6/2002 | Hedberg |
| 6,425,822 B1 | 7/2002 | Hayashida et al. |
| 6,466,198 B1 | 10/2002 | Feinstein |
| 6,466,831 B1 | 10/2002 | Shibata et al. |
| 6,498,860 B1 | 12/2002 | Sasaki et al. |
| 6,500,070 B1 | 12/2002 | Tomizawa et al. |
| 6,509,896 B1 | 1/2003 | Saikawa et al. |
| 6,538,636 B1 | 3/2003 | Harrison |
| 6,540,610 B2 | 4/2003 | Chatani |
| 6,540,614 B1 | 4/2003 | Nishino et al. |
| 6,557,001 B1 | 4/2003 | Dvir et al. |
| 6,567,068 B2 | 5/2003 | Rekimoto |
| 6,567,101 B1 | 5/2003 | Thomas |
| 6,567,984 B1 | 5/2003 | Allport |
| 6,570,557 B1 | 5/2003 | Westerman et al. |
| 6,582,299 B1 | 6/2003 | Matsuyama et al. |
| 6,657,627 B1 | 12/2003 | Wada et al. |
| 6,690,358 B2 | 2/2004 | Kaplan |
| 6,716,103 B1 | 4/2004 | Eck et al. |
| 6,798,429 B2 | 9/2004 | Bradski |
| 6,834,249 B2 | 12/2004 | Orchard |
| 6,847,351 B2 | 1/2005 | Noguera |
| 6,856,259 B1 | 2/2005 | Sharp |
| 6,888,536 B2 | 5/2005 | Westerman et al. |
| 6,897,833 B1 | 5/2005 | Robinson et al. |
| 6,908,386 B2 | 6/2005 | Suzuki et al. |
| 6,921,336 B1 | 7/2005 | Best |
| 6,930,661 B2 | 8/2005 | Uchida et al. |
| 6,933,923 B2 | 8/2005 | Feinstein |
| 6,939,231 B2 | 9/2005 | Mantyjarvi et al. |
| 6,954,491 B1 | 10/2005 | Kim et al. |
| 6,966,837 B1 | 11/2005 | Best |
| 6,988,097 B2 | 1/2006 | Shirota |
| 6,990,639 B2 | 1/2006 | Wilson |
| 6,993,451 B2 | 1/2006 | Chang et al. |
| 7,007,242 B2 | 2/2006 | Suomela et al. |
| D519,118 S | 4/2006 | Woodward |
| 7,023,427 B2 | 4/2006 | Kraus et al. |
| 7,030,856 B2 | 4/2006 | Dawson et al. |
| 7,030,861 B1 | 4/2006 | Westerman et al. |
| 7,038,662 B2 | 5/2006 | Noguera |
| 7,053,887 B2 | 5/2006 | Kraus et al. |
| 7,068,294 B2 | 6/2006 | Kidney et al. |
| 7,088,342 B2 | 8/2006 | Rekimoto et al. |
| 7,109,978 B2 | 9/2006 | Gillespie et al. |
| 7,115,031 B2 | 10/2006 | Miyamoto et al. |
| 7,128,648 B2 | 10/2006 | Watanabe |
| 7,140,962 B2 | 11/2006 | Okuda et al. |
| 7,142,191 B2 | 11/2006 | Idesawa et al. |
| 7,158,123 B2 | 1/2007 | Myers et al. |
| 7,173,604 B2 | 2/2007 | Marvit et al. |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,184,020 B2 | 2/2007 | Matsui |
| 7,225,101 B2 | 5/2007 | Usuda et al. |
| 7,233,316 B2 | 6/2007 | Smith et al. |
| 7,254,775 B2 | 8/2007 | Geaghan et al. |
| 7,256,767 B2 | 8/2007 | Wong et al. |
| 7,271,795 B2 | 9/2007 | Bradski |
| 7,275,994 B2 | 10/2007 | Eck et al. |
| 7,280,096 B2 | 10/2007 | Marvit et al. |
| 7,285,051 B2 | 10/2007 | Eguchi et al. |
| 7,289,102 B2 | 10/2007 | Hinckley et al. |
| 7,295,191 B2 | 11/2007 | Kraus et al. |
| 7,301,526 B2 | 11/2007 | Marvit et al. |
| 7,301,527 B2 | 11/2007 | Marvit |
| 7,301,529 B2 | 11/2007 | Marvit et al. |
| 7,321,342 B2 | 1/2008 | Nagae |
| 7,333,087 B2 | 2/2008 | Soh et al. |
| RE40,153 E | 3/2008 | Westerman et al. |
| 7,339,580 B2 | 3/2008 | Westerman et al. |
| 7,352,358 B2 | 4/2008 | Zalewski et al. |
| 7,352,359 B2 | 4/2008 | Zalewski et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| D568,882 S | 5/2008 | Ashida et al. |
| 7,376,388 B2 | 5/2008 | Ortiz et al. |
| 7,389,591 B2 | 6/2008 | Jaiswal et al. |
| 7,391,409 B2 | 6/2008 | Zalewski et al. |
| 7,403,220 B2 | 7/2008 | MacIntosh et al. |
| 7,431,216 B2 | 10/2008 | Weinans |
| 7,446,731 B2 | 11/2008 | Yoon |
| 7,461,356 B2 | 12/2008 | Mitsutake |
| 7,479,948 B2 | 1/2009 | Kim et al. |
| 7,479,949 B2 | 1/2009 | Jobs et al. |
| 7,510,477 B2 | 3/2009 | Argentar |
| 7,518,503 B2 | 4/2009 | Peele |
| 7,519,468 B2 | 4/2009 | Orr et al. |
| 7,522,151 B2 | 4/2009 | Arakawa et al. |
| 7,540,011 B2 | 5/2009 | Wixson et al. |
| 7,552,403 B2 | 6/2009 | Wilson |
| 7,570,275 B2 | 8/2009 | Idesawa et al. |
| D599,352 S | 9/2009 | Takamoto et al. |
| 7,607,111 B2 | 10/2009 | Vaananen et al. |
| 7,614,008 B2 | 11/2009 | Ording |
| 7,619,618 B2 | 11/2009 | Westerman et al. |
| 7,626,598 B2 | 12/2009 | Manchester |
| 7,647,614 B2 | 1/2010 | Krikorian et al. |
| 7,656,394 B2 | 2/2010 | Westerman et al. |
| 7,663,607 B2 | 2/2010 | Hotelling et al. |
| 7,667,707 B1 | 2/2010 | Margulis |
| 7,692,628 B2 | 4/2010 | Smith et al. |
| 7,696,980 B1 | 4/2010 | Piot et al. |
| 7,699,704 B2 | 4/2010 | Suzuki et al. |
| 7,705,830 B2 | 4/2010 | Westerman et al. |
| 7,710,396 B2 | 5/2010 | Smith et al. |
| 7,719,523 B2 | 5/2010 | Hillis |
| 7,721,231 B2 | 5/2010 | Wilson |
| 7,730,402 B2 | 6/2010 | Song |
| 7,736,230 B2 | 6/2010 | Argentar |
| 7,762,891 B2 | 7/2010 | Miyamoto et al. |
| D620,939 S | 8/2010 | Suetake et al. |
| 7,782,297 B2 | 8/2010 | Zalewski |

(56) References Cited

U.S. PATENT DOCUMENTS

| | | |
|---|---|---|
| 7,791,808 B2 | 9/2010 | French et al. |
| 7,827,698 B2 | 11/2010 | Jaiswal et al. |
| D636,773 S | 4/2011 | Lin |
| 7,934,995 B2 | 5/2011 | Suzuki |
| D641,022 S | 7/2011 | Dodo et al. |
| 8,038,533 B2 | 10/2011 | Tsuchiyama et al. |
| 8,105,169 B2 | 1/2012 | Ogasawara et al. |
| D666,250 S | 8/2012 | Fulghum et al. |
| 8,246,460 B2 | 8/2012 | Kitahara |
| 8,256,730 B2 | 9/2012 | Tseng |
| 8,306,768 B2 | 11/2012 | Yamada et al. |
| 8,317,615 B2 | 11/2012 | Takeda et al. |
| 8,337,308 B2 | 12/2012 | Ito et al. |
| 8,339,364 B2 | 12/2012 | Takeda et al. |
| 8,529,352 B2 | 9/2013 | Mae et al. |
| 8,567,599 B2 | 10/2013 | Beatty et al. |
| 8,613,672 B2 | 12/2013 | Mae et al. |
| 8,684,842 B2 | 4/2014 | Takeda et al. |
| 8,690,675 B2 | 4/2014 | Ito et al. |
| 8,702,514 B2 | 4/2014 | Ashida et al. |
| 8,804,326 B2 | 8/2014 | Ashida et al. |
| 8,814,680 B2 | 8/2014 | Ashida et al. |
| 8,814,686 B2 | 8/2014 | Takeda et al. |
| 8,827,818 B2 | 9/2014 | Ashida et al. |
| 8,845,426 B2 | 9/2014 | Ohta et al. |
| 8,896,534 B2 | 11/2014 | Takeda et al. |
| 8,913,009 B2 | 12/2014 | Takeda et al. |
| 8,956,209 B2 | 2/2015 | Nishida et al. |
| 8,961,305 B2 | 2/2015 | Takeda et al. |
| 2001/0019363 A1 | 9/2001 | Katta et al. |
| 2002/0103026 A1 | 8/2002 | Himoto et al. |
| 2002/0103610 A1 | 8/2002 | Bachmann et al. |
| 2002/0107071 A1 | 8/2002 | Himoto et al. |
| 2002/0165028 A1 | 11/2002 | Miyamoto et al. |
| 2003/0027517 A1 | 2/2003 | Callway et al. |
| 2003/0207704 A1 | 11/2003 | Takahashi et al. |
| 2003/0216179 A1 | 11/2003 | Suzuki et al. |
| 2004/0023719 A1 | 2/2004 | Hussaini et al. |
| 2004/0092309 A1 | 5/2004 | Suzuki |
| 2004/0229687 A1 | 11/2004 | Miyamoto et al. |
| 2004/0266529 A1 | 12/2004 | Chatani |
| 2005/0176502 A1 | 8/2005 | Nishimura et al. |
| 2005/0181756 A1 | 8/2005 | Lin |
| 2005/0253806 A1 | 11/2005 | Liberty et al. |
| 2006/0012564 A1 | 1/2006 | Shiozawa et al. |
| 2006/0015808 A1 | 1/2006 | Shiozawa et al. |
| 2006/0015826 A1 | 1/2006 | Shiozawa et al. |
| 2006/0038914 A1 | 2/2006 | Hanada et al. |
| 2006/0077165 A1 | 4/2006 | Jang |
| 2006/0094502 A1 | 5/2006 | Katayama et al. |
| 2006/0174026 A1 | 8/2006 | Robinson et al. |
| 2006/0250764 A1 | 11/2006 | Howarth et al. |
| 2006/0252537 A1 | 11/2006 | Wu |
| 2006/0252541 A1 | 11/2006 | Zalewski et al. |
| 2006/0267928 A1 | 11/2006 | Kawanobe et al. |
| 2007/0021216 A1 | 1/2007 | Guruparan |
| 2007/0049374 A1 | 3/2007 | Ikeda et al. |
| 2007/0060383 A1 | 3/2007 | Dohta |
| 2007/0202956 A1 | 8/2007 | Ogasawara et al. |
| 2007/0252901 A1 | 11/2007 | Yokonuma et al. |
| 2007/0265085 A1 | 11/2007 | Miyamoto et al. |
| 2008/0015017 A1 | 1/2008 | Ashida et al. |
| 2008/0024435 A1 | 1/2008 | Dohta |
| 2008/0030458 A1 | 2/2008 | Helbing et al. |
| 2008/0039202 A1 | 2/2008 | Sawano et al. |
| 2008/0100995 A1 | 5/2008 | Ryder et al. |
| 2008/0150911 A1 | 6/2008 | Harrison |
| 2008/0220867 A1 | 9/2008 | Zalewski et al. |
| 2008/0300055 A1 | 12/2008 | Lutnick et al. |
| 2009/0082107 A1 | 3/2009 | Tahara et al. |
| 2009/0143140 A1 | 6/2009 | Kitahara |
| 2009/0183193 A1 | 7/2009 | Miller, IV |
| 2009/0195349 A1 | 8/2009 | Frader-Thompson et al. |
| 2009/0219677 A1 | 9/2009 | Mori et al. |
| 2009/0225159 A1 | 9/2009 | Schneider et al. |
| 2009/0241038 A1 | 9/2009 | Izuno et al. |
| 2009/0254953 A1 | 10/2009 | Lin |
| 2009/0256809 A1 | 10/2009 | Minor |
| 2009/0280910 A1 | 11/2009 | Gagner et al. |
| 2009/0322671 A1 | 12/2009 | Scott et al. |
| 2009/0322679 A1 | 12/2009 | Sato et al. |
| 2010/0007926 A1 | 1/2010 | Imaizumi et al. |
| 2010/0009746 A1 | 1/2010 | Raymond et al. |
| 2010/0009760 A1 | 1/2010 | Shimamura et al. |
| 2010/0045666 A1 | 2/2010 | Kornmann et al. |
| 2010/0083341 A1 | 4/2010 | Gonzalez |
| 2010/0149095 A1 | 6/2010 | Hwang |
| 2010/0156824 A1 | 6/2010 | Paleczny et al. |
| 2011/0021274 A1 | 1/2011 | Sato et al. |
| 2011/0190049 A1 | 8/2011 | Mae et al. |
| 2011/0190050 A1 | 8/2011 | Mae et al. |
| 2011/0190052 A1 | 8/2011 | Takeda et al. |
| 2011/0190061 A1 | 8/2011 | Takeda et al. |
| 2011/0195785 A1 | 8/2011 | Ashida et al. |
| 2011/0228457 A1 | 9/2011 | Moon et al. |
| 2011/0285704 A1 | 11/2011 | Takeda et al. |
| 2011/0287842 A1 | 11/2011 | Yamada et al. |
| 2011/0295553 A1 | 12/2011 | Sato |
| 2012/0001048 A1 | 1/2012 | Takahashi et al. |
| 2012/0015732 A1 | 1/2012 | Takeda et al. |
| 2012/0026166 A1 | 2/2012 | Takeda et al. |
| 2012/0040759 A1 | 2/2012 | Ito et al. |
| 2012/0044177 A1 | 2/2012 | Ohta et al. |
| 2012/0046106 A1 | 2/2012 | Ito et al. |
| 2012/0052952 A1 | 3/2012 | Nishida et al. |
| 2012/0052959 A1 | 3/2012 | Nishida et al. |
| 2012/0062445 A1 | 3/2012 | Haddick et al. |
| 2012/0068927 A1 | 3/2012 | Poston et al. |
| 2012/0086631 A1 | 4/2012 | Osman et al. |
| 2012/0087069 A1 | 4/2012 | Fu et al. |
| 2012/0088580 A1 | 4/2012 | Takeda et al. |
| 2012/0106041 A1 | 5/2012 | Ashida et al. |
| 2012/0106042 A1 | 5/2012 | Ashida et al. |
| 2012/0108329 A1 | 5/2012 | Ashida et al. |
| 2012/0108340 A1 | 5/2012 | Ashida et al. |
| 2012/0119992 A1 | 5/2012 | Nishida et al. |
| 2012/0258796 A1 | 10/2012 | Ohta et al. |
| 2012/0270651 A1 | 10/2012 | Takeda et al. |
| 2013/0063350 A1 | 3/2013 | Takeda et al. |
| 2013/0109477 A1 | 5/2013 | Ito et al. |
| 2014/0295966 A1 | 10/2014 | Ashida et al. |

FOREIGN PATENT DOCUMENTS

| | | |
|---|---|---|
| CN | 202270340 U | 6/2012 |
| CN | 202355827 | 8/2012 |
| CN | 202355828 | 8/2012 |
| CN | 202355829 | 8/2012 |
| EP | 0 710 017 | 5/1996 |
| EP | 0 835 676 | 4/1998 |
| EP | 1 469 382 | 10/2004 |
| EP | 1 723 992 | 11/2006 |
| EP | 2007/128949 | 11/2007 |
| EP | 2 158 947 | 3/2010 |
| FR | 2 932 998 | 1/2010 |
| JP | 09-294260 | 11/1997 |
| JP | 10-341388 | 12/1998 |
| JP | 2000-222185 | 8/2000 |
| JP | 2001-034247 | 2/2001 |
| JP | 2002-248267 | 9/2002 |
| JP | 2004-032548 | 1/2004 |
| JP | 3108313 U | 2/2005 |
| JP | 3703473 | 2/2005 |
| JP | 2005-269399 | 9/2005 |
| JP | 3770499 | 4/2006 |
| JP | 3797608 | 7/2006 |
| JP | 2006-350986 | 12/2006 |
| JP | 2007-061271 | 3/2007 |
| JP | 2007-075353 | 3/2007 |
| JP | 2007-075751 | 3/2007 |
| JP | 2007-289413 | 11/2007 |
| JP | 2008-264402 | 11/2008 |
| JP | 2010-017412 | 1/2009 |
| JP | 2009-178363 | 8/2009 |

(56) References Cited

FOREIGN PATENT DOCUMENTS

| JP | 2009-230753 | 10/2009 | | |
|---|---|---|---|---|
| JP | 2009-247763 | 10/2009 | | |
| JP | 2010-066899 | 3/2010 | | |
| JP | 2010-142561 | 7/2010 | | |
| JP | 4601925 | 12/2010 | | |
| TW | M278452 | 10/2005 | | |
| TW | 419388 | 1/2011 | | |
| WO | 03/007117 | 1/2003 | | |
| WO | 03/083822 | 10/2003 | | |
| WO | 2007/128949 | 11/2007 | | |
| WO | WO 2007128949 A1 | * | 11/2007 | .............. A63F 13/12 |
| WO | 2007-143632 | 12/2007 | | |
| WO | 2008-136064 | 11/2008 | | |
| WO | 2009-038596 | 3/2009 | | |

OTHER PUBLICATIONS

PersonalApplets: "Gyro Tennis App for iPhone 4 and iPod Touch 4th gen" YouTube, Aug. 9, 2010, Hyyp://www.youtube.com/watch?v=c7PRFbqWKIs, 2 pages.
Jhrogersii, "Review: Gyro Tennis for iPhone", iSource, Sep. 17, 2010, http://isource.com/2010/09/17/review-gyro-tennis-for-phone/, 10 pages.
English-language machine translation for JP 2009-178363.
English-language machine translation for JP 2009-247763.
English-language machine translation for JP 09-294260.
English-language machine translation for JP 2004-032548.
English-language machine translation for JP 4601925.
Mae et al., U.S. Appl. No. 13/017,381, filed Jan. 31, 2011.
Mae et al., U.S. Appl. No. 13/017,527, filed Jan. 31, 2011.
Takeda et al., U.S. Appl. No. 13/019,924, filed Feb. 2, 2011.
Takeda et al., U.S. Appl. No. 13/019,928, filed Feb. 2, 2011.
Takeda et al., U.S. Appl. No. 13/145,690, filed Dec. 19, 2011.
Taekda et al., U.S. Appl. No. 13/153,106, filed Jun. 3, 2011.
Ito et al., U.S. Appl. No. 13/198,251, filed Aug. 4, 2011.
Ashida et al., U.S. Appl. No. 13/206,059, filed Aug. 9, 2011.
Ashida et al., U.S. Appl. No. 13/206,767, filed Aug. 10, 2011.
Ashida et al., U.S. Appl. No. 13/206,914, filed Aug. 10, 2011.
Ashida et al., U.S. Appl. No. 13/207,867, filed Aug. 11, 2011.
Ito et al., U.S. Appl. No. 13/208,719, filed Aug. 12, 2011.
Ohta et al., U.S. Appl. No. 13/209,756, filed Aug. 15, 2011.
Nishida et al., U.S. Appl. No. 13/211,679, filed Aug. 17, 2011.
Takeda et al., U.S. Appl. No. 13/244,685, filed Sep. 26, 2011.
Takeda et al., U.S. Appl. No. 13/244,710, filed Sep. 26, 2011.
Ohta et al., U.S. Appl. No. 13/354,000, filed Jan. 19, 2012.
Takeda et al., U.S. Appl. No. 13/541,282, filed Jul. 3, 2012.
IGN Staff, "PS3 Games on PSP?", URL: http://www.ign.com/articles/2006/10/25/ps3-games-on-psp, Publication date printed on article: Oct. 2006.
Marcusita, "What Benefits Can I Get Out of My PSP on My PS3", URL: http://web.archive.org/web/20080824222755/http://forums.afterdawn.com/thread_view.cfm/600615, Publication date printed on article: Dec. 15, 2007.
Rob Aspin et al., "Augmenting the CAVE: An initial study into close focused, inward looking, exploration in IPT systems," 11th IEE International Symposium Distributed Simulation and Real-Time Applications, pp. 217-224 (Oct. 1, 2007).
D. Weidlich et al., "Virtual Reality Approaches for Immersive Design," CIRP Annals, Elsevier BV, NL, CH, FR, vol. 56, No. 1, pp. 139-142 (Jan. 1, 2007).
G.W. Fitzmaurice et al., "Virtual Reality for Palmtop Computers," ACM Transactions on Information Systems, ACM, New York, NY, vol. 11, No. 3, pp. 197-218 (Jul. 1, 1993).
Johan Sanneblad et al., "Ubiquitous graphics," Proceedings of the Working Conference on Advanced Visual Interfaces, AVI '06, pp. 373-377 (Oct. 1, 2006).
Office Action dated Oct. 16, 2012 in Australian Application No. 2011204815.
English-language machine translation for JP 2002-248267.
English-language machine translation for JP 2007-075751.
English-language machine translation for JP 2008-264402.
Apr. 26, 2012 Office Action for U.S. Appl. No. 13/019,928, 18 pages.
Apple Support: "iPhone Technical Specifications", Apple, Aug. 22, 2008, URL:http://support.apple.com/kp/SP495, 2 pages.
May 10, 2012 European Search Report for EP11739553.3, 8 pages.
Sony HMZ-T1 with TrackIR 5 playing PC games! WoW and Skyrim Uploaded by iphwne Nov. 16, 2011 http://www.youtube.com/watch?v=5OLCFMBWT6I.
Sony's New 3D OLED Headset/VR Goggles Uploaded by TheWaffleUniverse Jan. 8, 2011 http://www.youtube.com/watch?v=UoE5ij63EDI.
TrackIR 5—review Uploaded by arnycracker8 Jan. 27, 2011 http://www.youtube.com/watch?v=EXMXvAuBzo4.
Office Action dated Oct. 7, 2013 in U.S. Appl. No. 13/207,867.
Office Action dated Oct. 8, 2013 in U.S. Appl. No. 13/019,924.
Office Action dated Oct. 10, 2013 in U.S. Appl. No. 13/153,106.
Office Action dated Nov. 14, 2013 in U.S. Appl. No. 13/206,767.
Notice of Allowance dated Nov. 27, 2013 in U.S. Appl. No. 13/206,914.
Office Action dated Oct. 15, 2013 in U.S. Appl. No. 13/211,679.
Office Action dated Sep. 24, 2013 in U.S. Appl. No. 13/244,710.
Office Action dated Nov. 8, 2013 in U.S. Appl. No. 13/354,000.
Office Action dated Sep. 13, 2013 in U.S. Appl. No. 13/541,282.
Notice of Allowance dated Nov. 26, 2013 in U.S. Appl. No. 13/687,057.
Kenji Saeki, "Both the appearance and the function are improved! The report on the evolved Nintendo DSi.", [online], Dec. 1, 2008, Impress Watch Co., Ltd. , Game Watch, [searched on Jul. 23, 2014]. Internet <URL: http://game.watch.impress.co.jp1 docs/20081101/dsi1.htm> and partial English-language translation.
English-language machine-translation for JP 2001-034247.
English-language machine-translation for JP 2010-066899.
Takeda et al., U.S. Appl. No. 13/019,924, filed Feb. 2, 2011—response to office action filed 00/19/2014.
Taekda et al., U.S. Appl. No. 13/153,106, filed Jun. 3, 2011—allowed.
Ohta et al., U.S. Appl. No. 13/209,756, filed Aug. 15, 2011—final office action mailed Jul. 8, 2014.
Takeda et al., U.S. Appl. No. 13/244,710, filed Sep. 26, 2011—response to office action filed Sep. 19, 2014.
Ashida et al., U.S. Appl. No. 14/302,248, filed Jun. 11, 2014—non-final office action mailed Sep. 4, 2014.
Xbox 360 Controller, Wikipedia, page as revised on Feb. 2, 2010 (6 pages).
Takeda et al., U.S. Appl. No. 13/019,924, filed Feb. 2, 2011—response to office action filed Feb. 10, 2014.
Taekda et al., U.S. Appl. No. 13/153,106, filed Jun. 3, 2011—final office action filed Feb. 4, 2014.
Ito et al., U.S. Appl. No. 13/198,251, filed Aug. 4, 2011—awaiting USPTO action.
Ashida et al., U.S. Appl. No. 13/206,059, filed Aug. 9, 2011—response to office action filed May 14, 2014.
Ashida et al., U.S. Appl. No. 13/206,767, filed Aug. 10, 2011—allowed.
Ashida et al., U.S. Appl. No. 13/207,867, filed Aug. 11, 2011—allowed.
Ohta et al., U.S. Appl. No. 13/209,756, filed Aug. 15, 2011—response to office action filed Mar. 31, 2014.
Nishida et al., U.S. Appl. No. 13/211,679, filed Aug. 17, 2011—RCE filed Apr. 28, 2014.
Takeda et al., U.S. Appl. No. 13/244,710, filed Sep. 26, 2011—response to office action filed Dec. 24, 2013.
Ohta et al., U.S. Appl. No. 13/354,000, filed Jan. 19, 2012—allowed.
Takeda et al., U.S. Appl. No. 13/541,282, filed Jul. 3, 2012—allowed.
Takeda et al., U.S. Appl. No. 13/672,862, filed Nov. 9, 2012—allowed.
Ascension Technology Corporation, Flock of Birds, Real-Time Motion Tracking, retrieved from Internet on Dec. 30, 2003, www.ascension-tech.com, 3 pages.
English-language machine translation of http://game.watch.impress.co.jp/docs/20081101/dsil.htm, Dec. 1, 2008 [retrieved on Oct. 5, 2014].

(56) References Cited

OTHER PUBLICATIONS

Partial English-language translation of TWM278452 (Oct. 2005).
Nishida et al., U.S. Appl. No. 13/211,679—Notice of Allowance and Fee(s) Due dated Dec. 5, 2014.
Ito et al., U.S. Appl. No. 13/198,251, filed Aug. 4, 2011—response to office action filed Feb. 18, 2015.
Ohta et al., U.S. Appl. No. 13/209,756, filed Aug. 15, 2011—RCE filed Dec. 8, 2014.
Takeda et al., U.S. Appl. No. 13/244,710, filed Sep. 26, 2011—final office action mailed Jan. 14, 2015.
Ashida et al., U.S. Appl. No. 14/302,248, filed Jun. 11, 2014—response to office action filed Mar. 4, 2015.
Takeda et al., U.S. Appl. No. 14/537,654, filed Nov. 10, 2014—awaiting USPTO action.
English-language machine translation of JP 3108313U.
English-language machine translation of JP 2009-230753.
Takeda et al., U.S. Appl. No. 13/244,710, filed Sep. 26, 2011—response to office action filed Apr. 14, 2015.
Ito et al., U.S. Appl. No. 13/198,251, filed Aug. 4, 2011—final office action mailed Apr. 8, 2015.
Mar. 16, 2012 Office Action for U.S. Appl. No. 13/019,924, 14 pages.

* cited by examiner

Fig. 16

| | HAND-HELD DEVICE | SECOND VIRTUAL CAMERA |
|---|---|---|
| REFERENCE ATTITUDE | V1, 9 | v1, 106 |
| RIGHT TURN | V2, 9 | v2, 106 |
| DOWNWARD TURN | V3 | v3, 106 |

GAME SYSTEM, GAME APPARATUS, STORAGE MEDIUM HAVING GAME PROGRAM STORED THEREIN, AND GAME PROCESS METHOD

CROSS REFERENCE TO RELATED APPLICATION

The disclosure of Japanese Patent Application Nos. 2010-192220 and 2011-120681, filed Aug. 30, 2010 and May 30, 2011, respectively, is incorporated herein by reference.

FIELD

This application describes a game system, a game apparatus, a storage medium having a game program stored therein, and a game process method in which a plurality of players are allowed to play a game at the same time.

BACKGROUND AND SUMMARY

Conventionally, there are some technologies for two or more players to play a game. In such a conventional technology, two players manipulate one object in concert with each other. Concretely, there is a technology in which one player operates a driver character and the other player a passenger character, thereby manipulating a mobile character in which the driver character and the passenger character ride.

In the aforementioned technology, the driver character is primarily manipulated, and the manipulation of the passenger character is a secondary game operation. Specifically, the manipulation of the passenger character has less impact on game progression, and the player's manipulation of the passenger character is not sufficiently reflected on game progression. Accordingly, the game might become less enjoyable to the player who manipulates the passenger character.

(1) An example game system comprises a game apparatus, an operating device, and a hand-held device. The game apparatus includes a first reception section, a game process section, a first image generation section, a second image generation section, a first image output section, and a second image output section. The first reception section receives data transmitted from the operating device and the hand-held device. The game process section performs a predetermined game control process. The first image generation section generates a first game image of a virtual game space based on a first virtual camera set in the virtual game space, the virtual game space representing a result of the game control process. The second image generation section generates a second game image of the game space based on a second virtual camera set in the game space. The first image output section outputs the first game image to a first display device provided independently of the hand-held device. The second image output section outputs the second game image to the hand-held device.

In addition, the operating device includes a first operation data output section and a first operation data transmission section. The first operation data output section outputs the first operation data. The first operation data transmission section transmits the first operation data to the game apparatus.

In addition, the hand-held device includes a second operation data output section, a second operation data transmission section, a second reception section, and a display process section. The second operation data output section outputs the second operation data. The second operation data transmission section transmits the second operation data to the game apparatus. The second reception section receives the second game image from the game apparatus. The display process section displays the second game image on a second display device provided in the hand-held device.

In addition, the game process section performs as the game control process a process for controlling a position of the second virtual camera based on the first operation data and an attitude of the second virtual camera based on the second operation data.

The "game apparatus" may be any information processing device that performs a game process, and generates an image based on the game process. Specifically, The game apparatus may be an information processing device exclusively designed for game use, or a multi-purpose information processing device such as a general personal computer.

The "operating device" may be any device capable of transmitting operation data (first operation data) to the game apparatus, and may communicate with the game apparatus in a wired or wireless manner.

The "hand-held device" is a portable game apparatus in an embodiment to be described later, but it does not have to have a function of performing a game process (game program). Specifically, the hand-held device may be used as a game controller for the game apparatus. Alternatively, a terminal device 200 in a variant to be described later may be used as the hand-held device.

The "game system" includes the game apparatus, the operating device, and the hand-held device, and may or may not include the "first display device" for displaying the first game image. That is, the game system may be provided either in the form in which the first display device is not included or in the form in which it is included.

The "game process section" may be information processing means for performing not only a game control process (step S3) for a shooting game as in the embodiment to be described later but also any game control processes for controlling the position and the attitude of the second virtual camera based on the first operation data and the second operation data.

The "first display device" is provided independently of the hand-held device, and may be any device, such as a television 2 in the embodiment to be described later, which can display an image generated by the game apparatus. For example, the first display device may be integrally formed with the game apparatus (within a single casing).

The "first operation data output section" may be any feature capable of detecting an operation on the operating device, including an acceleration sensor 37, a gyroscope unit 6 (gyroscopes 55 and 56), an imaging information calculation section (infrared light detection means) 35, and an operating section 32 in the embodiment to be described later.

The "second operation data output section" may be any feature capable of detecting an operation on the hand-held device, including an acceleration sensor 89, a gyroscope 90, a touch panel 63, an operate button group 64, and an analog stick 65 in the embodiment to be described later.

Also, in the above configuration (1), the first virtual camera may be arbitrarily set within the game space. Specifically, the first virtual camera may be controlled based on the first operation data as in the embodiment to be described later, may be controlled independently of any operation data, or may be fixed at a predetermined position within the game space.

According to the above configuration (1), the position of the second virtual camera is controlled by the first player manipulating the operating device, and the attitude of the second virtual camera is controlled by the second player manipulating the hand-held device. Specifically, in the present embodiment, the position or the attitude of the second virtual camera changes in accordance with each player's game operation, so that the display range on the second display device changes. Thus, according to the above configuration (1), each player can change the display range by his/her own game operation, and therefore the player's game operation can be fully reflected in game progression. Accordingly, unlike in conventional games, players' operations are fully reflected in game progression, and therefore the players will not lose interest in the game, and can thoroughly enjoy the game.

(2) The game process section may further perform as the game control process a process for controlling the first virtual camera based on the first operation data.

According to the above configuration (2), the first virtual camera is controlled by the first player's operation. Accordingly, players can freely adjust the display ranges of game spaces displayed on display devices. Thus, each player can play the game while adjusting the viewpoint so that he/she can readily view the game image without worrying about causing any inconvenience for the other player, which makes it possible to provide a game with superior operability.

(3) The game process section may at least control a position of the first virtual camera based on the first operation data such that the first virtual camera moves simultaneously with movement of the second virtual camera.

The wording "the first virtual camera moves simultaneously with movement of the second virtual camera" is intended to mean that the two virtual cameras are equal both in the moving distance and the moving direction within the game space. Also, while in the above configuration (3), the position of the first virtual camera is at least controlled, the attitude of the first virtual camera may additionally be controlled based on the first operation data as in the embodiment to be described later or it may not be so controlled.

According to the above configuration (3), the virtual cameras move simultaneously with each other, and therefore the targets (virtual cameras) of manipulation by the players are caused to move together based on the first operation data. In addition, the attitude of the second virtual camera is controlled based on the second operation data, and therefore the second player can freely adjust the display range of the game space to be displayed as the second game image. Accordingly, the above configuration (3) makes it possible to provide a game in which viewpoints from which to display game images move concurrently on their respective display devices, and the players can freely adjust the display ranges on the display devices. Thus, it is possible to realize a game to be played by two players in concert with each other, in which, for example, the first player adjusts the viewpoint, and the second player performs a game operation while viewing the game space from the viewpoint adjusted by the first player.

(4) The second operation data output section may include a sensor for outputting data whose value changes in accordance with movement of the hand-held device. In this case, the second operation data includes data outputted by the sensor included in the second operation data output section. The game process section controls the attitude of the second virtual camera in accordance with the movement of the hand-held device.

The "movement of the hand-held device" is meant to include changes in position and attitude of the hand-held device. Specifically, the "movement" may refer to either the change in position or attitude, or both. The "sensor" may be any feature allowing the game process section to calculate (estimate) some movement of the hand-held device based on a sensor output.

According to the above configuration (4), the second player can perform a game operation of moving the hand-held device itself. The second player can intuitively play the game with such a game operation which can be more readily performed.

(5) The second operation data output section may include an acceleration sensor and/or a gyroscope. In this case, the second operation data includes acceleration data sensed by the acceleration sensor included in the second operation data output section and/or angular rate data sensed by the gyroscope included in the second operation data output section.

According the above configuration (5), by using the sensing result by the acceleration sensor or the gyroscope, the game process section can readily calculate (estimate) the movement of the hand-held device.

(6) The first operation data output section may include a sensor for outputting data whose value changes in accordance with movement of the operating device. In this case, the first operation data includes data outputted by the sensor included in the first operation data output section. The game process section controls the position of the second virtual camera based on the movement of the operating device.

The "movement of the operating device" is meant to include changes in an operational position and an operational attitude. The "sensor" may be any feature allowing the game process section to calculate (estimate) some movement of the operating device based on a sensor output, similar to an imaging information calculation section 35, an acceleration sensor 37, and gyroscopes 55 and 56 in the embodiment to be described later.

According to the above configuration (6), the first player can perform a game operation of moving the operating device itself. The first player can intuitively play the game with such a game operation which can be more readily performed.

(7) The first operation data output section may include an acceleration sensor and/or a gyroscope. In this case, the first operation data includes acceleration data sensed by the acceleration sensor included in the first operation data output section and/or angular rate data sensed by the gyroscope included in the first operation data output section.

According to the above configuration (7), by using the sensing result by the acceleration sensor or the gyroscope, the game process section can readily calculate (estimate) the movement of the operating device.

(8) The game process section may perform as the game control process a process for controlling the action of a predetermined object arranged in the game space based on the first operation data, and may also control the second virtual camera to be positioned in accordance with a position of the predetermined object.

The wording "the second virtual camera to be positioned in accordance with a position of the predetermined object" is intended to mean that the position of the second virtual camera is determined based on the position of the predetermined object, and such a position may be the position of the predetermined object or may be different from the position of the predetermined object (e.g., it may be a position at a predetermined distance behind the predetermined object). Accordingly, in the above configuration (8), the second virtual camera may be set so as to generate an image of the game space as viewed from the position of the predetermined object or an image of the game space including the predetermined object.

Also, in the above configuration (8), the position of the second virtual camera may be determined solely by the position of the predetermined object or by both the position and the attitude of the predetermined object.

According to the above configuration (8), the first player can manipulate a predetermined object. Furthermore, the second virtual camera is positioned in accordance with the position of the predetermined object, and therefore the second virtual camera moves in accordance with movement of the predetermined object. Thus, it is possible to realize a game to be played by two players in concert with each other, in which, for example, the first player moves an object, and the second player performs a predetermined game operation (here, a shooting operation) while viewing the game space being displayed from the viewpoint which moves with the object.

(9) The game process section may control the first virtual camera based on the first operation data such that a first game image including the predetermined object is generated, and may also control the position of the second virtual camera based on the first operation data such that a second game image as viewed from the position of the predetermined object is generated.

The wording "such that a second game image as viewed from the position of the predetermined object is generated" is intended to encompass not only the case where the position of the second virtual camera matches the position of the predetermined object but also the case where the second virtual camera is set at a position around the predetermined object.

According to the above configuration (9), a so-called first-person perspective game image is displayed as the second game image, and a game image including a predetermined object is displayed as the first game image. As a result, the second player can play the game while viewing the first-person perspective game image, which offers the realistic feel, or while viewing the first game image being displayed on the first display device to confirm situations around the predetermined object. Furthermore, the first player can manipulate the object while viewing the first game image, which makes it easy to comprehend situations around the object to be manipulated. Thus, the above configuration (9) makes it possible to display game images on display devices so as to allow players to readily perform manipulations.

(10) The game process section may further perform as the game control process a shooting process for shooting toward a position within the game space that corresponds to a predetermined position on a screen of the second display device.

The wording "a predetermined position on a screen of the second display device" is intended to mean a predetermined (fixed) position on the screen (e.g., a position at the center of the screen as in the embodiment to be described later) or a position pointed at by the second player (a touch position in the variant to be described later).

The above configuration (10) makes it possible to provide a shooting game to be played by two players in concert with each other, in which the first player adjusts a shooting position, and the second player adjusts a shooting direction.

(11) The second operation data output section may include a touch panel provided on a screen of the second display device. In this case, the second operation data includes touch data representing a touch position on the touch panel. The game process section performs as the game control process a game process based on a position within the game space that corresponds to the touch position.

The wording "a game process based on a position within the game space that corresponds to the touch position" is intended to encompass any game process to be performed in relation to a position within the game space that corresponds to the touch position. The game process may be, for example, a process for firing a bullet toward that position as in the embodiment to be described later or a predetermined process to be performed on an object present at that position (e.g., a process for causing the object to perform a predetermined action or a process for attacking the object).

According to the above configuration (11), the second player can perform a game operation using the touch panel, which makes it possible to more readily perform game operations using the hand-held device.

In particular, where the above configuration (11) is combined with the above configuration (10) such that the touch position is used in place of the "predetermined position" in (10), the second player can perform a shooting operation through a touch operation on the touch panel. Furthermore, the second player can adjust the attitude of the second virtual camera, and therefore can fire a bullet toward a touched position by changing the display range of the game space to be displayed on the second display device and touching an arbitrary position within the display range. Thus, in the above case, it becomes possible to more readily perform an operation of firing a bullet in a desired direction, which makes it possible to provide a shooting game with superior operability.

(12) The game process section may set a predetermined attitude as a reference attitude and may calculate a degree and a direction of tilt of the second virtual camera from the reference attitude based on the second operation data, thereby calculating the attitude of the second virtual camera.

According to the above configuration (12), as for the attitude of the second virtual camera, the second player adjusts the degree and the direction of tilt from the reference attitude fixed within the game space. That is, the attitude of the second virtual camera within the game space is determined by the second player's operation, independently of the first player's operation. Thus, the second player can readily change the attitude of the second virtual camera to a desired attitude.

(13) The game process section may set an attitude determined based on the first operation data as a reference attitude, and may calculate a degree and a direction of tilt of the second virtual camera from the reference attitude based on the second operation data, thereby calculating the attitude of the second virtual camera.

According to the above configuration (13), as for the attitude of the second virtual camera, the second player adjusts the degree and the direction of tilt from the reference attitude determined by the first operation data. That is, the attitude of the second virtual camera within the game space is determined by both the first player's operation and the second player's operation. As a result, the second virtual camera cannot be set in a desired attitude unless the players cooperate with each other, which renders game operations highly strategic and enjoyable. Moreover, for example, in the case where the direction (attitude) of the object manipulated by the first player corresponds to the attitude of the second virtual camera, the second player can play the game with the feeling as if he/she were actually riding in the object, which makes it possible to enhance the realistic feel of the game.

(14) The first image generation section may generate as the first game image a game image representing the game space as viewed from the first virtual camera and having the second game image superimposed on a part thereof.

According to the above configuration (14), the content of the second game image is displayed on the first display device, and therefore the first player can also readily view the second game image. As a result, the first player can readily comprehend the situation of the second player's game operation. Thus, as in the embodiment to be described later, it becomes possible to facilitate easy game operations in a game to be played by players in concert with each other.

(15) Another example game system comprises a game apparatus, an operating device, and a hand-held device. The game system includes a first operation data output section, a second operation data output section, a game process section, a first image generation section, a second image generation section, a first image output section, a second image output section, and a display process section. The first operation data output section outputs first operation data representing manipulation on the operating device. The second operation data output section outputs second operation data representing manipulation on the hand-held device. The game process section performs a predetermined game control process. The first image generation section generates a first game image of a virtual game space based on a first virtual camera set in the virtual game space, the virtual game space representing a result of the game control process. The second image generation section generates a second game image of the game space based on a second virtual camera set in the game space. The first image output section outputs the first game image to a first display device provided independently of the hand-held device. The second image output section outputs the second game image to the hand-held device. The display process section displays the second game image on a second display device provided in the hand-held device.

Also, the game process section performs as the game control process a process for controlling a position of the second virtual camera based on the first operation data and an attitude of the second virtual camera based on the second operation data.

(16) Another example game apparatus is capable of communicating with an operating device and a hand-held device. The game apparatus includes a first reception section, a game process section, a first image generation section, a second image generation section, a first image output section, and a second image output section. The first reception section receives data transmitted from the operating device and the hand-held device. The game process section performs a predetermined game control process. The first image generation section generates a first game image of a virtual game space based on a first virtual camera set in the virtual game space, the virtual game space representing a result of the game control process. The second image generation section generates a second game image of the game space based on a second virtual camera set in the game space. The first image output section outputs the first game image to a first display device provided independently of the hand-held device. The second image output section outputs the second game image to the hand-held device so as to be displayed on a second display device provided in the hand-held device.

Also, the game process section performs as the game control process a process for controlling a position of the second virtual camera based on the first operation data and an attitude of the second virtual camera based on the second operation data.

Also, in another embodiment, there may be provided a computer-readable storage medium having stored therein a game program for causing a computer of a game apparatus to function as means equivalent to the sections of the game apparatus as described in (1) to (16) above. Furthermore, in still another embodiment, there may be provided a game process method to be performed in the game system as described in (1) to (15) above.

The game system, the game apparatus, the storage medium, and the game process method as mentioned above allow the positions and the attitudes of virtual cameras to change in accordance with players' game operations, and therefore each player can change the display range of a game space to be displayed on a display device by his/her game operation. Thus, each player's game operation can be fully reflected in game progression, so that the player can thoroughly enjoy the game.

These and other objects, features, aspects and advantages will become more apparent from the following detailed description when taken in conjunction with the accompanying drawings.

BRIEF DESCRIPTION OF THE DRAWINGS

FIG. 16 is a diagram illustrating the relationship between the attitude of the example non-limiting hand-held device and the attitude of a second virtual camera;

DETAILED DESCRIPTION

1. Overall Configuration of the Game System

Figure 1:
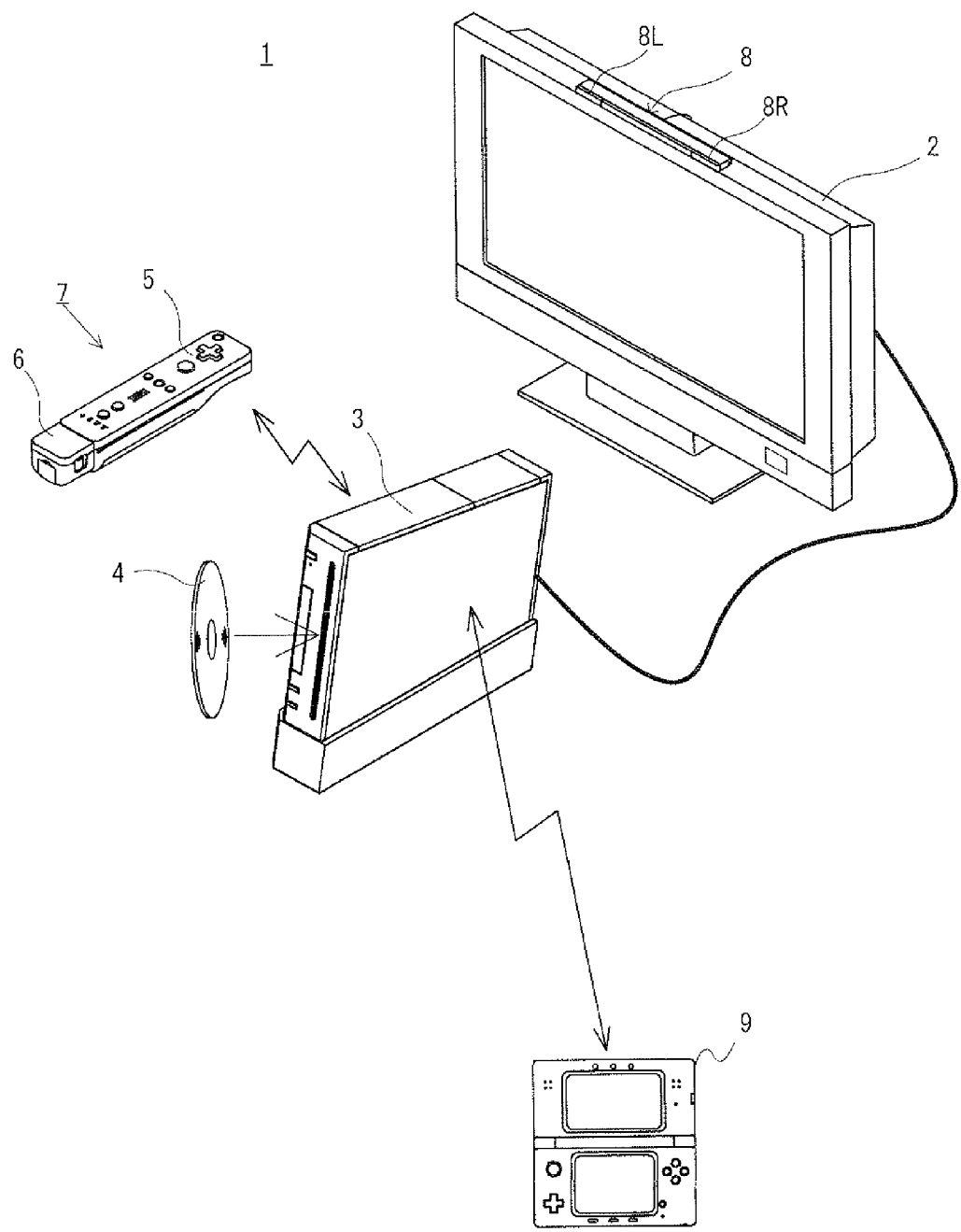
FIG. 1 is an external view of an example non-limiting game system.

An example game system 1 will now be described with reference to the drawings. FIG. 1 is an external view of the game system 1. In FIG. 1, the game system 1 includes a display device (hereinafter referred to as a "television") 2 such as a television receiver, a game apparatus 3, an optical disc 4, an operating device 7, a marker device 8, and a hand-held device 9. In the game system 1, the game apparatus 3 performs game processes based on game operations performed using the operating device 7 and the hand-held device 9, and game images acquired through the game processes are displayed on the television 2 and/or on a display (a lower LCD 62 shown in FIG. 8) of the hand-held device 9.

In the game apparatus 3, the optical disc 4 typifying an information storage medium used for the game apparatus 3 in a replaceable manner is removably inserted. An information processing program (a game program, for example) to be executed by the game apparatus 3 is stored in the optical disc 4. The game apparatus 3 has, on the front surface thereof, an insertion opening for the optical disc 4. The game apparatus 3 reads and executes the information processing program stored on the optical disc 4 which is inserted into the insertion opening, to perform the game process.

The television 2 is connected to the game apparatus 3 by a connecting cord. Game images acquired as a result of the game processes performed by the game apparatus 3 are displayed on the television 2. The television 2 includes a speaker 2a (see FIG. 2), and the speaker 2a outputs game sounds acquired as a result of the game process. In alternative embodiments, the game apparatus 3 and the display device may be an integral unit. Also, the communication between the game apparatus 3 and the television 2 may be wireless communication.

The marker device 8 is provided along the periphery of the screen (on the upper side of the screen in FIG. 1) of the television 2. The user can perform game operations by moving the operating device 7, the details of which will be described later, and the marker device 8 is used by the game apparatus 3 for detecting the movement of the operating device 7. The marker device 8 includes two markers 8R and 8L on opposite ends thereof. Specifically, the marker 8R (as well as the marker 8L) includes one or more infrared LEDs (Light Emitting Diodes), and emits an infrared light in a forward direction from the television 2. The marker device 8 is connected to the game apparatus 3, and the game apparatus 3 is able to control the lighting of each infrared LED of the marker device 8. While FIG. 1 shows an embodiment in which the marker device 8 is arranged on top of the television 2, the position and the direction of arranging the marker device 8 are not limited to this particular arrangement.

The operating device 7 provides the game apparatus 3 with operation data representing the content of operations performed on the controller itself. Hereinafter, operation data transmitted to the game apparatus 3 by the operating device 7 is referred to as "first operation data". In the present embodiment, the operating device 7 includes a controller 5 and a gyroscope unit 6. As will be described in detail below, the operating device 7 has the gyroscope unit 6 detachably connected to the controller 5. Alternatively, the controller 5 may include a gyroscope. The controller 5 and the game apparatus 3 are connected by wireless communication. In the present embodiment, the wireless communication between the operating device 7 and the game apparatus 3 uses, for example, Bluetooth (Registered Trademark) technology. In other embodiments, the operating device 7 and the game apparatus 3 may be connected by a wired connection.

In the present embodiment, the hand-held device 9 is a portable game apparatus which includes display devices (LCDs 62 and 72 to be described later) and input devices (e.g., a touch panel 63 and an acceleration sensor 89 to be described later). The hand-held device 9 can communicate with the game apparatus 3 wirelessly or wired. The hand-held device 9 receives game images and sound acquired by processing, from the game apparatus 3, and displays the game images on the display while outputting the game sound from a speaker. The hand-held device 9 transmits operation data representing the content of operations performed thereon to the game apparatus 3. Hereinafter, the operation data transmitted to the game apparatus 3 by the hand-held device 9 is referred to as the "second operation data".

While in the present embodiment, the hand-held device 9 is a portable game apparatus, in another embodiment, the hand-held device 9 may be any device (or controller) which includes a display device(s) and an input device(s) and can be held by a user. Specifically, the hand-held device 9 is not always provided with the function of executing any game process (or game program). Furthermore, while in the present embodiment, the hand-held device 9 is a portable game apparatus equipped with two display devices as shown in FIG. 1, the hand-held device 9 may be a portable game apparatus equipped with one display device or may be a game controller equipped with one display device.

2. Internal Configuration of the Game Apparatus 3

Figure 2:
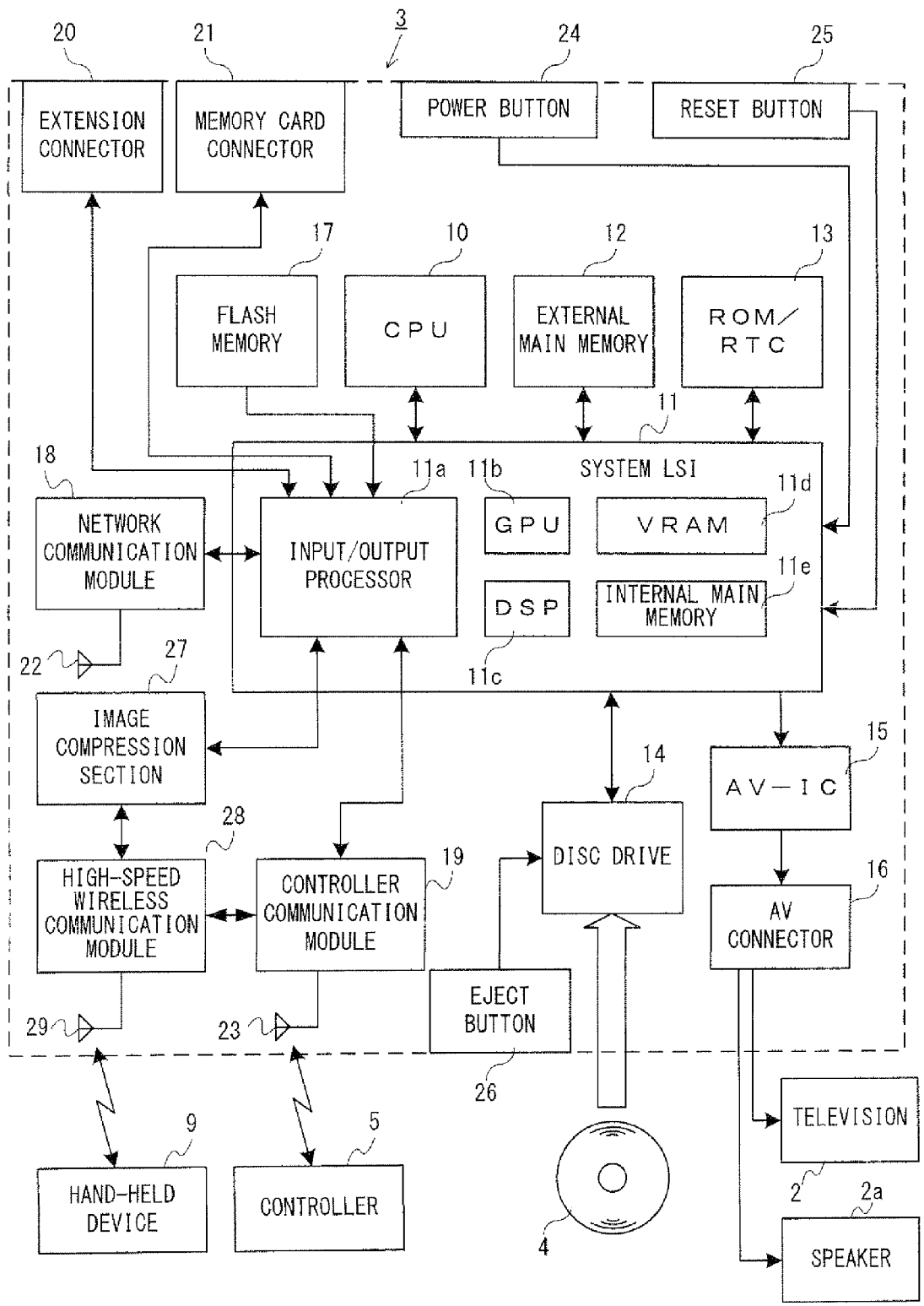
FIG. 2 is a block diagram illustrating an internal configuration of an example non-limiting game apparatus.

An internal configuration of the game apparatus 3 will be described with reference to FIG. 2. FIG. 2 is a block diagram illustrating an internal configuration of the game apparatus 3. The game apparatus 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) to be used by the GPU 11b to execute the graphics commands. When images are generated, the GPU 11b generates image data using data stored in the VRAM 11d.

Here, in the present embodiment, the game apparatus 3 generates both game images to be displayed on the television 2 and game images to be displayed on the display devices (the lower LCD 62 and the upper LCD 72) of the hand-held device 9. Hereinafter, the game images to be displayed on the television 2 are referred to as the "first game images" and the game images to be displayed on the hand-held device 9 are referred to as the "second game images".

The DSP 11c, functioning as an audio processor, generates sound data using sound data and sound waveform (e.g., tone quality) data stored in one or both of the internal main memory 11e and the external main memory 12.

The image data (data for first game images) and sound data, which are generated as described above, are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and an image compression section 27. An antenna 22 is connected to the network communication module 18. An antenna 23 is connected to the controller communication module 19. The image compression section 27 is connected to a high-speed wireless communication module 28, and an antenna 29 is connected to the high-speed wireless communication module 28. The controller communication module 19 is connected to the high-speed wireless communication module 28.

The input/output processor 11a can be connected to a network such as the Internet via the network communication module 18 and the antenna 22 to communicate with other game devices and servers connected to the network. The input/output processor 11a regularly accesses the flash memory 17, and detects the presence or absence of any data which needs to be transmitted to the network, and when detected, transmits the data to the network via the network communication module 18 and the antenna 22. Further, the input/output processor 11a receives data transmitted from another game device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game apparatus 3 in addition to data exchanged between the game apparatus 3 and other game apparatus or servers.

The input/output processor 11a receives first operation data transmitted from the operating device 7 via the antenna 23 and the controller communication module 19, and stores it (temporarily) in a buffer area of the internal main memory 11e or the external main memory 12. Also, the input/output processor 11a receives second operation data, which is transmitted from the hand-held device 9, via the antenna 29, the high-speed wireless communication module 28, and the controller communication module 19, and stores it (temporarily) in the buffer area of the internal main memory 11e or the external main memory 12.

When transmitting game images (second game images) to the hand-held device 9, the input/output processor 11a outputs game image data generated by the GPU 11b to the image compression section 27. The image compression section 27 performs a predetermined compression process on the image data from the input/output processor 11a. The high-speed wireless communication module 28 wirelessly communicates with the hand-held device 9. Accordingly, the image data compressed by the image compression section 27 is transmitted by the high-speed wireless communication module 28 to the hand-held device 9 via the antenna 29. In the present embodiment, the image data transmitted from the game apparatus 3 to the hand-held device 9 is image data used in a game, and the playability of a game can be adversely influenced if there is a delay in the images displayed in the game. Therefore, delay may be avoided as much as possible in transmitting image data from the game apparatus 3 to the hand-held device 9. Therefore, in the present embodiment, the image compression section 27 compresses image data using a compression technique with high efficiency such as the H.264 standard, for example. Other compression techniques may be used, and image data may be transmitted uncompressed if the communication speed is sufficient. The high-speed wireless communication module 28 is, for example, a Wi-Fi certified communication module, and may perform wireless communication at high speed with the hand-held device 9 using a MIMO (Multiple Input Multiple Output) technique employed in the IEEE 802.11n standard, for example, or may use other communication schemes.

While the above description focuses on the image data transmitted from the game apparatus 3 to the hand-held device 9, in the present embodiment, sound data is also transmitted together with the image data. Specifically, the input/output processor 11a outputs sound data generated by the DSP 11c to the high-speed wireless communication module 28 via the image compression section 27. The high-speed wireless communication module 28 transmits the sound data, along with the image data, to the hand-held device 9 via the antenna 29. Note that the image compression section 27 may or may not perform a compression process on the sound data.

Also, when the hand-held device 9 transmits data (specifically, second operation data) to the game apparatus 3, the high-speed wireless communication module 28 receives the data via the antenna 29. The received data is acquired by the input/output processor 11a. Note that in the present embodiment, any data from the hand-held device 9 to the game apparatus 3 is not subjected to a compression process, and the data is not subjected to a decompression process, but in another embodiment, such data may be subjected to a compression process in the hand-held device 9 and a decompression process in the game apparatus 3.

The input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the components of the game apparatus 3 through an AC adaptor (not shown). When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

In other embodiments, some of the components of the game apparatus 3 may be provided as extension devices separate from the game apparatus 3. In this case, an extension device may be connected to the game apparatus 3 via the expansion connector 20, for example. Specifically, an extension device may include components of the image compression section 27, the high-speed wireless communication module 28 and the antenna 29, for example, and can be attached/detached to/from the expansion connector 20. Thus, by connecting the extension device to a game apparatus which does not include the above components, the game apparatus can communicate with the hand-held device 9.

3. Configuration of the Operating Device 7

Figure 3:
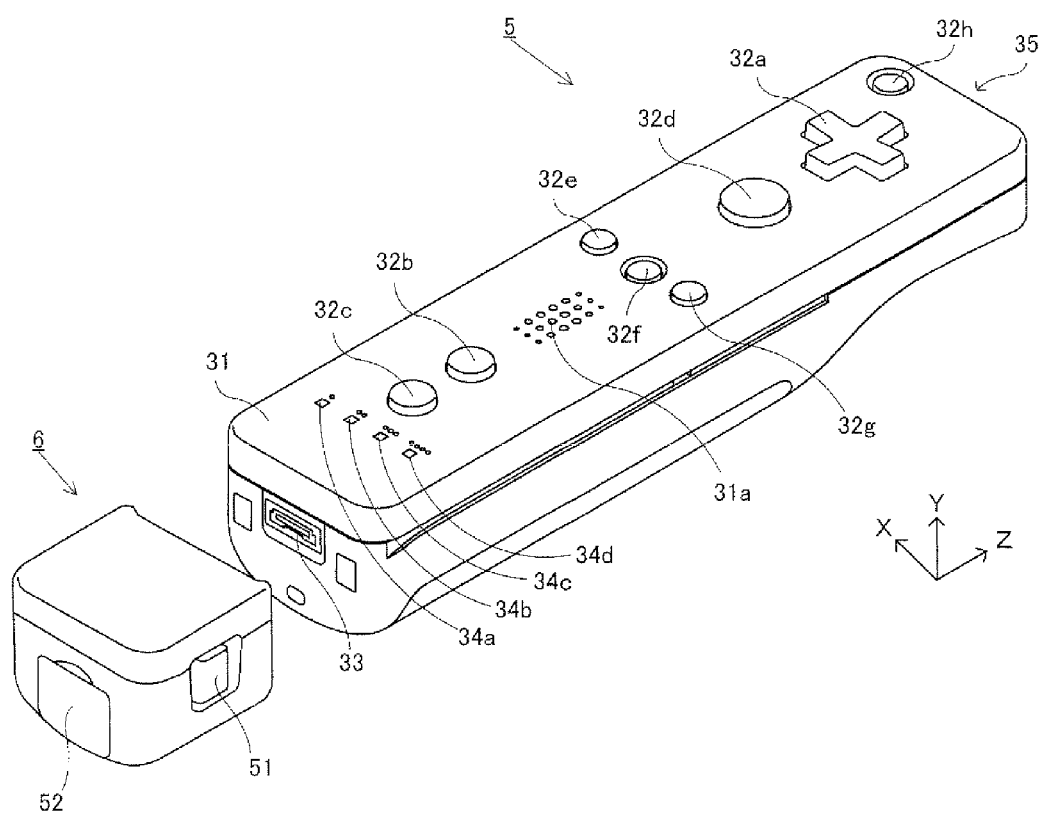
FIG. 3 is a perspective view illustrating an external configuration of an example non-limiting operating device.
Figure 4:
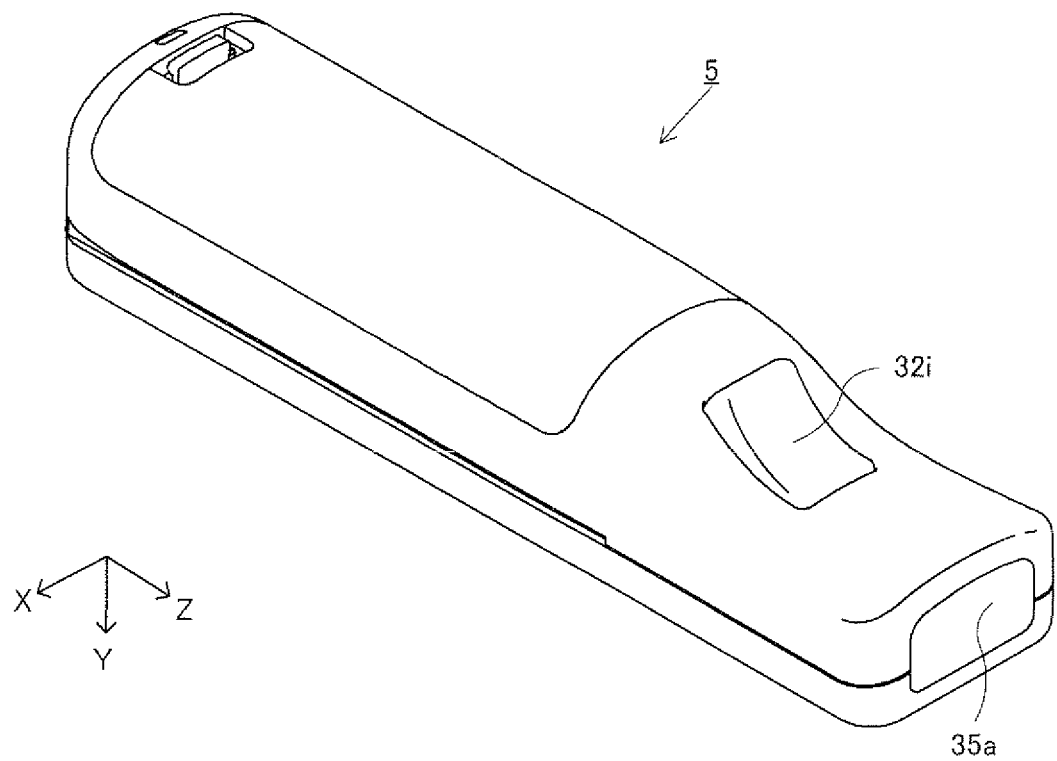
FIG. 4 is a perspective view illustrating an external configuration of an example non-limiting controller.

Next, with reference to FIGS. 3 to 7, the operating device 7 (the controller 5 and the gyroscope unit 6) will be described. FIG. 3 is a perspective view illustrating an external configuration of the operating device 7. FIG. 4 is a perspective view illustrating an external configuration of the controller 5. The perspective view of FIG. 3 shows the operating device 7 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game apparatus 3. Further, the power button 32h is intended to remotely turn ON/OFF the game apparatus 3. The home button, 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device (for example, the gyroscope unit 6 or another controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 8R and 8L.

On the top surface of the housing 31, sound holes 31a for externally outputting a sound from a speaker 49 (shown in FIG. 5) incorporated in the controller 5 is provided between the first button 32b and the home button 32f.

Figure 5:
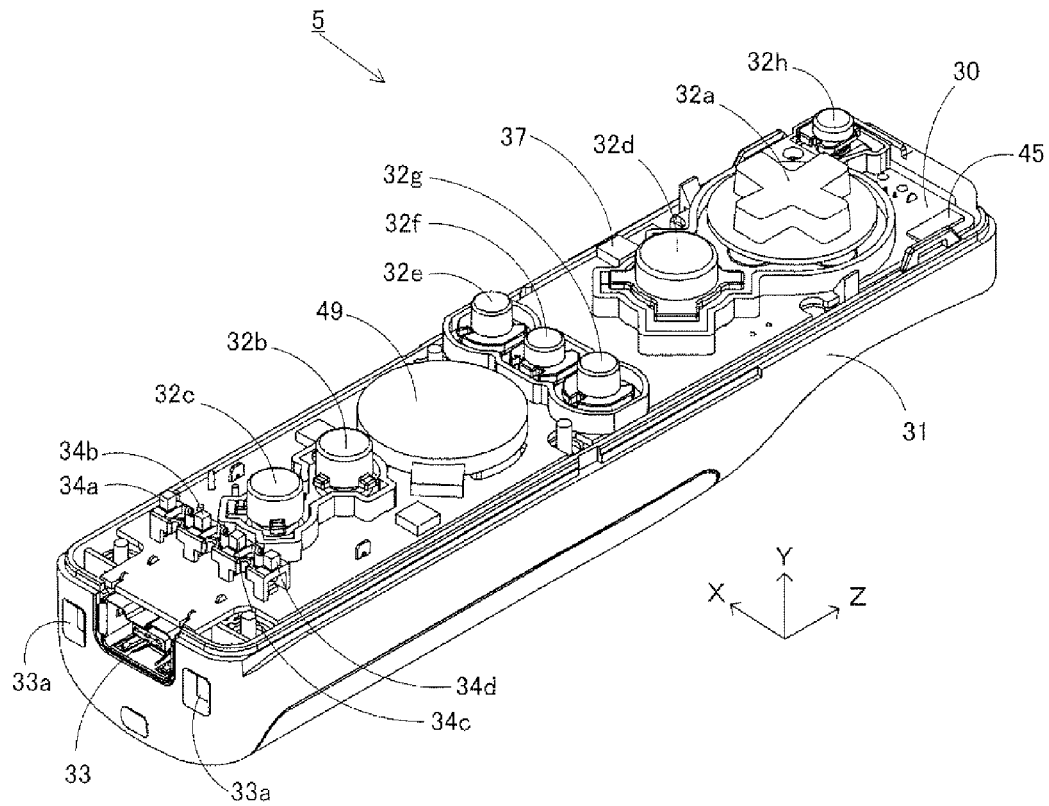
FIG. 5 is a diagram illustrating an internal configuration of the example non-limiting controller.
Figure 6:
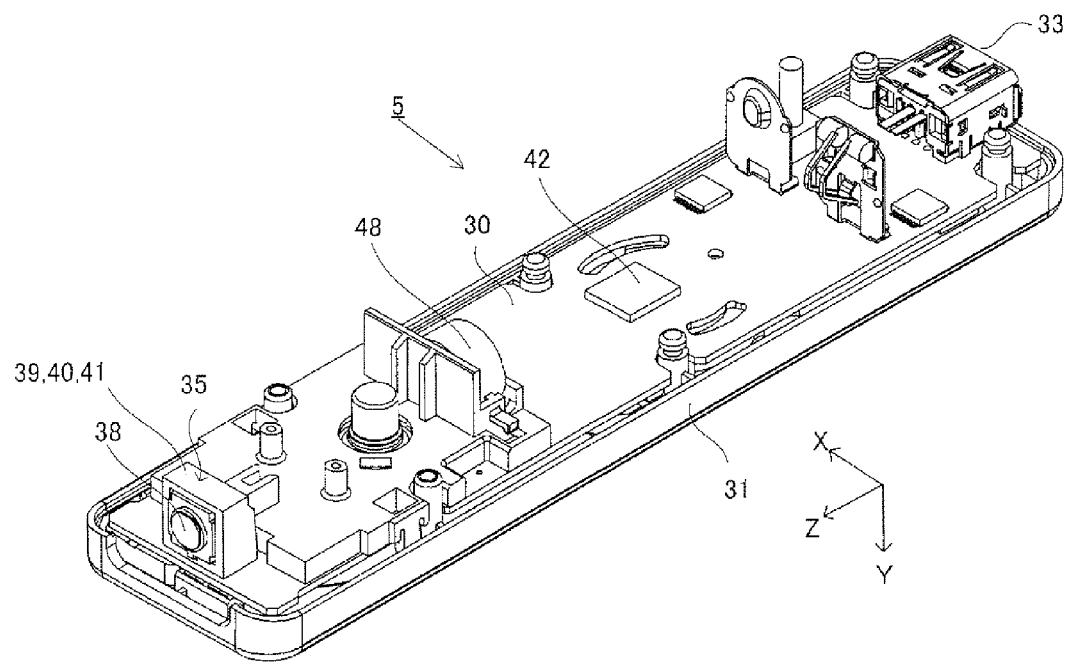
FIG. 6 is another diagram illustrating an internal configuration of the example non-limiting controller.

Next, with reference to FIGS. 5 and 6, an internal configuration of the controller 5 will be described. FIG. 5 and FIG. 6 are diagrams illustrating the internal configuration of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated about the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyroscope unit 6 includes gyroscopes (gyroscopes 55 and 56 shown in FIG. 7) for detecting angular rates about three axes, respectively. The gyroscope unit 6 is detachably attached to the connector 33 of the controller 5. The gyroscope unit 6 has, at the front edge (an edge portion oriented to the Z-axis positive direction shown in FIG. 3), a plug (a plug 53 shown in FIG. 7) connectable to the connector 33. Further, the plug 53 has hooks (not shown) on both sides, respectively. In a state where the gyroscope unit 6 is attached to the controller 5, the plug 53 is connected to the connector 33, and the hooks engage with the fastening holes 33a, respectively, of the controller 5. Therefore, the controller 5 and the gyroscope unit 6 are securely fixed to each other. Further, the gyroscope unit 6 has a button 51 on each side surface (surfaces oriented to the X-axis direction shown in FIG. 3). When the button 51 is pressed, the hook is disengaged from the fastening hole 33a. Therefore, when the plug 53 is removed from the connector 33 while the button 51 is being pressed, the gyroscope unit 6 can be disconnected from the controller 5.

Further, a connector having the same shape as the connector 33 is provided at the rear edge of the gyroscope unit 6. Therefore, another device which can be attached to (the connector 33 of) the controller 5 can be attached as well to the connector of the gyroscope unit 6. In FIG. 3, a cover 52 is detachably provided over the connector.

FIGS. 3 to 6 show only examples of the shape of the controller 5 and the gyroscope unit 6, the shape of each operation button, the number and the positions of acceleration sensors and vibrators, and so on. The present embodiment can be realized with other shapes, numbers, and positions. Further, although in the present embodiment the imaging direction of the image pickup means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
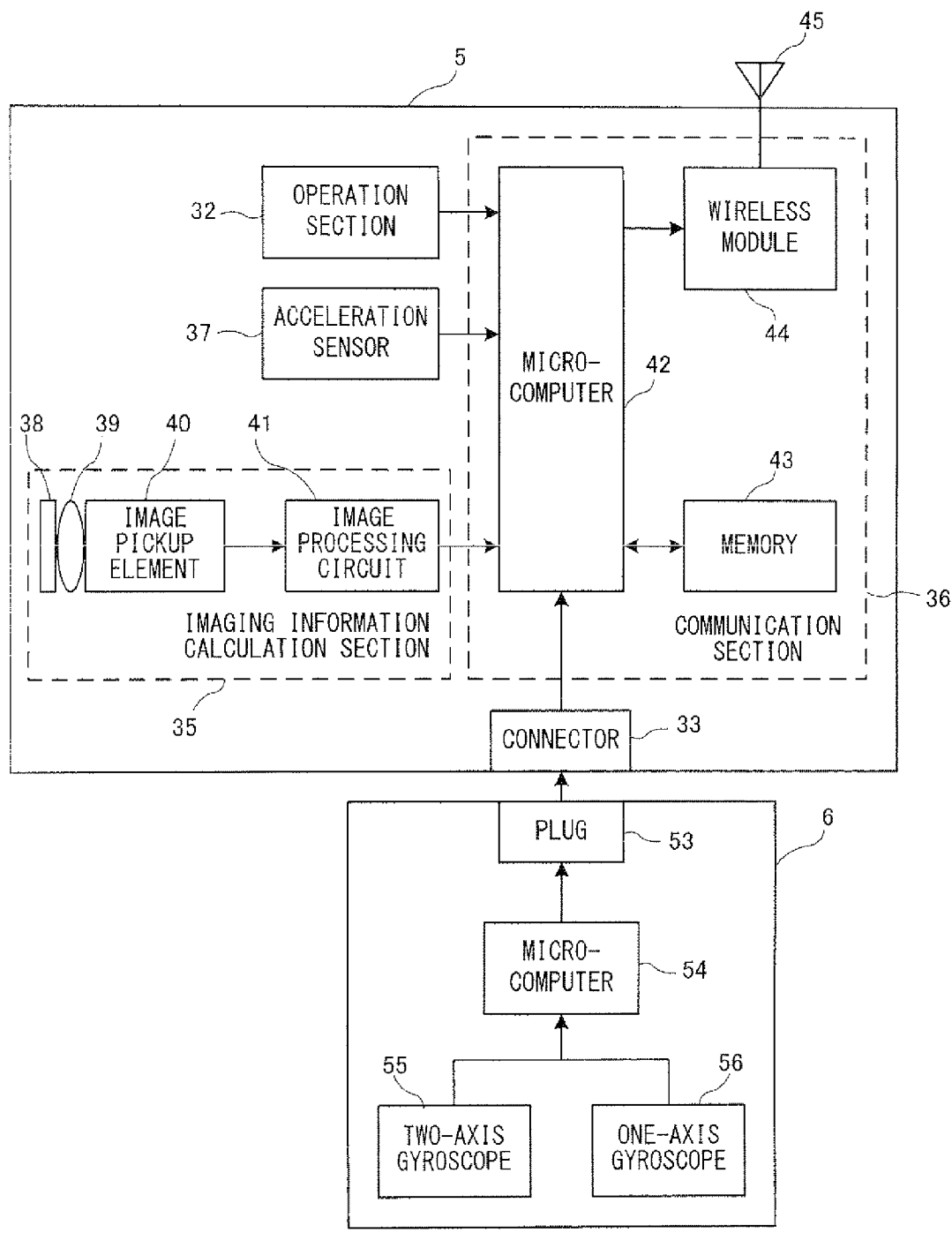
FIG. 7 is a block diagram illustrating a configuration of the example non-limiting operating device.

FIG. 7 is a block diagram illustrating a configuration of the operating device 7 (the controller 5 and the gyroscope unit 6). The controller 5 includes an operating section 32 (the operation buttons 32a to 32i), the connector 33, the imaging information calculation section 35, a communication section 36, and the acceleration sensor 37. The controller 5 transmits, as first operation data, data representing the content of an operation performed on the controller 5 itself, to the game apparatus 3.

The operating section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared, light transmitted through the infrared filter 38 so as to be incident on the image pickup element 40. The image pickup element 40 is a solid-state imaging device such as, for example, a CMOS sensor or a COD sensor, which receives the infrared light collected by the lens 39, and outputs an image signal. The markers 8R and 8L of the marker device 8 provided near the display screen of the television 2 each include an infrared LED for outputting an infrared light forward from the television 2. Therefore, the infrared filter 38 enables the image pickup element 40 to receive only the infrared light transmitted through the infrared filter 38 and generate image data, so that an image of each of the markers 8R and 8L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged (the markers 8R and 8L). The image processing circuit 41 outputs data representing coordinate points of the calculated positions, to the microcomputer 42 of the communication section 36. The data representing the coordinate points is transmitted as first operation data to the game apparatus 3 by the microcomputer 42. Hereinafter, the coordinate points are referred to as "marker coordinate points". The marker coordinate point changes depending on the attitude (angle of tilt) and/or the position of the controller 5 itself, and therefore the game apparatus 3 is allowed to calculate the attitude and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the operating device 7 (the controller 5).

Data (acceleration data) representing the acceleration detected by the acceleration sensor 37 is outputted to the communication section 36. The acceleration detected by the acceleration sensor 37 changes depending on the attitude (angle of tilt) and the movement of the controller 5, and therefore the game apparatus 3 is allowed to calculate the attitude and the movement of the controller 5 using the acquired acceleration data. In the present embodiment, the game apparatus 3 calculates the attitude, angle of tilt, etc., of the controller 5 based on the acquired acceleration data.

When a computer such as a processor (e.g., the CPU 10) of the game apparatus 3 or a processor (e.g., the microcomputer 42) of the controller 5 processes an acceleration signal outputted from the acceleration sensor 37 (or similarly from an acceleration sensor 89 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1 G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another appropriate parameter).

The communication section 36 includes the microcomputer 42, memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyroscope unit 6 is inputted to the microcomputer 42 through the connector 33. Hereinafter, a configuration of the gyroscope unit 6 will be described.

The gyroscope unit 6 includes the plug 53, a microcomputer 54, the two-axis gyroscope 55, and the one-axis gyroscope 56. As described above, the gyroscope unit 6 detects angular rates about three axes (X-, Y-, and Z-axes in the present embodiment), respectively, and transmits data (angular rate data) representing the detected angular rates, to the controller 5.

The two-axis gyroscope 55 detects an angular rate (per unit time) about each of the X-axis and the Z-axis. Further, the one-axis gyroscope 56 detects an angular rate (per unit time) about the Y-axis. In the present embodiment, the directions of rotation about the X-axis, the Y-axis, and the Z-axis relative the imaging direction (the Z-axis positive direction) of the controller 5 are referred to as a pitch direction, a yaw direction, and a roll direction, respectively. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis).

In the present embodiment, the two-axis gyroscope 55 and the one-axis gyroscope 56 are used to detect the angular rates about the three axes. However, in another embodiment, the number of gyroscopes and a combination thereof to be used may optionally selected, provided that the angular rates about the three axes can be detected.

Data representing the angular rates detected by the gyroscopes 56 and 57 are outputted to the microcomputer 54. That is, data representing the angular rates about the three axes, i.e., the X-, Y-, and Z-axes, are inputted to the microcomputer 54. The microcomputer 54 transmits the data representing the angular rates about the three axes, as angular rate data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission may be performed at a cycle shorter than a cycle of 1/60 seconds.

The controller 5 will be described again. Data outputted from the operating section 32, the imaging information calculation section 35, and the acceleration sensor 37 to the microcomputer 42, and data, transmitted from the gyroscope unit 6 to the microcomputer 42 are temporarily stored to the memory 43. The data are transmitted as the first operation data to the game apparatus 3. At the time of the transmission to the controller communication module 19 of the game apparatus 3, the microcomputer 42 outputs the operation data stored in the memory 43 to the wireless module 44 as the first operation data. The wireless module 44 uses, for example, the Bluetooth (registered trademark) technology to modulate the first operation data onto a carrier wave of a predetermined frequency, and radiates the low power radio wave signal from the antenna 45. That is, the first operation data is modulated onto the low power radio wave signal by the wireless module 44 and transmitted from the controller 5. The controller communication module 19 of the game apparatus 3 receives the low power radio wave signal. The game apparatus 3 demodulates or decodes the received low power radio wave signal to acquire the first operation data. Based on the first operation data acquired from the operating device 7, the second operation data acquired from the hand-held device 9, and the game program, the CPU 10 of the game apparatus 3 performs the game process. The wireless transmission from the communication section 36 to the controller communication module 19 is sequentially performed at a predetermined time interval. Since the game process is generally performed at a cycle of 1/60 sec. (corresponding to one frame time), data may be transmitted at a cycle of a shorter time period. The communication section 36 of the controller 5 outputs, to the controller communication module 19 of the game apparatus 3, the first operation data at intervals of 1/200 seconds, for example.

As described above, the operating device 7 can transmit marker coordinate data, acceleration data, angular rate data, and operation button data as first operation data representing operations performed thereon. In addition, the game apparatus 3 executes the game process using the first operation data as game inputs. Accordingly, by using the operating device 7, the player can perform the game operation of moving the operating device 7 itself, in addition to conventionally general game operations of pressing operation buttons. For example, it is possible to perform the operations of tilting the operating device 7 to arbitrary attitudes, pointing the operating device 7 to arbitrary positions on the screen, and moving the operating device 7 itself.

Also, in the present embodiment, the operating device is not provided with any display means for displaying game images, but the operating device 7 may be provided with a display means for displaying an image or suchlike to indicate, for example, a remaining battery level.

4. External Configuration of the Hand-Held Device 9

Figure 8:
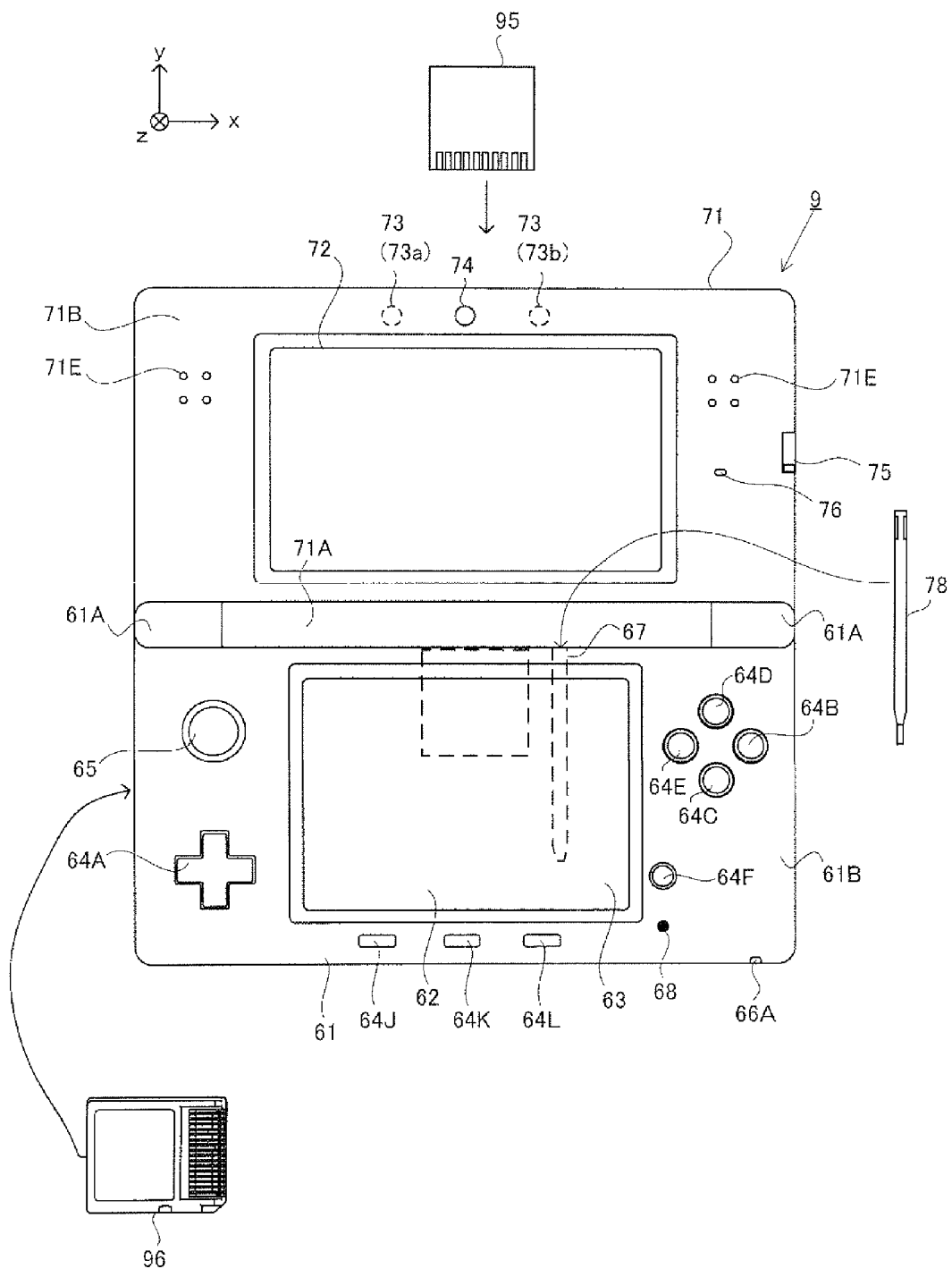
FIG. 8 is a diagram illustrating an external configuration of an example non-limiting hand-held device.

FIG. 8 is a diagram illustrating an external configuration of the hand-held device 9. As shown in FIG. 8, the hand-held device 9 includes a lower housing 61 and an upper housing 71. The lower housing 61 and the upper housing 71 are connected together so that they can be opened/closed (folded). In the present embodiment, the housings 61 and 71 each have a landscape-oriented rectangular plate shape and are pivotally connected together along their long-side portions. Specifically, the lower housing 61 and the upper housing 71 are connected in a foldable manner by coupling the protruding portion 61A of the lower housing 61 with the protruding portion 71A of the upper housing 71.

(Description of the Lower Housing)

First, a configuration of the lower housing 61 will be described. As shown in FIG. 8, a lower LCD (Liquid Crystal Display) 62, a touch panel 63, operation buttons 64A to 64L, an analog stick 65, LEDs 66A to 66B, an insertion hole 67, and a microphone hole 68 are provided in the lower housing 61. Hereinafter, these components will be described in detail.

The lower LCD 62 is accommodated in the lower housing 61. In the present embodiment, the number of pixels of the lower LCD 62 is, for example, 256 dots×192 dots (horizontal×vertical), but a display device with any resolution can be used as the lower LCD 62. Furthermore, in the present embodiment, an LCD is used as the display device, but any other display device may be used such as a display device using EL (Electro Luminescence), for example.

The touch panel 63 is mounted on the screen of the lower LCD 62. Note that in the present embodiment, the touch panel 63 is a resistive film type touch panel. However, the touch panel is not limited to the resistive film type and can be a touch panel of any type such as, for example, the electrostatic capacitance type. Furthermore, the touch panel 63 may be either a single-touch panel or a multi-touch panel. In the present embodiment, a touch panel having the same resolution (detection precision) as the resolution of the lower LCD 62 is used as the touch panel 63. Note however that the resolution of the touch panel 63 and the resolution of the lower LCD 62 might not always coincide with each other. The insertion hole 67 (a dotted line shown in FIG. 8) is provided on the upper-side surface of the lower housing 61. The insertion hole 67 can accommodate a stylus 78 which is used for performing operations on the touch panel 63. Note that although an input on the touch panel 63 is usually made by using the stylus 78, the present embodiment is not limited to the stylus 78 and a finger of the user may be used for making an input on the touch panel 63.

The operation buttons 64A to 61L are each an input device for making a predetermined input. As shown in FIG. 8, among the operation buttons 64A to 64L, a cross button 64A (a direction input button 64A), a button 64B, a button 64C, a button 64D, a button 64E, a power button 64F, a select button 64J, a HOME button 64K, and a start button 64L are provided on the inner-side surface (main surface) of the lower housing 61. The cross button 64A is cross-shaped, and includes buttons for specifying up, down, left and right directions. The buttons 64A to 64E, the select button 64J, the HOME button 64K, and the start button 64L are appropriately assigned functions in accordance with a game program. For example, the cross button 64A is used for selection operation, and the like, and the operation buttons 64B to 64E are used for determination operation, cancellation operation, etc. The power button 64F is used for turning ON/OFF the power of the hand-held device 9.

Although not shown, L and R buttons are provided on the upper-side surface of the lower housing 61. The L button is provided on the left end portion of the upper surface of the lower housing 61, and the R button is provided on the right end portion of the upper surface of the lower housing 61. Although not shown, a sound volume button is provided on the left-side surface of the lower housing 61. The sound volume button is used for adjusting the sound volume of a speaker of the hand-held device 9.

An analog stick 65 is a device for directing a course, provided on the inner-side surface of the lower housing 61. As shown in FIG. 8, the analog stick 65 is provided above the cross button 64A. The analog stick 65 is configured such that its stick portion can tilt in an arbitrary direction (at an arbitrary angle in any of the up, down, left and right directions) with respect to the inner-side surface of the lower housing 61 when it is operated with a thumb and/or a finger.

Also, a cover portion which can be opened/closed is provided on the left-side surface of the lower housing 61. A connector (not shown) for electrically connecting the hand-held device 9 and external data storage memory 96 with each other is provided inside the cover portion. The external data storage memory 96 is detachably connected to the connector. The external data storage memory 96 is used for, for example, recording (storing) data for an image captured by the hand-held device 9.

Also, a cover portion which can be opened/closed is provided on the upper-side surface of the lower housing 61. A connector (not shown) for electrically and detachably connecting the hand-held device 9 and external memory 95 having a game program recorded therein is provided inside the cover portion. A predetermined game program is executed as the external memory 95 is connected to the hand-held device 9.

As shown in FIG. 8, a first LED 66A for notifying the user of the ON/OFF status of the power supply of the hand-held device 9 is provided on the lower-side surface of the lower housing 61. Also, a second LED for notifying the user of the wireless communication establishment status of the hand-held device 9 is provided on the right-side surface of the lower housing 61. The hand-held device 9 can wirelessly communicate with other devices, and the second LED is lit while the wireless communication is maintained. The hand-held device 9 has a function of connecting to a wireless LAN by a scheme based on the IEEE 802.11n standard, for example. A wireless switch for enabling/disabling the wireless communication function is provided on the right-side surface of the lower housing 61.

The microphone hole 68 is provided on the inner-side surface of the lower housing 61. A microphone (see FIG. 9) as a sound input device to be described later is provided under the microphone hole 68, and the microphone detects sound from the outside of the hand-held device 9.

Note that although not shown, the lower housing 61 accommodates a rechargeable battery serving as the power supply of the hand-held device 9, and the battery can be charged through a terminal provided on a side surface (e.g., the upper-side surface) of the lower housing 61.

(Description of the Upper Housing)

Next, a configuration of the upper housing 71 will be described. As shown in FIG. 8, the upper LCD (Liquid Crystal Display) 72, an outer camera 73 (a left-eye camera 73e and a right-eye camera 73b), an inner camera 74, a 3D adjustment switch 75, and the 3D indicator 76 are provided in the upper housing 71. Hereinafter, these components will be described in detail.

As shown in FIG. 8, the upper LCD 72 is accommodated in the upper housing 71. In the present embodiment, the screen of the upper LCD 72 is designed to be longer than the screen of the lower LCD 62, and the number of pixels of the lower LCD 72 is, for example, 640 dots×200 dots (horizontal× vertical). However, a display device with any resolution can be used as the upper LCD 72. Furthermore, in the present embodiment, the upper LCD 72 is a liquid crystal display, but a display device using EL (Electro Luminescence), etc., may be used, for example.

Also, in the present embodiment, the upper LCD 72 is a display device capable of displaying images that can be stereoscopically viewed (with the naked eye). Specifically, in the present embodiment, a display device of a lenticular type or a parallax barrier type is used as the upper LCD 72 so that the left-eye and right-eye images, which are alternately displayed in the horizontal direction on the upper LCD 72, can be seen separately by the left eye and the right eye, respectively. However, in another embodiment, the upper LCD 72 does not have to be a display device capable of displaying images that can be viewed stereoscopically. Note that in the present embodiment, the upper LCD 72 is a display device that can be switched between a stereoscopic display mode where a stereoscopically viewable image is displayed and a two-dimensional display mode where an image is two-dimensionally displayed (a two-dimensionally viewable image is displayed). The display mode switching is done with the 3D adjustment switch 75 to be described later.

The outer camera 73 is provided on an outer-side surface (the back surface opposite to the main surface on which the upper LCD 72 is provided) of the upper housing 71, and is a stereo camera whose image pickup direction is the normal direction to the outer-side surface. The outer camera 73 includes two cameras, i.e., the left-eye camera 73a and the right-eye camera 73b. The left-eye camera 73a and the right-eye camera 73b are placed so that their image pickup directions are parallel to each other. The left-eye camera 73a and the right-eye camera 73b each include an image pickup element (e.g., a CCD image sensor, a CMOS image sensor, etc.) having a predetermined resolution, and a lens. The interval between the left-eye camera 73a and the right-eye camera 73b is set to be about equal to the interval between eyes of a human, and may be set in the range of 30 mm to 70 mm, for example. Note that the interval between the left-eye camera 73a and the right-eye camera 73b is not limited to this range. In other embodiments, the interval between the two cameras 73a and 73b may be variable. With the outer camera 73, it is possible to take images that can be viewed stereoscopically.

The inner camera 74 is a camera which is provided on the inner-side surface (main surface) 71B of the upper housing 71 and whose image pickup direction is the normal direction to the inner-side surface. The inner camera 74 includes an image pickup element (e.g., a CCD image sensor, a CMOS image sensor, etc.) having a predetermined resolution, and a lens. The inner camera 24 captures an image in the direction opposite to that of the outer camera 73, and therefore when the user is looking straight at the upper LCD 72, it is possible to capture an image of the face of the user from the front by the inner camera 74.

The 3D adjustment switch 75 is a sliding switch, and is a switch used for switching between the display modes of the upper LCD 72 as described above. The 3D adjustment switch 75 is used for adjusting the stereoscopic feel of the stereoscopically viewable image (stereoscopic image) displayed on the upper LCD 72. As shown in FIG. 8, the 3D adjustment switch 75 is provided at the edge between the inner-side surface and the right-side surface of the upper housing 71, and is provided at such a position that the 3D adjustment switch 75 can be seen when the user is looking straight at the upper LCD 72. The 3D adjustment switch 75 is provided with a slider slidable in up and down directions, and the stereoscopic feel of the stereoscopic image can be adjusted in accordance with the position of the slider. Here, when the slider is positioned at its lowermost point, the upper LCD 72 is set to the two-dimensional display mode, and when the slider is positioned between a predetermined position above the lowermost point and the uppermost point, the upper LCD 72 is set to the stereoscopic display mode. Also, when the slider is present between the predetermined position and the uppermost point, how a stereoscopic image is seen is adjusted in accordance with the position of the slider.

The 3D indicator 76 shows whether the upper LCD 72 is in the stereoscopic display mode. The 3D indicator 76 is an LED, and is lit when the stereoscopic display mode of the upper LCD 72 is enabled.

Speaker holes 71E are provided on the inner-side surface of the upper housing 71. Sound from a speaker 93 to be described later is outputted from the speaker holes 71E.

5. Internal Configuration of the Hand-Held Device 9

Figure 9:
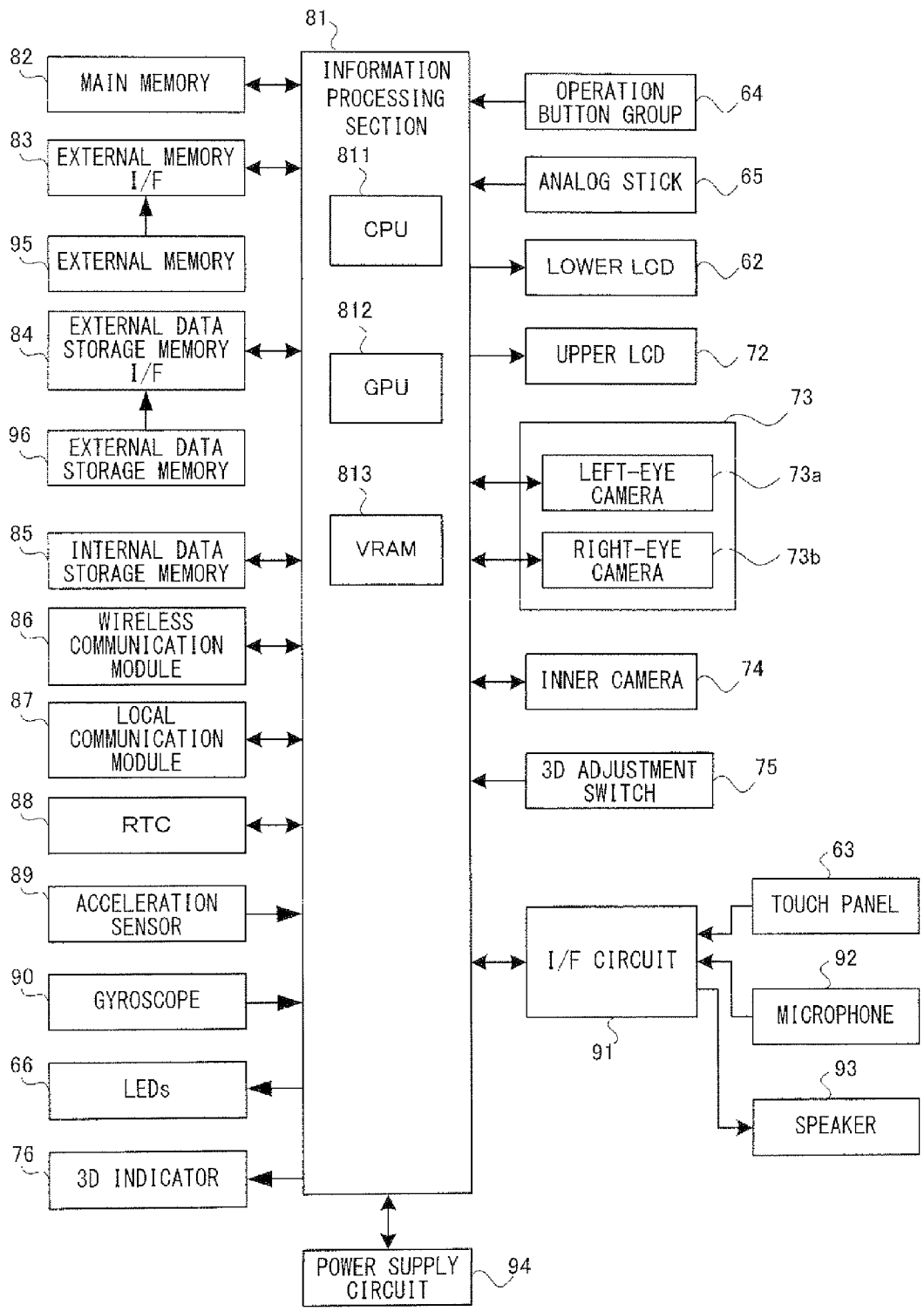
FIG. 9 is a block diagram illustrating an internal configuration of the example non-limiting hand-held device.

Next, referring to FIG. 9, an internal electrical configuration of the hand-held device 9 will be described. FIG. 9 is a block diagram illustrating an internal configuration of the hand-held device 9. As shown in FIG. 9, the hand-held device 9 includes electronic components such as an information processing section 81, main memory 82, an external memory interface (external memory I/F) 83, external data storage memory I/F 84, internal data storage memory 85, a wireless communication module 86, a local communication module 87, a real time clock (RTC) 38, an acceleration sensor 89, a gyroscope 90, a power supply circuit 94, and an interface circuit (I/F circuit) 41, in addition to the components described above. These electronic components are mounted on an electronic circuit substrate and accommodated in the lower housing 61 (or in the upper housing 71).

The information processing section 81 is an information processing section including a CPU 811 for executing a predetermined program, a GPU 812 for performing image processes, etc. In the present embodiment, a program for performing a predetermined process is stored in memory (e.g., the external memory 95 connected to the external memory I/F 83, or the internal data storage memory 85) in the hand-held device 9. The CPU 811 of the information processing section 81 executes the program, thereby performing a process according to the program (e.g., an image pickup process, an image display process to be described later, etc.). Note that a program to be executed by the CPU 811 of the information processing section 81 may be acquired from other devices through communication with the other devices. The information processing section 81 includes VRAM 813. The GPU 812 of the information processing section 81 produces an image in accordance with an instruction from the CPU 811 of the information processing section 81, and renders the image in the VRAM 813. The GPU 812 of the information processing section 81 outputs the image rendered in the VRAM 813 to the upper LCD 72 and/or the lower LCD 62, thereby displaying the image on the upper LCD 72 and/or the lower LCD 62. Note that when image data is acquired from the outside (the game apparatus 3), the acquired image data is stored to the VRAM 813, and an image is displayed on the upper LCD 72 and/or the lower LCD 62.

The main memory 82, the external memory I/F 83, the external data storage memory I/F 84, and the internal data storage memory 85 are connected to the information processing section 81. The external memory I/F 83 is an interface for detachably connecting the external memory 95. The external data storage memory I/F 84 is an interface for detachably connecting the external data storage memory 96.

The main memory 82 is a volatile storage section used as a work area and a buffer area for (the CPU 811 of) the information processing section 81. That is, the main memory 82 temporarily stores various data used for the process based on the program, and temporarily stores a program acquired from the outside (the external memory 95, other devices, etc.). In the present embodiment, PSRAM (Pseudo-SRAM) is used as the main memory 82, for example.

The external memory 95 is a non-volatile storage section for storing a program to be executed by the information processing section 81. The external memory 95 is formed by read-only semiconductor memory, for example. When the external memory 95 is connected to the external memory I/F 83, the information processing section 81 can load the program stored in the external memory 95. A predetermined process is performed by executing the program loaded by the information processing section 81. The external data storage memory 96 is formed by non-volatile readable/writable memory (e.g., NAND-type flash memory), and is used for storing predetermined data. For example, the external data storage memory 96 stores images captured by the outer camera 73 and images captured by other devices. When the external data storage memory 96 is connected to the external data storage memory I/F 84, the information processing section 81 can load images stored in the external data storage memory 96, and display the images on the upper LCD 72 and/or the lower LCD 62.

The internal data storage memory 85 is formed by readable/writable non-volatile memory (e.g., NAND-type flash memory), and is used for storing predetermined data. For example, the internal data storage memory 85 stores data and programs downloaded through wireless communication via the wireless communication module 86.

The wireless communication module 86 has a function of connecting to a wireless LAN by a scheme based on the IEEE 802.11.n standard, for example. The local communication module 87 has a function of performing wireless communication with game devices of the same type by a predetermined communication scheme (e.g., a unique protocol or infrared communication). The wireless communication module 86 and the local communication module 87 are connected to the information processing section 81. The information processing section 81 can transmit/receive data to/from other devices via the Internet by using the wireless communication module 86, and can transmit/receive data to/from other game devices of the same type by using the local communication module 87.

In the present embodiment, the game apparatus 3 and the hand-held device 9 communicate with each other via the wireless communication module 86. Also, information processing section 81 includes an unillustrated image decompression section. The image decompression section performs a predetermined decompression process on image data (and sound data) from the wireless communication module 86. Accordingly, when the game apparatus 3 transmits image data (and sound data), the wireless communication module 86 receives the image data and then the image decompression section performs the predetermined decompression process on the received data. The image data subjected to the decompression process is appropriately stored to the VRAM 813 by the CPU 811, and then outputted to the upper LCD 72 and/or the lower LCD 62.

The acceleration sensor 89 is also connected to the information processing section 81. The acceleration sensor 89 detects magnitudes of linear acceleration along the directions of three axes (x-, y-, and z-axes shown in FIG. 8). In the present embodiment, the acceleration sensor 89 is provided inside the lower housing 61. The acceleration sensor 89 detects magnitudes of linear acceleration of the axes, where the x-axis is the long-side direction of the lower housing 61, the y-axis is the short-side direction of the lower housing 61, and the z-axis is the direction vertical to the inner-side surface (main surface) of the lower housing 61. For example, the acceleration sensor 89 may be one of those of types that are available from Analog Devices, Inc. or STMicroelectronics N.V. Note that while the acceleration sensor 89 is assumed to be an electrostatic capacitance type acceleration sensor, for example, other types of acceleration sensors may be used. The acceleration sensor 89 may be an acceleration sensor which performs detection in one or two axial directions. The information processing section 81 acquires data (acceleration data) representing acceleration detected by the acceleration sensor 89 to detect the attitude and the movement of the hand-held device 9.

The gyroscope 90 is connected to the information processing section 81. The gyroscope 90 detects angular rates about three axes, i.e., the x-, y- and z-axes. Any number and combination of gyroscopes may be used for detecting angular rates about the three axes, and similar to the gyroscope unit 6, the gyroscope 90 may include a two-axis gyroscope and a one-axis gyroscope. Alternatively, the gyroscope 90 may be a gyroscope for detection in one axial direction or two axial directions. The information processing section 81 can acquire data (angular rate data) representing the angular rates detected by the gyroscope 90 to detect the attitude and the movement of the hand-held device 9.

As described above, the hand-held device 9 can acquire acceleration data and angular rate data as operation data representing operations performed thereon. Accordingly, by using the hand-held device 9, the player can perform the game operation of moving the hand-held device 9 itself, in addition to conventionally general game operations of pressing operation buttons.

The information processing section 81 is also connected to the RTC 88 and the power supply circuit 94. The RTC 88 counts the time, and outputs it to the information processing section 81. The information processing section 81 calculates the current time (date) based on the time counted by the RTC 88. The power supply circuit 94 controls the power from the power supply (the rechargeable battery described above accommodated in the lower housing 61) of the hand-held device 9, and supplies power to components of the hand-held device 9.

An I/F circuit 91 is connected to the information processing section 81. A microphone 92 and the speaker 93 are connected to the I/F circuit 91. Specifically, the speaker 93 is connected to the I/F circuit 91 via an amplifier, not shown. The microphone 92 detects sound of the user, and outputs a sound signal to the I/F circuit 91. The amplifier amplifies the sound signal from the I/F circuit 91, and outputs the sound from the speaker 93. The touch panel 63 is connected to the I/F circuit 91. The I/F circuit 91 includes a sound control circuit for controlling the microphone 92 and the speaker 93 (amplifier), and a touch panel control circuit for controlling the touch panel. The sound control circuit performs A/D conversion and D/A conversion on a sound signal, or converts a sound signal to sound data of a predetermined format. The touch panel control circuit produces touch position data of a predetermined format based on a signal from the touch panel 63, and outputs it to the information processing section 81. The touch position data represents the coordinates of the position on the input surface of the touch panel 63 at which an input has been made. Note that the touch panel control circuit reads a signal from the touch panel 63 and produces the touch position data once per a predetermined period of time. The information processing section 81 can know the position at which an input has been made on the touch panel 63 by acquiring the touch position data.

An operation button group 64 includes the operation buttons 64A to 64L and the L and R buttons, and is connected to the information processing section 81. Operation button data representing the input status of the operation button group 64 (whether any button has been pressed) is outputted from the operation button group 64 to the information processing section 81. The information processing section 81 acquires the operation data from the operation button group 64 to perform a process in accordance with the input on the operation button group 64.

The analog stick 65 is connected to the information processing section 81, and outputs stick data, which represents the tilting direction and amount of the analog stick 65, to the information processing section 81. The information processing section 81 acquires the stick data from the analog stick 65, and performs a process according to an input with the analog stick 65.

As described above, there are five input means included in the hand-held device 9 as input devices, which are the acceleration sensor 89, the gyroscope 90, the touch panel 63, the operation button group 64, and the analog stick 65. However, in another embodiment, the hand-held device 9 may include any input devices. For example, the hand-held device 9 may include one or more of the five input means. For example, the hand-held device 9 may also include a touch pad or may also include infrared light detection means (an infrared filter 38, a lens 39, a image pickup element 40, and an image processing circuit 41) similar to those of the controller 5.

The second operation data representing operations on the input devices of the hand-held device 9 is transmitted to the game apparatus 3. Here, the second operation data includes acceleration data from the acceleration sensor 89 and angular rate data from the gyroscope 90, in addition to the touch position data, the operation button data, and the stick data as mentioned above. The information processing section 81 wirelessly transmits the second operation data to the hand-held device 9 via the wireless communication module 86. Note that the second operation data is sequentially transmitted from the hand-held device 9 to the game apparatus 3 in predetermined cycles, e.g., in cycles of one frame period or less as in the case of the first operation data being transmitted from the controller 5 to the game apparatus 3.

The lower LCD 62 and the upper LCD 72 are connected to the information processing section 81. The lower LCD 62 and the upper LCD 72 display images in accordance with an instruction from (the CPU 812 of) the information processing section 81. In the present embodiment, it is possible for the information processing section 81 to display a stereoscopic image (stereoscopically viewable image) on the upper LCD 72 using a right-eye image and a left-eye image.

The outer camera 73 and the inner camera 74 are connected to the information processing section 81. The outer camera 73 and the inner camera 74 capture images in accordance with instructions of the information processing section 81, and output data for the captured images to the information processing section 81.

The 3D adjustment switch 75 is connected to the information processing section 81. The 3D adjustment switch 75 transmits to the information processing section 81 an electrical signal in accordance with the position of a slider 25a.

The 3D indicator 76 is connected to the information processing section 81. The information processing section 81 controls lighting of the 3D indicator 76. For example, when the upper LCD 72 is in the stereoscopic display mode, the information processing section 81 lights the 3D indicator 76. This has been descriptive of the internal configuration of the hand-held device 9.

6. Outline of the Game Process

Next, the game process to be executed in the game system of the present embodiment will be outlined. In the present embodiment, the game process will be described by taking as an example a game in which two players manipulate an airplane (and a gun of the airplane) in concert with each other. In the following, a player using the operating device 7 to manipulate the airplane is referred to as a "first player", and a player using the hand-held device 9 to manipulate the gun of the airplane is referred to as a "second player".

Figure 10:
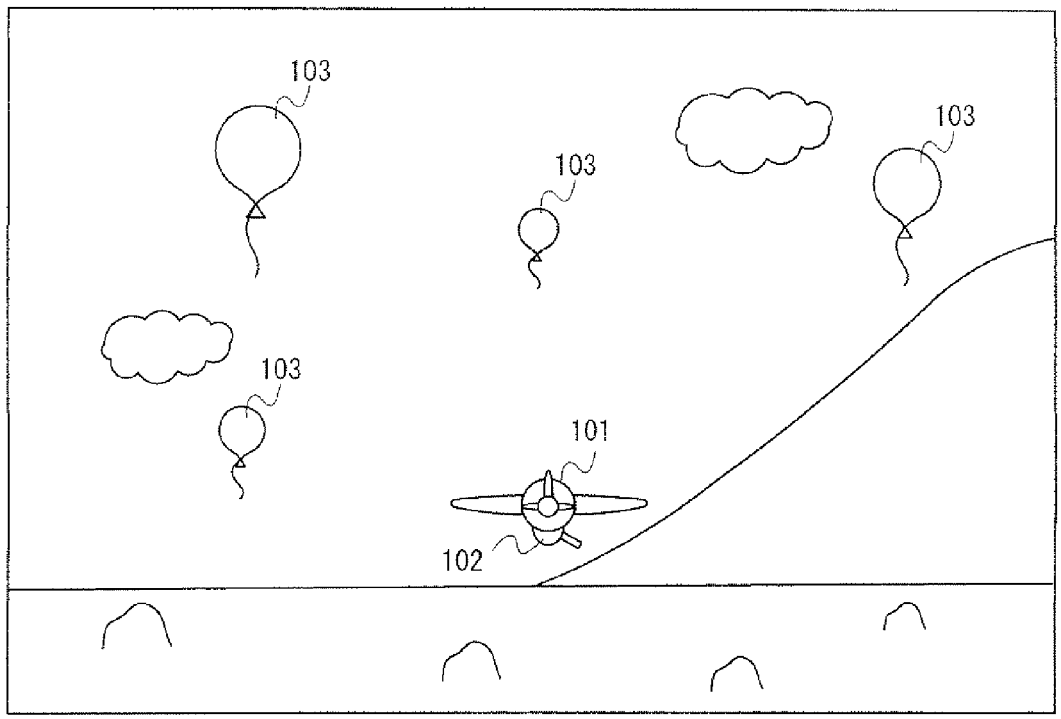
FIG. 10 is a diagram illustrating an exemplary game image (first game image) to be displayed on a television.
Figure 11:
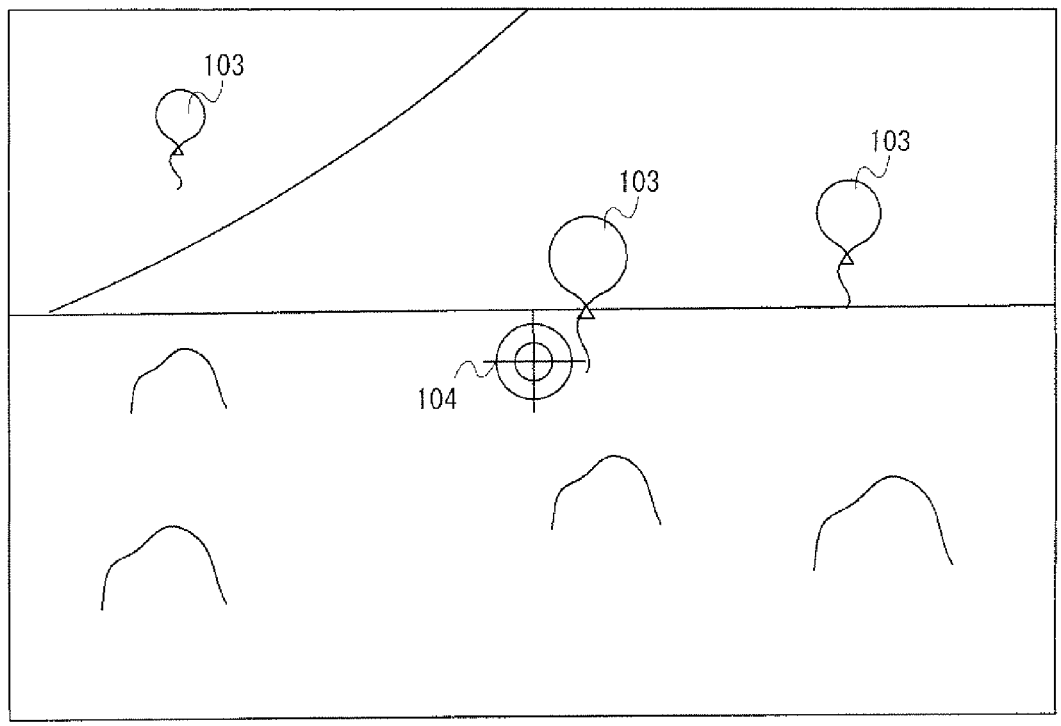
FIG. 11 is a diagram illustrating an exemplary game image (second game image) to be displayed on the hand-held device.

FIG. 10 is a diagram illustrating an exemplary game image (first game image) displayed on the television 2. Also, FIG. 11 is a diagram illustrating an exemplary game image (second game image) displayed on the hand-held device 9. As shown in FIG. 10, in the game of the present embodiment, an airplane (airplane object) 101 and targets (balloon objects) 103 appear in a virtual game space. Also, the airplane 101 has a gun (gun object) 102. The game is to be played by two players manipulating the airplane 101 having the gun 102 to shoot the targets 103 with bullets. In the present embodiment, the first player uses the operating device 7 to perform an operation of moving the airplane 101, and the second player uses the hand-held device 9 to perform operations on the gun 102 (operations to set the shooting direction and shoot bullets). That is, the players play the game in concert with each other with the first player playing the role of moving the airplane 101, and the second player playing the role of shooting the targets 103 with bullets from the gun 102.

Figure 12:
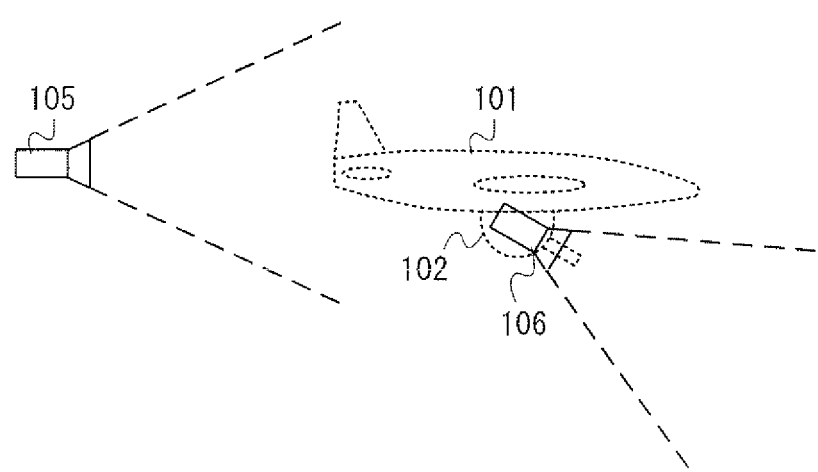
FIG. 12 is a diagram illustrating the positional relationship between an airplane and virtual cameras.

As shown in FIG. 10, a game space image including the airplane 101 is displayed as the first game image. Accordingly, a virtual camera for generating the first game image (referred to as a "first virtual camera") is set so as to generate a game space image as viewed from behind the airplane 101. FIG. 12 is a diagram illustrating the positional relationship between the airplane 101 and virtual cameras. As shown in FIG. 12, the first virtual camera 105 is disposed behind the airplane 101 so as to be oriented to include the airplane 101 within its imaging range (the range of the field of view). In addition, the first virtual camera is controlled to move as the airplane 101 moves. Accordingly, the position and the attitude of the first virtual camera are controlled in accordance with the first player's operation.

On the other hand, as shown in FIG. 11, a game space image as viewed from the position of the airplane 101 (more concretely, the gun 102) is displayed as the second game image. Accordingly, as shown in FIG. 12, the second virtual camera 106 is disposed at the position of the airplane 101 (more concretely, the position of the gun 102). Note that the second virtual camera 106 may be positioned near the airplane 101 or the gun 102 (e.g., slightly behind the gun 102). In this manner, the position of the second virtual camera 106 is controlled by the first player's operation (to move the airplane 101). Accordingly, in the present embodiment, the first virtual camera 105 and the second virtual camera 106 move simultaneously with each other.

Also, as described above, the second player performs operations on the gun 102. As will be described in detail later, the direction of the gun 102 (the direction in which to shoot bullets) is controlled to accord with the attitude of the hand-held device 9. That is, the second player can change the direction of the gun 102 by moving the hand-held device 9 to change its attitude. Also, a game space image as viewed in the shooting direction of the gun 102 is displayed as the second game image. That is, in the present embodiment, the attitude of the second virtual camera is controlled such that its line-of-sight direction accords with the shooting direction of the gun 102. In this manner, the attitude of the second virtual camera is controlled by the second player's operation.

Note that to fire a bullet from the gun 102, the second player presses a predetermined button (e.g., the operation button 64B) of the hand-held device 9. When the predetermined button is pressed, a bullet is fired in a direction pointed at by the gun 102. In the second game image, a sight 104 is displayed at the center of the screen of the lower LCD 62, and the bullet is fired in the direction the sight 104 is aiming at.

When playing this game, the first player manipulates the airplane 101 (e.g., to move toward the desired target 103) while mainly viewing the first game image (FIG. 10) displayed on the television 2. Here, as described above, the airplane 101 moves in response to the first player's operation, and correspondingly, the display range of the game space to be displayed on each display device changes, making it possible for the first player to sufficiently recognize that his/her operation is reflected in game progression.

On the other hand, while mainly viewing the second game image (FIG. 11) displayed on the lower. LCD 62 of the hand-held device 9, the second player points the gun 102 in a desired direction and performs an operation of firing bullets at the target 103. Here, as described above, the gun 102 changes its direction in accordance with the second player's operation and correspondingly, the display range of the game space to be displayed on the hand-held device 9 changes, making it possible for the second player, as with the first player, to sufficiently recognize that his/her operation is reflected in game progression.

As described above, according to the present embodiment, the positions of the first and second virtual cameras are controlled by the first player's operation, and the attitude of the second virtual camera by the second player's operation. That is, in the present embodiment, the virtual cameras change their positions or attitudes in accordance with the players' game operations, so that the display ranges of the game spaces to be displayed on the display devices change. Here, in conventional games where a plurality of players manipulate one object in concert with each other, one player's operation is not fully reflected in game progression, and therefore there might be a possibility where that player finds the game less fun. On the other hand, in the present embodiment, the display ranges of the game spaces to be displayed on the display devices change in accordance with the players' operations, and therefore each player can sufficiently recognize that his/her game operation is fully reflected in game progression, and therefore can thoroughly enjoy the game.

Also, according to the present embodiment, the first player can adjust the display range of the game space to be displayed on the television 2 (and the display range of the game space to be displayed on the hand-held device 9), whereas the second player can adjust the display range of the game space to be displayed on the hand-held device 9. That is, in the present embodiment, two display devices are prepared such that players can change the display ranges of the game spaces to be displayed on the display devices. Thus, each player can freely change the display range so that he/she can readily view the displayed image without worrying about the possibility of causing any trouble to the other player, which makes it possible to provide a game with high operability.

7. Details of the Game Process

Figure 13:
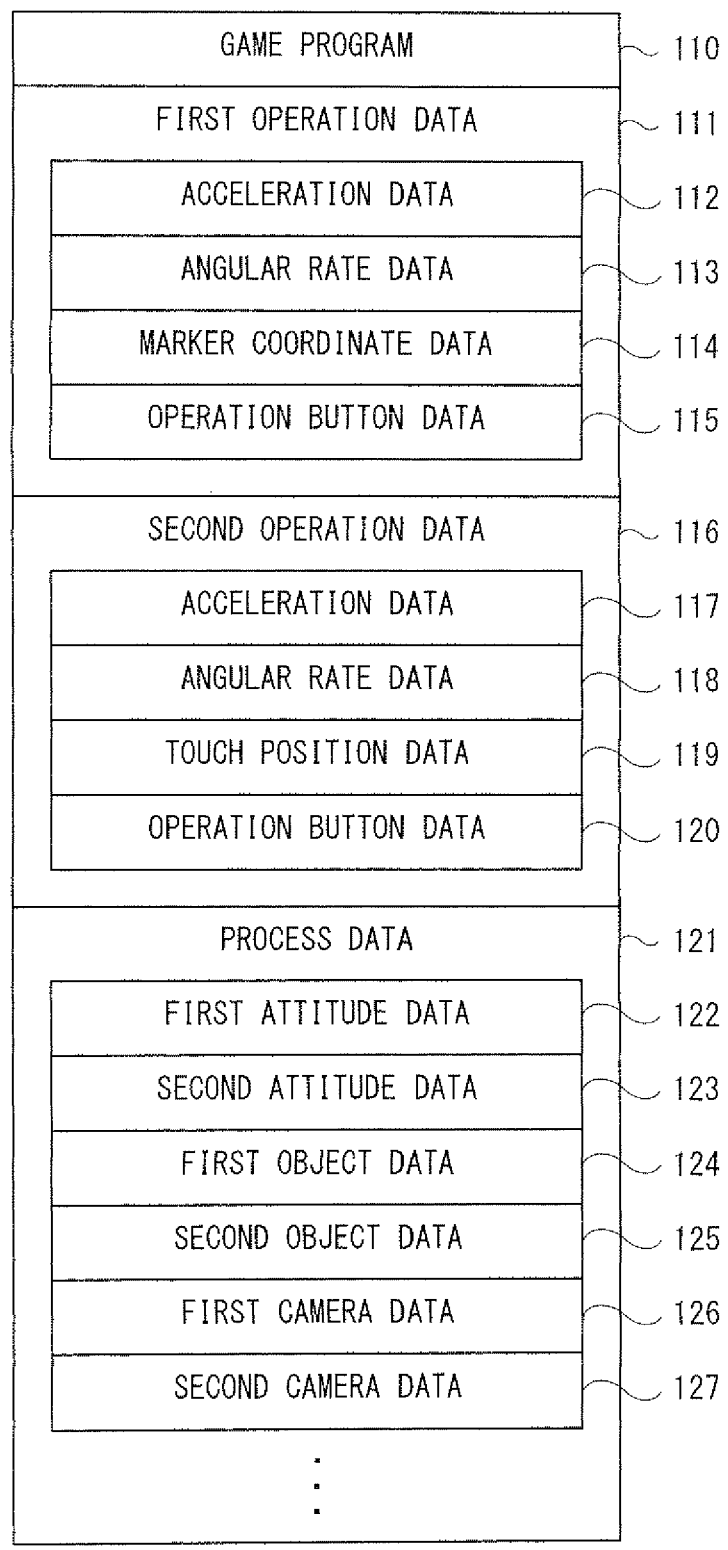
FIG. 13 is a diagram illustrating various types of example data for use in a game process.

Next, the game process to be executed in the present game system will be described in detail. First, various types of data for use in the game process will be described. FIG. 13 is a diagram illustrating the data for use in the game process. In FIG. 13, main data, stored in the main memory (the external main memory 12 or the internal main memory 11e) of the game apparatus 3 is shown. As shown in FIG. 13, the main memory of the game apparatus 3 has stored therein a game program 110, first operation data 111, second operation data 116, and process data 121. Note that in addition to the data shown in FIG. 13, the main memory has stored therein data to be used in the game such as image data for various objects appearing in the game and sound data.

The game program 110 is partially or entirely read from the optical disc 4 at an appropriate time after the power-on of the game apparatus 3, and then stored to the main memory. Note that the game program 110 may be acquired from a device external to the game apparatus 3 (e.g., via the Internet), rather than from the optical disc 4. Also, a portion of the game program 110 (e.g., a program for calculating the attitude of the operating device 7 and/or the attitude of the hand-held device 9) may be prestored in the game apparatus 3.

The first operation data 111 is data representing the user's operation on the operating device 7. The first operation data 111 is transmitted by the operating device 7 and then acquired by the game apparatus 3. The first operation data 111 includes acceleration data 112, angular rate data 113, marker coordinate data 114, and operation button data 115. Note that the main memory may have stored therein the first operation data up to a predetermined number of pieces counted from the latest piece (the last acquired piece).

The acceleration data 112 is data representing acceleration (acceleration vector) detected by the acceleration sensor 37. Here, the acceleration data 112 represents three-dimensional acceleration whose components are acceleration values associated with the directions of three axes, X-, Y-, and Z-axes, shown in FIG. 3, but in another embodiment, the data may represent acceleration associated with any one or more directions.

The angular rate data 113 is data representing angular rates detected by the gyroscopes 55 and 56 in the gyroscope unit 6. Here, the angular rate data 113 represents angular rates about three axes, X-, Y-, and Z-axes, shown in FIG. 3, but in another embodiment, the data may represent an angular rate about each of any one or more axes.

The marker coordinate data 114 is data representing a coordinate point calculated by the image processing circuit 41 of the imaging information calculation section 35, i.e., the data represents the marker coordinate point. The marker coordinate point is expressed by a two-dimensional coordinate system for representing a position in a plane that corresponds to a pickup image, and the marker coordinate data 114 represents coordinate values the two-dimensional coordinate system.

The operation button data 115 is data representing an input state of each of the operation buttons 32a to 32i provided on the operating device 7.

Note that the first operation data 111 may include only part of the data items 112 to 115 so long as the operation by the player using the operating device 7 can be represented. Also, when the operating device 7 includes other input means (e.g., a touch panel, an analog stick, etc.), the first operation data 111 may include data representing operations on those other input means. Note that when the movement of the operating device 7 itself is used as a game operation, as in the present embodiment, the first operation data 111 includes data whose value changes in accordance with the movement of the operating device 7 itself, as in the case of the acceleration data 112, the angular rate data 113, and the marker coordinate data 114.

The second operation data 116 is data representing the user's operation on the hand-held device 9. The second operation data 116 is transmitted by the hand-held device 9 and acquired by the game apparatus 3. The second operation data 116 includes acceleration data 117, angular rate data 118, touch position data 119, and operation button data 120. Note that the main memory may store the second operation data up to a predetermined number of pieces counted from the latest piece (the last acquired piece).

The acceleration data 117 is data representing acceleration (acceleration vector) detected by the acceleration sensor 89. Here, the acceleration data 117 represents three-dimensional acceleration whose components are acceleration values associated with the directions of three axes, X-, Y-, and Z-axes, shown in FIG. 8, but in another embodiment, the data may represent acceleration associated with any one or more directions.

The angular rate data 118 is data representing angular rates detected by the gyroscope 90. Here, the angular rate data 118 represents angular rates about three axes, X-, Y-, and Z-axes, shown in FIG. 8, but in another embodiment, the data may represent an angular rate about each of any one or more axes.

The touch position data 119 is data representing a position at which an input has been made to the input surface of the touch panel 63. Here, the touch position data 119 represents a coordinate value in a two-dimensional coordinate system, which indicates the position in the input surface.

The operation button data 120 is data representing an input state of each of the operation buttons 64A to 64L provided on the hand-held device 9.

Note that the second operation data 116 may simply include only one of the data items 117 to 120 so long as the operation by the player using the hand-held device 9 can be represented. Also, when the hand-held, device 9 includes other input means (e.g., a touch pad, the image pickup means of the operating device 7, etc.), the second operation data 116 may include data representing operations on those other input means. Note that when the movement of the hand-held device 9 itself is used as a game operation, as in the present embodiment, the second operation data 116 may include data whose value changes in accordance with the movement of the hand-held device 9 itself, as in the case of the acceleration data 117 and the angular rate data 118.

Figure 14:
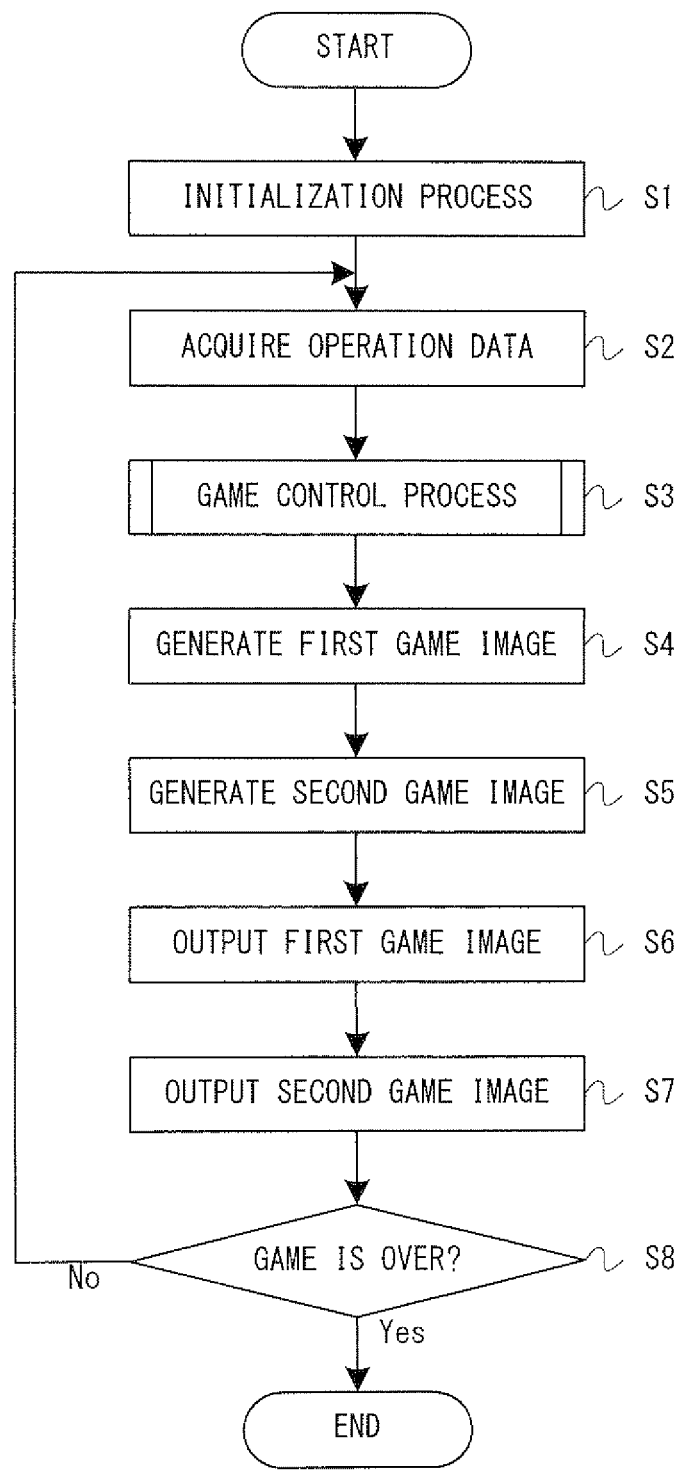
FIG. 14 is a main flowchart showing a flow of an example non-limiting game process to be performed by the example non-limiting game apparatus.

The process data 121 is data to be used in the game process to be described later (FIG. 14). The process data 121 includes first attitude data 122, second attitude data 123, first object data 124, second object data 125, first camera data 126, and second camera data 127. Note that in addition to the data shown in FIG. 13, the process data 121 includes various types of data to be used in the game process, e.g., data representing various parameters being set for various objects (e.g., a target object and a bullet object).

The first attitude data 122 is data representing the attitude of the operating device 7. In the present embodiment, the first attitude data 122 is calculated based on the acceleration data 112 and the angular rate data 113 included in the first operation data 111. The method for calculating the first attitude data 122 will be described later.

The second attitude data 123 is data representing the attitude of the hand-held device 9. In the present embodiment, the second attitude data 123 is calculated based on the acceleration data 117 and the angular rate data 118 included in the second operation data 116. The method for calculating the second attitude data 123 will be described later.

The first object data 124 is data representing the position and the attitude of the airplane (airplane object) 101 to be manipulated by the first player. As will be described in detail later, the first object data 124 is calculated based on the first attitude data 122 such that the travel direction of the airplane 101 changes in accordance with the attitude of the operating device 7. Note that in addition to the position and the attitude of the airplane, the first object data 124 may represent other parameters (e.g., moving speed) being set for the airplane 101.

The second object data 125 is data representing the direction (the bullet shooting direction) of the gun (gun object) 102 to be manipulated by the second player. As will be described in detail later, the second object data 125 is calculated based on the second attitude data 123 such that the direction of the gun 102 corresponds to the attitude of the hand-held device 9.

The first camera data 126 is data representing an arrangement of a first virtual camera for generating a first game image to be displayed on the television 2. Concretely, the first camera data 126 represents the position and the attitude of the first virtual camera in a virtual game space. As will be described in detail later, the first camera data 126 is calculated based on the position of the airplane 101 represented by the first object data 124, such that a first game image, including the airplane 101, is generated. Note that the first camera data 126 may include, for example, data representing the angle of view (the range of the field of view) of the first virtual camera.

The second camera data 127 is data representing an arrangement of a second virtual camera for generating a second game image to be displayed on the lower LCD 62 of the hand-held device 9. Concretely, the second camera data 127 represents the position and the attitude of the second virtual camera in a virtual game space. As will be described in detail later, the second camera data 127 is calculated based on the position of the airplane 101 represented by the first object data 124 and the second attitude data 123, such that a game space image is generated as viewed from the position of the canon 102 in the direction pointed by the canon 102. Note that the second camera data 127 may include, for example, data representing the angle of view (the range of the field of view) of the second virtual camera.

Next, the process to be performed by the game apparatus 3 will be described in detail with reference to FIGS. 14 to 16. FIG. 14 is a main flowchart showing a flow of the process to be performed by the game apparatus 3. When the game apparatus 3 is powered on, the CPU 10 of the game apparatus 3 executes a boot program stored in an unillustrated boot ROM, thereby initializing each unit, including the main memory. The game program stored in the optical disc 4 is loaded to the main memory, and the CPU 10 starts executing the game program. Note that the game apparatus 3 may be configured such that the game program stored in the optical disc 4 is executed immediately after the power-on or such that an internal program for displaying a predetermined menu screen is initially executed after the power-on and then the game program stored in the optical disc 4 is executed when the user provides an instruction to start the game. The flowchart of FIG. 14 illustrates a process to be performed when the processes described above are completed.

Figure 15:
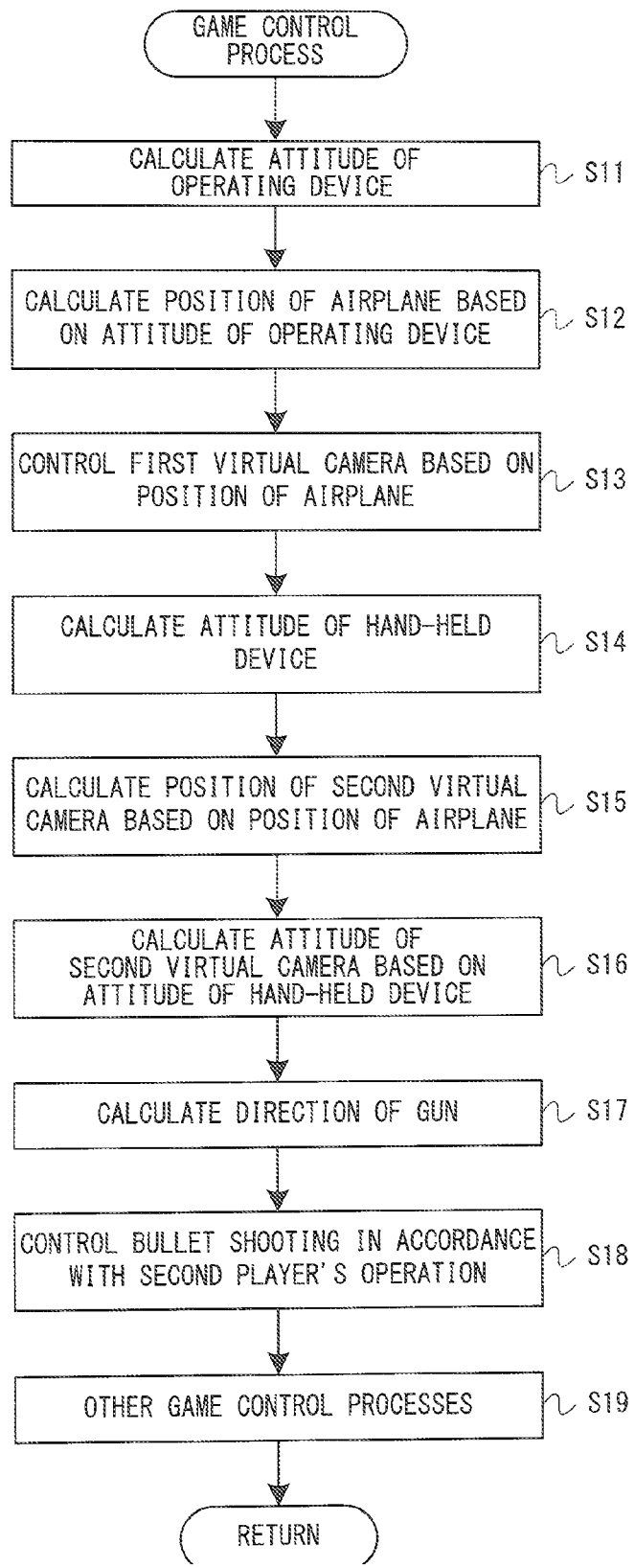
FIG. 15 is a flowchart illustrating a detailed flow of an example non-limiting game control process (step S3) shown in FIG. 14.
Figure 21:
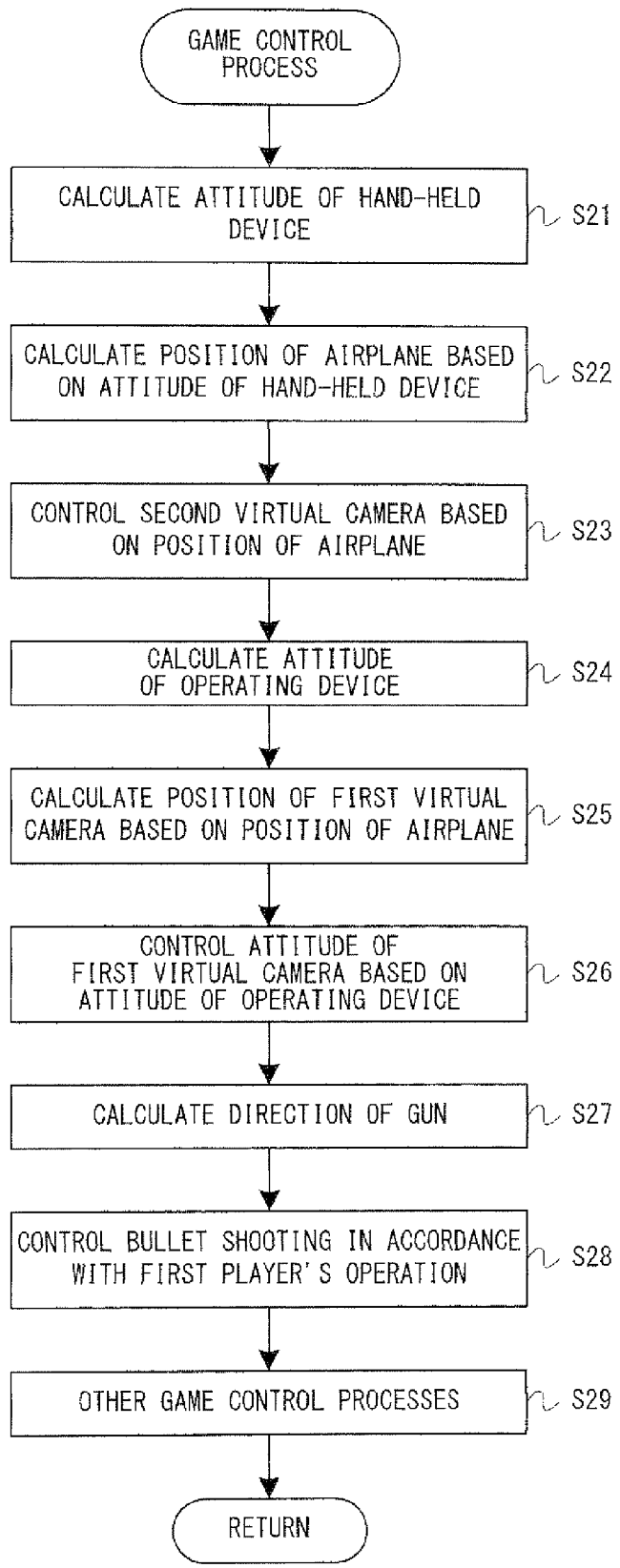
FIG. 21 is a flowchart showing a flow of an example non-limiting game control process in the variant of the embodiment.

Note that processing in each step of the flowcharts shown in FIGS. 14, 15, and 21 is merely illustrative, and if similar results can be achieved, the processing order of the steps may be changed. In addition, values of variables and thresholds to be used in determination steps are also merely illustrative, and other values may be used appropriately. Furthermore, while the present embodiment is described on the premise that the CPU 10 performs processing in each step of the flowcharts, part of the steps in the flowcharts may be performed by a processor other than the CPU 10 or by specialized circuits.

First, in step S1, the CPU 10 performs an initialization process. The initialization process is, for example, a process of constructing a virtual space, placing objects appearing in the virtual space at their initial positions, and setting initial values of various parameters to be used in the game process. Note that in the initialization process of the present embodiment, data representing the initial position and attitude of the airplane 101 is stored to the main memory as first object data 124. Following step S1, the process of step S2 is performed. Thereafter, a process loop including a series of processing in steps S2 to S8 is repeatedly performed once per a predetermined period of time (e.g., one frame period).

In step S2, the CPU 10 acquires operation data from both the operating device 7 and the hand-held device 9. The operating device 7 repeats transmitting data originally outputted from the acceleration sensor 37, the gyroscope unit 6, the imaging information calculation section 35 and the operating section 32, to the game apparatus 3 as first operation data, and therefore the game apparatus 3 sequentially receives the data from the operating device 7 and stores the received data to the main memory as first operation data 111. In step S12, the CPU 10 reads the latest first operation data 111 from the main memory. Also, the hand-held device 9 repeats transmitting data originally outputted from the acceleration sensor 89, the gyroscope 90, the touch panel 63, and the operation button group 64, to the game apparatus 3 as second operation data, and therefore the game apparatus 3 sequentially receives the data from the hand-held device 9, and stores the received data to the main memory as second operation data 116. In step S12, the CPU 10 reads the latest second operation data 116 from the main memory. Following step S2, the process of step S3 is performed.

In step S3, the CPU 10 performs a game control process. The game control process is a process for causing the game to progress by performing, for example, the processing of moving objects in accordance with the players' game operations. In the game of the present embodiment, the game control process is performed based on the players' operations to control, for example, the actions of the airplane 101 and the gun 102 and the positions of the virtual cameras. Hereinafter, referring to FIG. 15, the game control process will be described in detail.

FIG. 15 is a flowchart illustrating a detailed flow of the game control process (step S3) shown in FIG. 14. In the game control process, the CPU 10 initially calculates the attitude of the operating device 7 in step S11. While the attitude of the operating device 7 may be calculated by any method so long as it is calculated based on the first operation data 111, in the present embodiment, it is calculated based on acceleration data 112 and angular rate data 113. Hereinafter, the method for calculating the attitude of the operating device 7 will be described.

First, the CPU 10 calculates the attitude of the operating device 7 based on the angular rate data 113 stored in the main memory. While any method can be employed for calculating the attitude of the operating device 7 based on an angular rate, the attitude is calculated using the last attitude (the last calculated attitude) and the current angular rate (the angular rate acquired by step S2 of the current process loop). Concretely, the CPU 10 calculates the attitude by rotating the last attitude at the current angular rate for a unit time. Note that the last attitude is represented by the first attitude data 122 stored in the main memory, and the current angular rate is indicated by the angular rate data 113 stored in the main memory. Accordingly, the CPU 10 reads the first attitude data 122 and the angular rate data 113 from the main memory, and calculates the attitude of the operating device 7. Data representing the "angular rate-based attitude" thus calculated is stored to the main memory.

Note that in the case where the attitude is calculated based on the angular rate, it is desirable to set an initial attitude. Specifically, in the case where the attitude of the operating device 7 is calculated based on the angular rate, the CPU 10 initially calculates an initial attitude of the operating device 7. The initial attitude of the operating device 7 may be calculated based on acceleration data. Alternatively, with the operating device 7 being set in a specific attitude, the player may perform a predetermined operation, so that the specific attitude at the time of the predetermined operation is used as the initial attitude. Note that in the case where the attitude of the operating device 7 is calculated as an absolute attitude with respect to a predetermined direction in the space where the operating device 7 is located, the initial attitude may be calculated, but in the case, for example, where the attitude of the operating device 7 is calculated as a relative attitude with respect to the attitude of the operating device 7 at the beginning of the game, the initial attitude does not have to be calculated.

Next, the CPU 10 corrects the attitude of the operating device 7 calculated based on the angular rate, based on the acceleration data 112. Concretely, the CPU 10 reads the acceleration data 112 from the main memory, and calculates the attitude of the operating device 7 based on the acceleration data 112. Here, when the operating device 7 is in almost static state, acceleration applied to the operating device 7 and detected by the acceleration sensor 37 represents gravitational acceleration. Accordingly, the direction of the detected gravitational acceleration (the direction of gravity) can be calculated using acceleration data 112 outputted by the acceleration sensor 37, and therefore the direction (attitude) of the operating device 7 with respect to the direction of gravity can be calculated based on the acceleration data 112. In this manner, in the situation where the acceleration sensor 37 detects the gravitational acceleration, the direction (attitude) of the operating device 7 with respect to the direction of gravity can be calculated based on the acceleration data 112. Data representing the "acceleration-based attitude" thus calculated is stored to the main memory.

Once the acceleration-based attitude is calculated, the CPU 10 then corrects the angular rate-based attitude using the acceleration-based attitude. Concretely, the CPU 10 reads the data representing the angular rate-based attitude and the data representing the acceleration-based attitude from the main memory, and performs a correction to cause the attitude based on the angular rate data to approach the attitude based on the acceleration data at a predetermined rate. The predetermined rate may be a predetermined constant or may be set in accordance with, for example, the acceleration indicated by the acceleration data 112. In addition, the acceleration-based attitude cannot be calculated for a rotational direction about the direction of gravity, and therefore the CPU 10 may be configured not to perform a correction related to the rotational direction. In the present embodiment, data representing the post-correction attitude thus obtained is stored to the main memory as first attitude data 122. Following step S11, the process of step S12 is performed.

By the aforementioned process of step S11, the attitude of the operating device 7 is calculated. Here, among other methods for calculating the attitude of the operating device 7, the method using an angular rate makes it possible to calculate the attitude however the operating device 7 is moving. On the other hand, the method using an angular rate calculates the attitude by cumulatively adding angular rates that are sequentially detected, and therefore there is a possibility of poor accuracy due to, for example, error accumulation or poor accuracy of the gyroscope due to a so-called temperature drift problem. Also, the method using acceleration does not cause error accumulation, but when the operating device 7 is being moved vigorously, attitude cannot be calculated with accuracy (because the direction of gravity cannot be detected with precision). In the present embodiment, the aforementioned two characteristically different methods are used, and therefore the attitude of the operating device 7 can be calculated with higher precision. While in the present embodiment, the game apparatus 3 calculates the attitude of the operating device 7 using the above two methods, in another embodiment, the attitude may be calculated using one of the two methods.

Also, in another embodiment, the attitude may be calculated based on marker coordinate data 114 in addition to (or in place of) the acceleration and the angular rate. Alternatively, the attitude calculated based on the acceleration and/or the angular rate may be corrected using the marker coordinate data 114.

Hereinafter, attitude calculation and correction methods based on the marker coordinate data 114 will be described. The marker coordinate data 114 indicates the positions of markers 8R and 8L in a pickup image, and therefore based on these positions, the attitude of the operating device 7 can be calculated for a roll direction (a rotational direction about the Z-axis). Specifically, the attitude of the operating device 7 can be calculated for the roll direction based on the slope of a straight line extending between the positions of the markers 8R and 8L in the pickup image. Also, in the case where the position of the operating device 7 with respect to the marker device 8 can be identified (e.g., in the case where the operating device 7 can be assumed to be positioned in front of the marker device 8), the attitude of the operating device 7 can be calculated for pitch and yaw directions based on the position of the marker device 8 in the pickup image. For example, when the positions of the markers 8R and 8L move left in the pickup image, it is possible to determine that the operating device 7 changes its direction (attitude) to right. In this manner, based on the positions of the markers 8R and 8L, the attitude of the operating device 7 can be calculated for the pitch and yaw directions. In this manner, the attitude of the operating device 7 can be calculated based on the marker coordinate data 114.

Furthermore, in the case where the marker coordinate data 114 is used to correct the acceleration-based attitude and/or the angular rate-based attitude, the CPU 10 performs a correction to cause the acceleration-based attitude and/or the angular rate-based attitude to approach the attitude based on the marker coordinate data 114 at a predetermined rate. The predetermined rate may be a predetermined constant. Also, the correction may be performed simply for one or two directions from among the roll direction, the pitch direction, and the yaw direction. For example, in the case where the marker coordinate data 114 is used, the attitude can be calculated with accuracy for the roll direction, and therefore the CPU 10 may correct only the roll direction using the attitude based on the marker coordinate data 114. Moreover, when the image pickup element 40 of the operating device 7 does not pick up an image of the marker device 8, the attitude based on the marker coordinate data 114 cannot be calculated, and therefore, in this case, the correction process using the marker coordinate data 114 does not have to be performed.

In step S12, the CPU 10 calculates the position and the attitude of the airplane 101 based on the attitude of the operating device 7. In the present embodiment, the travel direction of the airplane 101 is calculated based on the attitude of the operating device 7. Concretely, the travel direction of the airplane 101 is calculated such that the airplane 101 moves straight when the operating device 7 is oriented with its tip (the end in the Z-axis positive direction shown in FIG. 3) pointing in a predetermined front direction, the airplane 101 turns right (left) when the tip points right (left) from the front direction, and the airplane 101 turns up (down) when the tip points upward (downward) from the front direction. In addition, the position of the airplane 101 is calculated by moving the current position of the airplane 101 by a predetermined moving distance in the calculated travel direction. Specifically, in the present embodiment, the moving speed of the airplane 101 is constant, and the travel direction of the airplane 101 is controlled based on the first operation data 111. Note that "the current position of the airplane 101" is represented by the first object data 124 stored in the main memory. Also, the attitude of the airplane 101 is calculated in accordance with the travel direction. Concretely, the attitude of the airplane 101 is calculated to be horizontal when the airplane 101 moves straight, right-side (left-side) down when the airplane 101 turns right (left), and rear-side (front-side) down when the airplane 101 turns upward (downward).

In this manner, in step S12, the CPU 10 reads the first attitude data 122 and the first object data 124 from the main memory, and calculates the travel direction based on the first attitude data 122. Then, the CPU 10 calculates a new position of the airplane 101 based on the calculated travel direction and the position of the airplane 101 that is represented by the first object data 124. Furthermore, the CPU 10 calculates the attitude of the airplane 101 based on the travel direction. Data representing the calculated position and attitude of the airplane 101 is stored to the main memory as first object data 124. Following step S12, the process of step S13 is performed.

Note that in another embodiment, the action of the airplane 101 may be controlled arbitrarily. For example, while in the present embodiment, the moving speed of the airplane 101 is constant, in another embodiment, the CPU 10 may control the moving speed (e.g., depending on whether or not a predetermined button on the operating device 7 has been pressed). Furthermore, the action of the airplane 101 is controlled not necessarily based on the attitude of the operating device 7 but an operation on the operating device 7. For example, in another embodiment, the travel direction of the airplane 101 may be controlled based on an operation on the cross button 32a.

In step S13, the CPU 10 controls the first virtual camera based on the position and the attitude of the airplane 101. In the present embodiment, the first virtual, camera is set such that a game space image with the airplane 101 as viewed from behind is generated (see FIG. 12). Concretely, the CPU 10 reads the first object data 124 from the main memory, and calculates a position at a predetermined distance from the rear of the airplane 101 as the position of the first virtual camera. Furthermore, the CPU 10 also calculates the attitude of the first virtual camera such that the line-of-sight direction matches the direction from the calculated position toward the airplane 101. Then, the CPU 10 stores data representing the calculated position and attitude of the first virtual camera to the main memory as first camera data 126. Following step S13, the process of step S14 is performed.

As described in conjunction with step S13, the first virtual camera is controlled based on the first operation data. Here, in another embodiment, the first virtual camera may be controlled in any arbitrary manner. For example, the first virtual camera may be disposed at the position of the airplane 101 such that a game space image as viewed from the position of the airplane 101 is generated. Alternatively, for example, the first virtual camera may be positioned above the airplane 101 such that an image with the airplane 101 as viewed from above is generated. Note that in the case where, as in the present embodiment, the second game image is a so-called first-person perspective image and does not include the airplane 101, it might be difficult to comprehend situations around the airplane 101 simply from the second game image. Therefore, to allow each player to comprehend situations around the airplane 101, the first virtual camera may be controlled such that a first game image including the airplane 101 is generated.

In step S14, the CPU 10 calculates the attitude of the hand-held device 9. The attitude of the hand-held device 9 may be calculated by any method so long as it is calculated based on the second operation data 116. In the present embodiment, the attitude of the hand-held device 9 is calculated in the same manner as the attitude of the operating device 7. Specifically, the CPU 10 initially calculates the attitude of the hand-held device 9 by reading the second attitude data 123 and the angular rate data 118 from the main memory and rotating the previous attitude with the current angular rate for a unit time. Then, the CPU 10 reads the acceleration data 117 from the main memory, and calculates the attitude of the hand-held device 9 based on the acceleration data 117. Furthermore, the CPU 10 performs a correction such that an attitude based on the angular rate data 118 approaches the attitude based on the acceleration data 117 at a predetermined rate, thereby calculating the final attitude of the hand-held device 9. Thereafter, data representing the attitude thus corrected and calculated is stored to the main memory as second attitude data 123. Following step S14, the process of step S15 is performed.

In step S15, the CPU 10 calculates the position of the second virtual camera based on the position of the airplane 101. In the present embodiment, the second virtual camera is disposed at a position determined by the position of the airplane 101, concretely, at the position of the gun 102. Specifically, the CPU 10 reads the first object data 124 from the main memory and calculates the position of the gun 102 based on the position of the airplane 101 as the position of the second virtual camera. Note that in another embodiment, the position of the second virtual camera may be determined in an arbitrary manner, and for example, the second virtual camera may be positioned at a predetermined distance behind the gun 102. Furthermore, in the present embodiment, the second game image is a first-person perspective image, and therefore the gun 102 is not displayed in the second game image, but in another embodiment, the position of the second virtual camera may be set such that an image with the gun 102 as viewed from behind is generated. Following step S15, the process of step S16 is performed.

In step S16, the CPU 10 calculates the attitude of the second virtual camera based on the attitude of the hand-held device 9. Specifically, the CPU 10 reads the second attitude data 123 from the main memory, and calculates the attitude of the second virtual camera based on the second attitude data 123. In the present embodiment, the attitude of the second virtual camera is calculated so as to correspond to the attitude of the hand-held device 9. Hereinafter, referring to FIG. 16, a method for calculating the attitude of the second virtual camera based on the attitude of the hand-held device 9 will be described.

FIG. 16 is a diagram illustrating the relationship between the attitude of the hand-held device 9 and the attitude of the second virtual camera. In FIG. 16, vectors V1 to V3 represent attitudes of the hand-held device 9, concretely, they represent directions toward the front of the hand-held device 9 (the directions pointing at the screen of the lower LCD 62 perpendicularly from the front to back side thereof). Also, three vectors v1 to v3 represent attitudes of the second virtual camera 106, concretely, they represent line-of-sight directions (image shooting directions) of the second virtual camera 106.

The top column of FIG. 16 indicates a case where the hand-held device 9 is in a predetermined reference attitude. Any attitude can be set as the reference attitude of the hand-held device 9, for example, so long as vector V1 horizontally points to the television 2 (with the right-to-left direction of the hand-held device 9 (i.e., the x-axis direction shown in FIG. 8) pointing horizontally). When the hand-held device 9 is in the reference attitude, the second virtual camera 106 is also in the reference attitude. Any attitude can be used as the reference attitude of the second virtual camera 106, so long as the attitude is in a predetermined direction in the game space. Specifically, in the present embodiment, when the hand-held device 9 is in the reference attitude, the attitude of the second virtual camera 106 is calculated such that the second virtual camera 106 faces a certain direction (i.e., the aforementioned predetermined direction) in the game space.

Also, the attitude of the second virtual camera 106 is set to an attitude in which the second virtual camera 106 in the reference attitude is rotated in a direction and an amount corresponding to the rotation of the hand-held device 9 from the reference attitude. For example, the attitude is calculated such that, when the hand-held device 9 in the reference attitude is rotated to the right as shown in the middle column of FIG. 16, the second virtual camera 106 turns right from the reference attitude. In addition, although not shown, when the hand-held device 9 in the reference attitude is rotated to the left, the attitude is calculated such that the second virtual camera 106 turns left from the reference attitude. Note that in the foregoing, turning "right" and "left" refers to rotational directions as viewed in a vertically downward direction in the real or virtual space.

Also, when the hand-held device 9 in the reference attitude turns downward, as shown in the bottom column of FIG. 16, the attitude is calculated such that the second virtual camera 106 in the reference attitude turns downward. Moreover, although not shown, when the hand-held device 9 in the reference attitude turns upward, the attitude is calculated such that the second virtual camera 106 in the reference attitude turns upward. Furthermore, although not shown, when the hand-held device 9 in the reference attitude turns about an axis perpendicular to the screen of the lower LCD 62, the attitude is calculated such that the second virtual camera 106 in the reference attitude turns about an axis perpendicular to the line-of-sight direction. In this manner, in the present embodiment, the attitude of the second virtual camera 106 is calculated such that the attitude of the second virtual camera 106 in the virtual space matches the attitude of the hand-held device 9 in the real space.

Note that, in another embodiment, the attitude of the second virtual camera 106 does not always match the attitude of the hand-held device 9, and the attitude of the second virtual camera 106 may be calculated so as to change in accordance with the attitude of the hand-held device 9. Specifically, the amount of rotation of the second virtual camera 106 might not always match the amount of rotation of the hand-held device 9, and with the amount of rotation of the second virtual camera 106 being set to be greater than the amount of rotation of the hand-held device 9, the second virtual camera 106 may be sufficiently controlled by simply moving the hand-held device 9 to a slight degree. In addition, by setting the amount of rotation of the second virtual camera 106 to be less than the amount of rotation of the hand-held device 9, it may become possible for the player to finely adjust the direction of the second virtual camera 106. Moreover, the attitude of the second virtual camera 106 may be limited, for example, such that the line-of-sight direction and the vertically upward direction in the game space make an angle of a predetermined value or more (so as not to angle the second virtual camera 106 excessively upward).

Also, in the present embodiment, the attitude of the second virtual camera 106 is calculated so as to be a specific reference attitude when the attitude of the hand-held device 9 is the reference attitude. Specifically, when the hand-held device 9 takes a specific attitude in the real space, the attitude of the second virtual camera is fixed within the virtual space. Accordingly, in the process of step S16, a predetermined attitude which is fixed within the game space is set as the reference attitude (of the second virtual camera 106), and the degree and direction of tilt from the reference attitude are determined in accordance with the second operation data 116.

Here, in another embodiment, the CPU 10 may set an attitude determined based on the first operation data 111 as the reference attitude of the second virtual camera 106. For example, the CPU 10 may set the attitude of the airplane 101 as the reference attitude. As a result, the attitude of the second virtual camera can be calculated using the attitude of the airplane 101 as a reference, and the attitude of the second virtual camera can change in accordance with not only the attitude of the hand-held device 9 but also the attitude of the airplane 101. Note that such an attitude can be calculated by converting the attitude calculated in step S16 (using the predetermined attitude as a reference) into an attitude using the attitude of the airplane 101 as a reference. Concretely, when the attitude calculated in step S16 is expressed by a rotation matrix which represents a rotation using the predetermined attitude as a reference, the CPU 10 can calculate "the attitude using the attitude of the airplane 101 as a reference" by rotating the attitude of the airplane 101 with the rotation matrix.

As in the present embodiment, when an attitude fixed within the game space is set as the reference attitude, the attitude of the second virtual camera is determined independently of the attitude of the airplane 101, and therefore the second player can readily change the attitude of the second virtual camera to a desired attitude. On the other hand, the attitude of the airplane 101 is set as the reference attitude, the attitude of the second virtual camera changes as the attitude of the airplane 101 changes, and therefore while viewing the second game image, the second player can play the game with the feeling as if he/she were actually riding in the airplane 101, which makes it possible to enhance the realistic feel of the game.

By the processes of steps S15 and S16, the position and the attitude of the second virtual camera 106 are calculated. Data representing the calculated position and attitude of the second virtual camera 106 is stored to the main memory as second camera data 127. In the present embodiment, the position of the second virtual camera 106 is calculated based on the position of the airplane 101 that has been calculated based on the first operation data 111, and therefore is controlled based on the first operation data 111. Furthermore, the attitude of the second virtual camera 106 is calculated based on the attitude of the hand-held device 9 that has been calculated based on the second operation data 116, and therefore is controlled based on the second operation data 116. Following step S16, the process of step S17 is performed.

In step S17, the CPU 10 calculates the position and the direction of the gun 102. In the present embodiment, the position of the gun 102 is set at the position of the second virtual camera 106. In addition, the direction of the gun 102 is calculated so as to match the line-of-sight direction of the second virtual camera 106. Accordingly, the CPU 10 reads the second camera data 127 from the main memory, and calculates the position of the gun 102 based on the position of the second virtual camera 106 and also the direction of the gun 102 based on the attitude of the second virtual camera 106. Note that the direction of the gun 102 can be calculated based on the second attitude data 123. Data representing the calculated direction of the gun 102 is stored to the main memory as second object data 125. Following step S17, the process of step S18 is performed.

In step S18, the CPU 10 controls bullet firing in accordance with the second player's operation. In the present embodiment, when a predetermined button (e.g., the operation button 64B) of the hand-held device 9 is pressed, the CPU 10 controls the gun 102 to fire a bullet. Specifically, the CPU 10 reads the operation button data 120 included in the second operation data 116 from the main memory, and refers to the operation button data 120 to determine whether or not the predetermined button has been pressed. If the predetermined button has been pressed, the CPU 10 then generates a new bullet (bullet object) for the gun 102, and moves the bullet at a predetermined moving speed in a direction from the position of the gun 102 toward a position pointed at by the gun 102. On the other hand, if the predetermined button has not been pressed, the CPU 10 does not perform any process. Following step S18, the process of step S19 is performed.

In step S19, the CPU 10 performs other game control processes. The other game control processes include, for example, processes for controlling actions of objects (targets and fired bullets) other than the airplane 101, determining whether or not bullets have hit (contacted) targets, and calculating points. Game data (e.g., data representing positions of the objects as mentioned above and data representing points) resulting from the other game control processes is stored to the main memory. After step S19, the CPU 10 ends the game control process.

In the game control process, the action of the predetermined object (airplane 101) arranged in the game space is controlled based on the first operation data 111 (steps S11 and S12), and furthermore, the second virtual camera is controlled to be situated at a position determined by the position of the object (step S15). As a result, the first player can manipulate the object, and the display range of the game space represented by the second game image changes in accordance with movement of the object. Therefore, the game control process makes it possible to realize a game to be played by two players in concert with each other, in which the first player moves an object and the second player performs a predetermined game operation (here, a shooting operation) while viewing the game space from the viewpoint which moves together with the object. Moreover, in the present embodiment, since the range to be displayed on the lower LCD 62 can be changed by the second player him/herself changing the direction of the second virtual camera (step S16), the second player's operation can be fully reflected in game progression, so that not only the first player moving the object but also the second player can perform active game operations.

Note that in the present embodiment, the second operation data 116 does not affect control over the first virtual camera, but in another embodiment, the first virtual camera may be controlled based on the first operation data 111 as well as the second operation data 116.

Returning to the description of FIG. 14, the process of step S4 is performed following the game control process. In step S4, the CPU 10 and the GPU 11b collaborate to generate a first game image. Specifically, the CPU 10 and the GPU 11b collaborate to read the first camera data 126 from the main memory and generate a game space image as viewed from the first virtual camera (a game space image as viewed from the position of the first virtual camera and in the attitude of the first virtual camera) as the first game image. In the present embodiment, a game space image with the airplane 101 being viewed from behind is generated as the first game image (see FIG. 10). The generated first game image is stored to the VRAM 11d. Following step S4, the process of step S5 is performed.

In step S5, the CPU 10 and the CPU 11b collaborate to generate a second game image. Specifically, the CPU 10 and the GPU 11b collaborate to read the second camera data 127 from the main memory and generate a game space image as viewed from the second virtual camera (a game space image as viewed from the position of the second virtual camera and in the attitude of the second virtual camera) as the second game image. In the present embodiment, a game space image as viewed in a direction from the position of the airplane 101 (the gun 102) toward a position pointed at by the gun 102 with a sight 104 superimposed thereon is generated as the second game image (see FIG. 11). The generated second game image is stored to the VRAM 11d. Note that in the present embodiment, the gun 102 is not rendered when generating the second game image, so that the generated second game image does not include any image of the gun 102. Following step S5, the process of step S6 is performed.

In step S6, the CPU 10 outputs the first game image generated in step S4 to the television 2. Concretely, the CPU 10 sends image data for the first game image stored in the VRAM 11d to the AV-IC 15, and the AV-IC 15 outputs the image data to the television 2 via the AV connector 16. As a result, the first game image is displayed on the television 2. Following step S6, the process of step S7 is performed.

In step S7, the CPU 10 outputs the second game image generated in step S5 to the hand-held device 9. Concretely, the CPU 10 sends image data for the second game image stored in the VRAM 11d to the image compression section 27, and the image compression section 27 performs a predetermined compression process on the data before the high-speed wireless communication module 28 transmits the data to the hand-held device 9 via the antenna 29. The hand-held device 9 receives the image data transmitted from the game apparatus 3 at the wireless communication module 86, and causes the image decompression section to perform a predetermined decompression process on the received image data. The CPU 811 outputs the decompressed image data to the lower LCD 62 after appropriately storing the data to the VRAM 813. As a result, the second game image is displayed on the lower LCD 62. Following step S7, the process of step S8 is performed.

In step S8, the CPU 10 determines whether or not to end the game. The determination of step S7 is made based on, for example, whether or not the game is over or the player has provided an instruction to cancel the game. When the determination result of step S8 is negative, the process of step S2 is performed again. On the other hand, when the determination result of step S8 is affirmative, the CPU 10 ends the game process shown in FIG. 14. Thereafter, a series of processes of steps S2 to S9 are repeated until a determination to end the game is made in step S8.

The game process allows the first player to change the display ranges of the game spaces to be displayed on the screens of the television 2 and the hand-held device 9 by manipulating the operating device 7, and also allows the second player to change the display range of the game space to be displayed on the screen of the hand-held device 9 by manipulating the hand-held device 9. Accordingly, in the present embodiment, the display ranges on the display devices change in accordance with the players' operations, and therefore the players' operations can be fully reflected in game progression.

8. Other Embodiments (Variant Related to Game Operations Using the Touch Panel)

The above embodiment has been described with respect to the case where the CPU 10 performs the game control process using the acceleration data 117, the angular rate data 118, and the operation button data 120. Here, in another embodiment, in addition to (or in place of) the aforementioned data, the touch position data 119 provided from the touch panel 63 and stored in the hand-held device 9 may be used in the game control process. Specifically, the CPU 10 may calculate a position in the game space that corresponds to a touch position represented by the touch position data 119, and perform the game process based on the calculated position. For example, in the game control process of the above embodiment, the CPU 10 may cause the gun 102 to fire bullets in a direction toward a position corresponding to a touch position. Concretely, in place of the process of step S18, the CPU 10 may perform the following process. Hereinafter, the alternative variant process to step S18 will be described with reference to FIG. 17.

Figure 17:
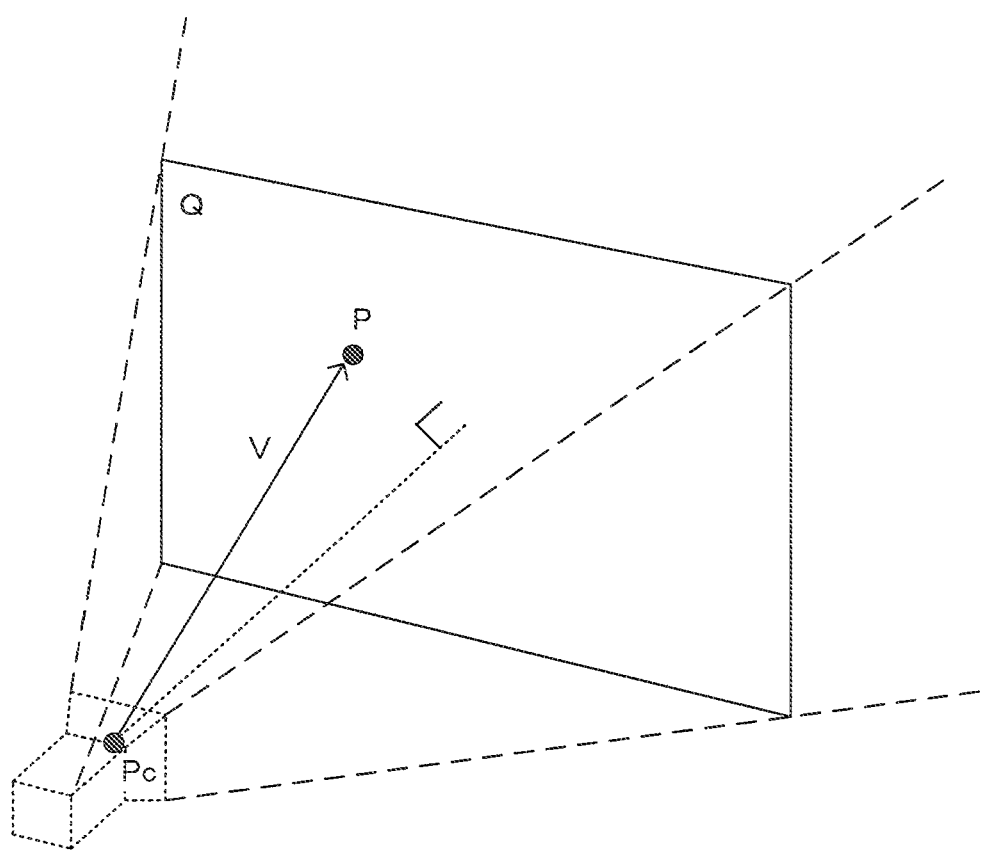
FIG. 17 is a diagram illustrating an arrangement of the second virtual camera and a predetermined plane within a game space.

FIG. 17 is a diagram illustrating an arrangement of the second virtual camera and a predetermined plane within the game space. In FIG. 17, plane Q is a plane within the game space which corresponds to an input surface of the touch panel 63. Plane Q is positioned at a predetermined distance from the position Pc of the second virtual camera 106 so as to be perpendicular to the line-of-sight direction of the second virtual camera 106. In addition, plane Q is disposed with its boundary coinciding with the range of field of view of the second virtual camera 106 at its outer edges. Point P is a point in plane Q which represents a point corresponding to a touch position, i.e., a position in plane Q which is displayed at a touch position on the screen of the lower LCD 62.

In the present variant, when an input is made to the touch panel 63, the CPU 10 calculates the position of point P in plane Q based on the touch position represented by the touch position data 119. Then, the CPU 10 calculates vector V which starts at the position Pc of the second virtual camera 106 and ends at point P. Bullets are fired in the direction represented by vector V. In this manner, bullets can be fired in a direction corresponding to a touch position. Note that when no input is made to the touch panel 63, the CPU 10 does not perform the process for firing bullets.

In the variant as described above, the second player changes the display range of the game space to be displayed as the second game image (by changing the attitude of the hand-held device 9), and touches an arbitrary position within the display range, thereby making it possible to fire bullets toward the touch position. Thus, the second player can more readily perform the operation of firing bullets in a desired direction, which leads to improved operability of the game.

(Variant Related to Game Images)

Figure 18:
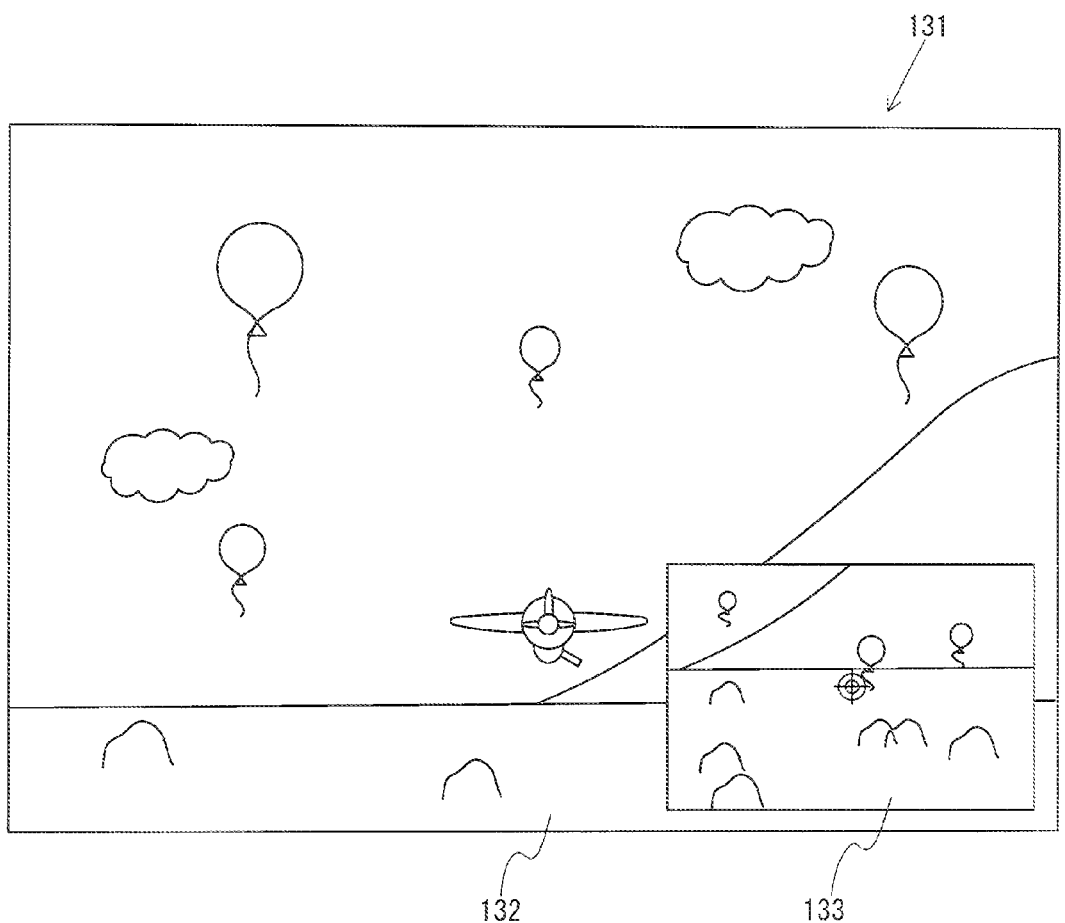
FIG. 18 is a diagram illustrating an exemplary first game image in a variant of the embodiment.

In the above embodiment, the first game image to be displayed on the television 2 is a game image representing the game space as viewed from the first virtual camera. Here, in another embodiment, the CPU 10 may generate as the first game image a game image representing the game space as viewed from the first virtual camera and having the second game image superimposed on a part thereof. FIG. 18 is a diagram illustrating an exemplary first game image in a variant of the above embodiment. As shown in FIG. 18, the first game image may be a game image 131 with a second game image 133 superimposed on a part of a game image 132 representing the game space as viewed from the first virtual camera. While in FIG. 18, the second game image 133 is superimposed in the right corner of the screen of the television 2, the position and the size of the second game image 133 may be arbitrary. In the present variant, the first player can also readily view the second game image, and therefore the first player can readily comprehend the situation of the second player's game operation. Thus, as in the above embodiment, it becomes possible to facilitate easy game operations in a game to be played by players in concert with each other.

(Variant Related to Game Images to be Displayed on the Display Devices)

The above embodiment has been described with respect to the game in which the players control the position and the attitude of the second virtual camera. Specifically, in the above embodiment, the first player controls the position of the second virtual camera, and the second player controls the attitude of the second virtual camera. Here, in another embodiment, the players may control the position and the attitude of the first virtual camera. Concretely, the second player may control the position of the first virtual camera, and the first player may control the attitude of the first virtual camera. Hereinafter, referring to FIGS. 19 to 21, a variant will be described where the players control the position and the attitude of the first virtual camera.

Figure 19:
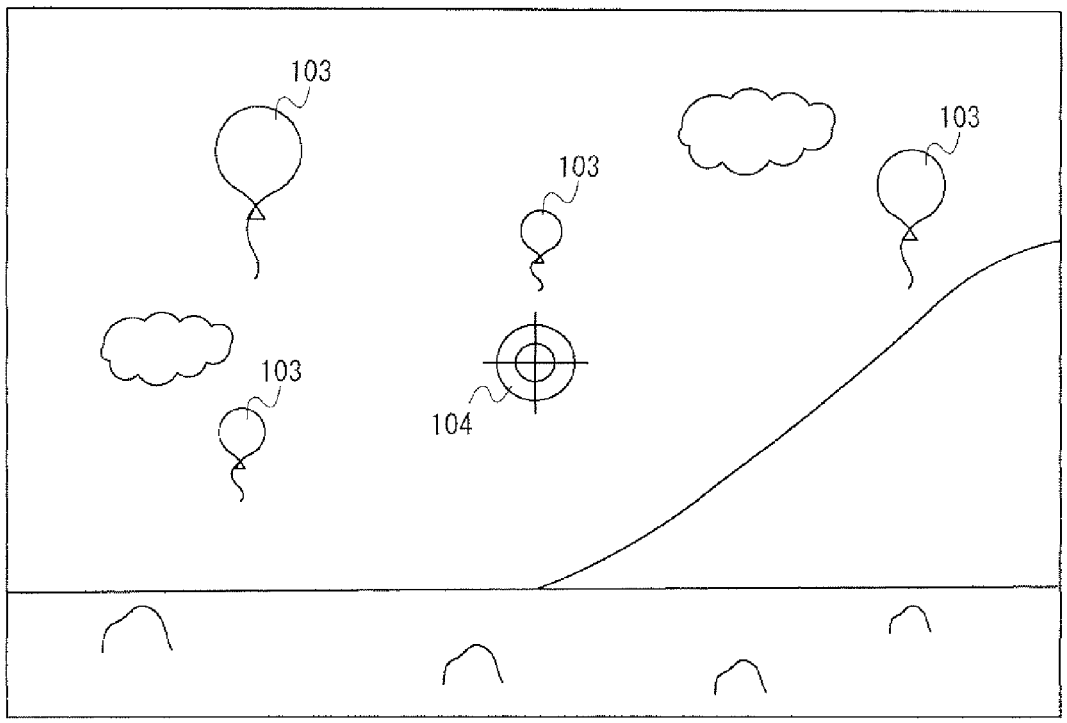
FIG. 19 is a diagram illustrating an exemplary first game image to be displayed on a television in another variant of the embodiment.
Figure 20:
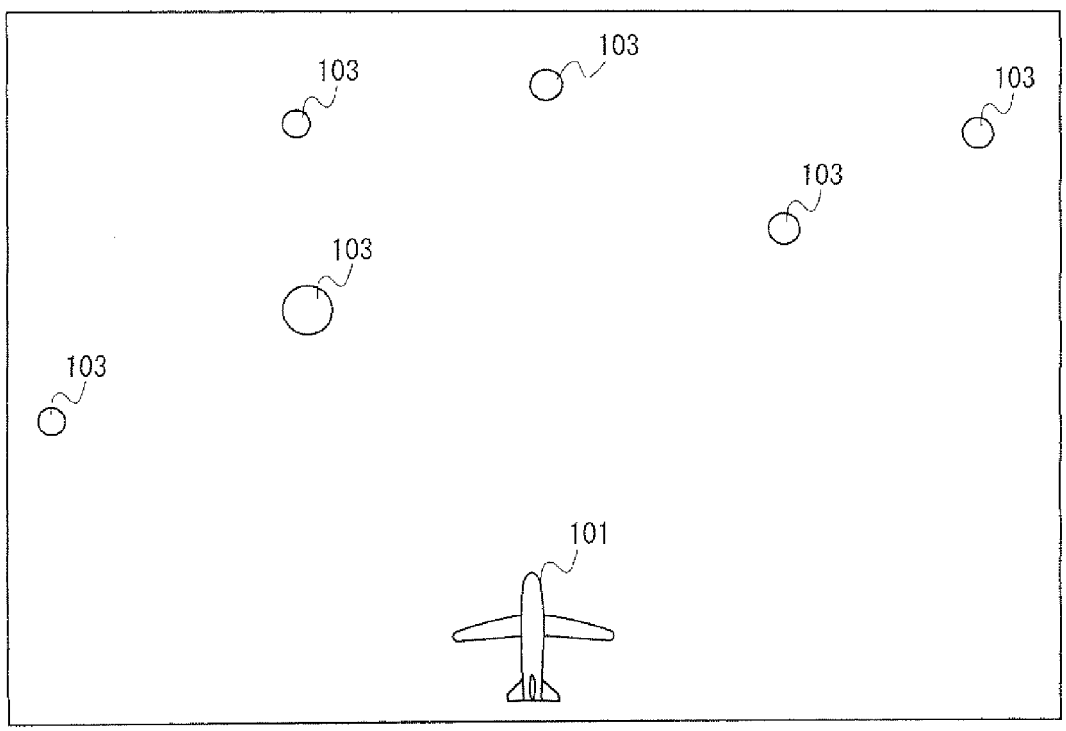
FIG. 20 is a diagram illustrating an exemplary second game image to be displayed on an example non-limiting hand-held device in the variant of the embodiment.

FIG. 19 is a diagram illustrating an exemplary first game image to be displayed on the television 2 in a variant of the above embodiment. Also, FIG. 20 is a diagram illustrating an exemplary second game image to be displayed on the hand-held device 9 in the variant. As shown in FIG. 19, in the present variant, the television 2 displays a game image similar to the second game image in the above embodiment. Specifically, the television 2 displays a game space image as viewed from the position of the airplane 101 (more concretely, the gun 102) as the first game image.

Furthermore, as shown in FIG. 20, in the present variant, a game space image including the airplane 101 and targets 103, as in the first game image in the above embodiment, is displayed as the second game image. Note that in the present variant, a game space image with the airplane 101 viewed from above is generated as the second game image, but a game space image with the airplane 101 viewed from behind, as in the first game image in the above embodiment, may be generated as the second game image.

Also, as will be described in detail later, in the present variant, the second player manipulates the airplane 101, and the action of the airplane 101 is controlled based on the second operation data 116. Specifically, the position of the first virtual camera (and also the position of the second virtual camera) is controlled based on the second operation data 116. On the other hand, the first player adjusts the direction of the gun 102, and the direction of the gun 102 is controlled based on the first operation data 111. Therefore, the attitude of the first virtual camera is controlled based on the first operation data 111. In this manner, in the present variant, the players roles are reversed from the above embodiment, such that the second player plays the role of moving the airplane 101, and the first player plays the role of firing bullets from the gun 102 to hit targets 103.

FIG. 21 is a flowchart showing a flow of the game control process in the present variant. Note that in the present variant, the general flow of the game process is the same as the process shown in FIG. 14 and therefore the description thereof will be omitted. Hereinafter, the game control process of the present variant will be described mainly focusing on differences from the above embodiment.

In the game control process of the present variant, the CPU 10 initially calculates the attitude of the hand-held device 9 in step S21. The process of step S21 is the same as that of step S14. Following step S21, the process of step S22 is performed.

In step S22, the CPU 10 calculates the position and the attitude of the airplane 101 based on the attitude of the hand-held device 9. The method for calculating the position and the attitude of the airplane 101 is the same as the calculation method in step S12, except that the attitude of the hand-held device 9 is used in place of the attitude of the operating device 7. Also, as in the above embodiment, the action of the airplane 101 may be controlled in an arbitrary manner. For example, in the present variant, since a game space image with the airplane 101 viewed from above is displayed on the lower LCD 62 as the second game image, the CPU 10 may control the action of the airplane 101 such that the airplane 101 moves up and down and right to left on the screen of the lower LCD 62 in accordance with an instruction inputted with the up, down, right or left key of the cross button 64A on the hand-held device 9. Following step S22, the process of step S23 is performed.

In step S23, the CPU 10 controls the second virtual camera based on the position and the attitude of the airplane 101. In the present variant, the second virtual camera is set such that a game space image with the airplane 101 viewed from above is generated (see FIG. 20). Concretely, the CPU 10 reads the first object data 124 from the main memory, and calculates a position at a predetermined distance above the airplane 101 as the position of the second virtual camera. In addition, the attitude of the second virtual camera is calculated such that the line-of-sight direction is a direction from the calculated position toward the airplane 101. Thereafter, data representing the calculated position and attitude of the second virtual camera is stored to the main memory as second camera data 127. Note that in another embodiment, the second virtual camera may be controlled in an arbitrary manner, and for example, the second virtual camera may be controlled such that a game space image with the airplane 101 viewed from behind is generated, as in the above embodiment. Following step S23, the process of step S24 is performed.

In step S24, the CPU 10 calculates the attitude of the operating device 7. The process of step S24 is the same as that of step S11. Following step S24, the process of step S25 is performed.

In step S25, the CPU 10 calculates the position of the first virtual camera based on the position of the airplane 101. In the present variant, the first virtual camera is arranged at a position determined by the position of the airplane 101, concretely, it is arranged at the position of the gun 102. Accordingly, the method of step S25 for calculating the position of the first virtual camera may be the same as the method of step S15 for calculating the position of the second virtual camera. Furthermore, in another embodiment, the position of the first virtual camera may be determined arbitrarily. For example, the first virtual camera may be positioned at a predetermined distance behind the gun 102, or the position of the first virtual camera may be set such that an image with the gun 102 viewed from behind is generated. Following step S25, the process of step S26 is performed.

In step S26, the CPU 10 calculates the attitude of the first virtual camera based on the attitude of the operating device 7.

The method for calculating the attitude of the first virtual camera is the same as the method of step S16 for calculating the attitude of the second virtual camera, except that the attitude of the operating device 7 is used in place of the attitude of the hand-held device 9. In addition, as in the case where the attitude of the second virtual camera is calculated in step S16, the attitude of the first virtual camera may be calculated arbitrarily so long as it is calculated so as to change in accordance with the attitude of the operating device 7. Following step S26, the process of step S27 is performed.

Data representing the position and the attitude of the first virtual camera which are calculated by the processes of steps S25 and S26 is stored to the main memory as first camera data 126. In the present variant, the position of the first virtual camera is controlled based on the second operation data 116 since it is calculated based on the position of the airplane 101 which is calculated based on the second operation data 116. In addition, the attitude of the first virtual camera is controlled based on the first operation data 111 since it is calculated based on the attitude of the operating device 7 which is calculated based on the first operation data 111.

In step S27, the CPU 10 calculates the direction of the gun 102. In the present variant, the direction of the gun 102 is calculated so as to match the line-of-sight direction of the first virtual camera. Accordingly, the process of step S27 can be performed in the same manner as the process of step S17, except that the first camera data 126 is used in place of the second camera data 127. Following step 627, the process of step 628 is performed.

In step S28, the CPU 10 controls bullet firing in accordance with the first player's operation. In the present variant, when a predetermined button (e.g., the A button 32d) on the operating device 7 is pressed, the CPU 10 causes the gun 102 to fire a bullet. Specifically, the CPU 10 reads and refers to the operation button data 115 included in the first operation data 111 from the main memory, thereby determining whether or not the predetermined button has been pressed. If the predetermined button has been pressed, the CPU 10 then generates a new bullet (bullet object) for the gun 102, and moves the bullet at a predetermined moving speed in a direction from the position of the gun 102 toward a position pointed at by the gun 102. On the other hand, if the predetermined button has not been pressed, the CPU 10 does not perform any process. Following step S28, the process of step S29 is performed.

Note that other processing in the game control process that is to be performed in step S29 is the same as that in step S19. After step S29, the CPU 10 ends the game control process.

In the game control process of the present variant, processes for controlling the action of a predetermined object (airplane 101) arranged in the game space based on the second operation data 116 are performed (steps S21 and S22), and furthermore, the first virtual camera is controlled to be disposed at a position determined by the position of the object (step S25). As a result, the second player can manipulate the object, and the display range of the game space represented by the first game image changes in accordance with movement of the object. Therefore, the game control process makes it possible to realize a game to be played by two players in concert with each other, in which the second player moves an object and the first player performs a predetermined game operation (here, a shooting operation) while viewing the game space from the viewpoint which moves together with the object. Moreover, in the present variant, since the range of the game space to be displayed on the lower LCD 62 can be changed by the first player him/herself changing the direction of the first virtual camera (step S26), the first player's operation can be fully reflected in game progression, so that not only the second player moving the object but also the first player can perform active game operations.

Also, in the above variant, the first player changes the attitude of the operating device 7, thereby changing the line-of-sight direction of the first virtual camera, so that the bullet shooting direction (the direction of the gun 102) changes. Here, in another embodiment, the bullet shooting direction may be controlled based on information other than the attitude of the operating device 7. For example, the CPU 10 may control the bullet shooting direction based on a position (referred to as a "pointing position") on the screen of the television 2 that is pointed at by the operating device 7. Specifically, the CPU 10 may display a sight 104 at the pointing position, and fire a bullet in a direction specified by the sight 104. Note that when calculating the bullet shooting direction based on the pointing position, it can be calculated by the same method as the method for calculating the bullet shooting direction based on the touch position see FIG. 18), except that the pointing position is used in place of the touch position.

Note that the pointing position is calculated as follows. Initially, the CPU 10 calculates a midpoint between two marker coordinate points based on marker coordinate data 114 included in first operation data 111. Then, the CPU 10 performs a correction to rotate the midpoint between the marker coordinate points about the center of a pickup image, such that a vector extending between the marker coordinate points becomes parallel to an axis representing the horizontal direction of the marker coordinate system. By this correction, it is possible to calculate the instruction position with precision even when the operating device 7 is tilted from its reference attitude about the Z-axis. Next, the CPU 10 transforms the coordinates that indicate the position of the midpoint after the correction into coordinates representing a position (a pointing position) on the screen of the television 2. Note that the pointing position of the operating device 7 moves in an opposite direction to the position of the midpoint in the pickup image, and therefore the transformation is performed for flipping both horizontal and vertical. The position on the screen that is obtained by the transformation is employed as the pointing position. In this manner, the method using the marker coordinate data 114 makes it possible to calculate the pointing position with precision.

Also, in the present variant, a game image for shooting is displayed on the television 2 side, and therefore a plurality of people can view the game image for shooting. Accordingly, in the present variant, by configuring the game system 1 so as to include more than one operating device 7, a plurality of players can use one operating device 7 each to perform their respective game operations, so that the game can be played by even three or more people. Note that in the case where more than one operating device 7 is used, the first virtual camera may be controlled based on first operation data transmitted from a specific operating device 7 or two or more operating devices 7. Furthermore, in the above cash, the bullet shooting direction (the position of the sight 104) may be controlled independently of the line-of-sight direction of the first virtual camera, as in the method for controlling the bullet shooting direction based on the pointing position. The reason for this is that the players operating the operating devices 7 can fire bullets toward any positions at their individual discretion.

(Variant Related to the Content of the Game)

Taking as an example of the multiplayer game, the above embodiment has been described with respect to the game process for playing the shooting game by manipulating the airplane 101, but the content of the game may be arbitrary. For example, the configuration of the above embodiment can also be applied to a game where the first player manipulates a mobile object such as a car, and the second player takes an image of the mobile object with a camera from above. In this case, the position and the attitude of the first virtual camera may be controlled based on the first operation data, e.g., based on the position of the mobile object. The position of the second virtual camera may be controlled based on the first operation data, e.g., based on the position of the mobile object. The attitude of the second virtual camera may be controlled based on the second operation data, for example, to be oriented in the line-of-sight direction of the camera. Thus, it is possible to realize a game to be played by two players in concert with each other, in which the first player moves a mobile object, and the second player takes an image inside a game space to be displayed from the viewpoint which moves together with the mobile object while viewing the game space.

(Variant Related to Game Operations)

In the above embodiment, the CPU 10 performs the game control process in accordance with movement of the hand-held device 9 (concretely, its attitude). Specifically, the hand-held device 9 includes sensors (the acceleration sensor 89 and the gyroscope 90) for outputting data whose value changes in accordance with its movement, and outputs second operation data including data outputted by the sensors. In addition, the CPU 10 controls the attitude of the second virtual camera to correspond to the attitude of the hand-held device 9 based on the outputted data included in the second operation data. Here, in another embodiment, to control the attitude of the second virtual camera, the hand-held device 9 may be manipulated in an arbitrary manner which is not limited to moving the hand-held device 9 itself. For example, the CPU 10 controls the attitude of the second virtual camera based on manipulation of the operation button group 64, the touch panel 63, or the analog stick 65 of the hand-held device 9, rather than based on movement of the hand-held device 9.

Also, in the case where the attitude of the second virtual camera is controlled in accordance with movement of the hand-held device 9, the CPU 10 may control the attitude of the second virtual camera in accordance with values other than the attitude of the hand-held device 9. For example, the attitude of the second virtual camera may be controlled in accordance with a positional change of the hand-held device 9. Concretely, the CPU 10 can calculate the positional change of the hand-held device 9 based on acceleration obtained by excluding gravitational acceleration from acceleration represented by the acceleration data 117. Accordingly, for example, in the process of step S16, the CPU 10 may change the attitude of the second virtual camera in accordance with the positional change of the hand-held device 9. Thus, the attitude of the second virtual camera can be changed by moving the hand-held device 9 up and down and right to left.

Note that to control the position of the second virtual camera, the operating device 7 may be manipulated in an arbitrary manner which is not limited to moving the operating device 7 itself, as in the case of the hand-held device 9. Moreover, in the case where the position of the second virtual camera is controlled in accordance with movement of the operating device 7, the CPU 10 may control the position of the second virtual camera in accordance with values other than the attitude of the operating device 7. For example, a positional change can be calculated for the operating device 7 as can be done for the hand-held device 9, and therefore, in the process of, for example, step S15, the CPU 10 may change the position of the second virtual camera in accordance with the positional change of the operating device 7.

(Variant on the Device for Performing the Game Process)

While in the above embodiment, the game apparatus 3 performs a series of game processes shown in FIG. 14, part of the game processes may be performed by another device. For example, in another embodiment, part of the game processes (e.g., the second game image generation process) may be performed by the hand-held device 9. Also, in another embodiment, game processes may be shared within a game system by a plurality of information processing devices capable of communicating with one another.

(Variant on the Configuration of the Hand-Held Device)

The hand-held device 9 in the above embodiment is an example, the shape of the operation buttons and the housing 50 of the hand-held device 9, the number and arrangement of components, etc., are merely illustrative, and other shape, number, and arrangement may be employed. For example, a terminal device to be described below may be used as the hand-held device. Hereinafter, referring to FIGS. 22 to 28, a variant on the hand-held device will be described.

Figure 22:
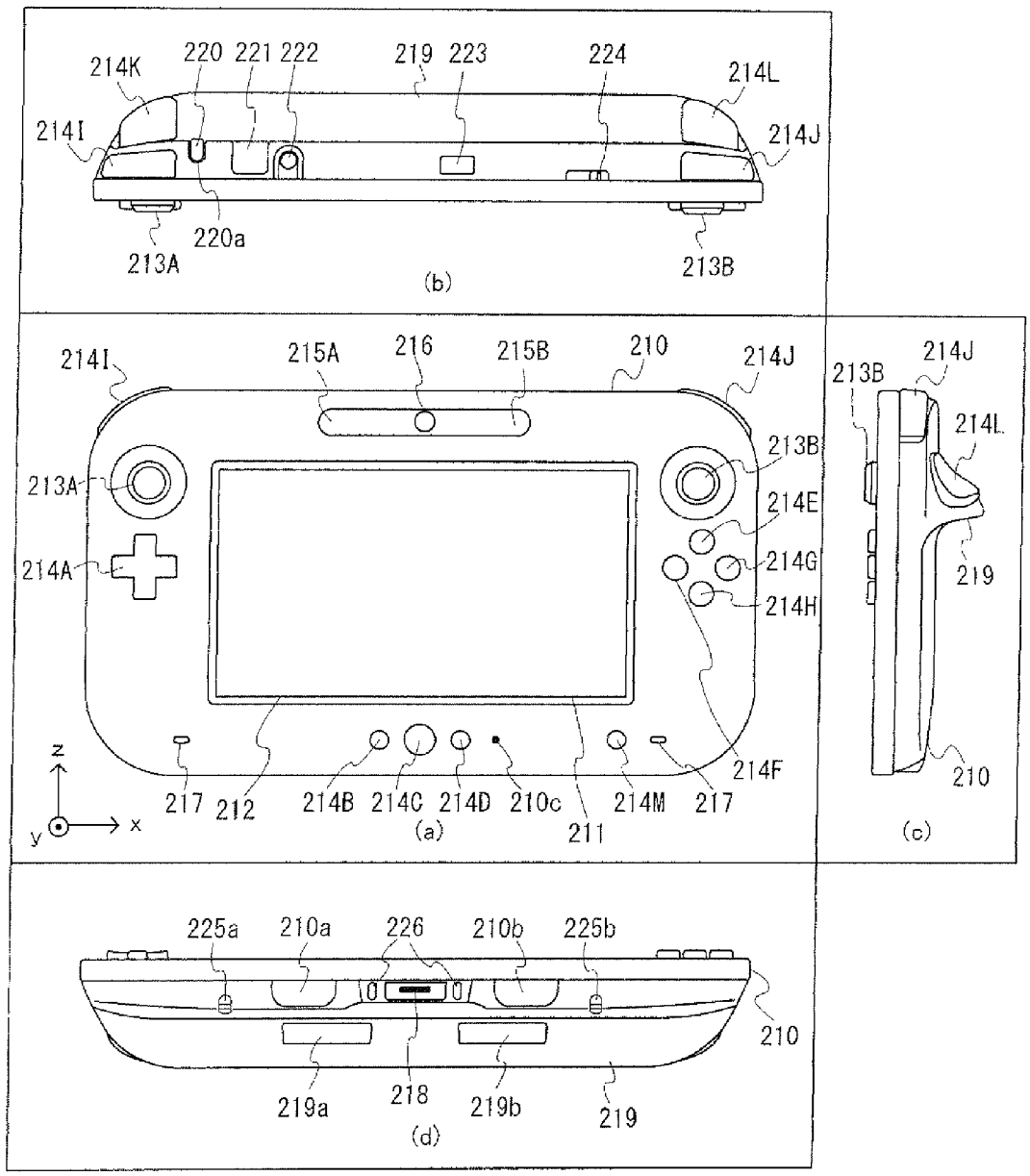
FIG. 22 provides views illustrating an external configuration of an example non-limiting terminal device in a variant of the embodiment.
Figure 23:
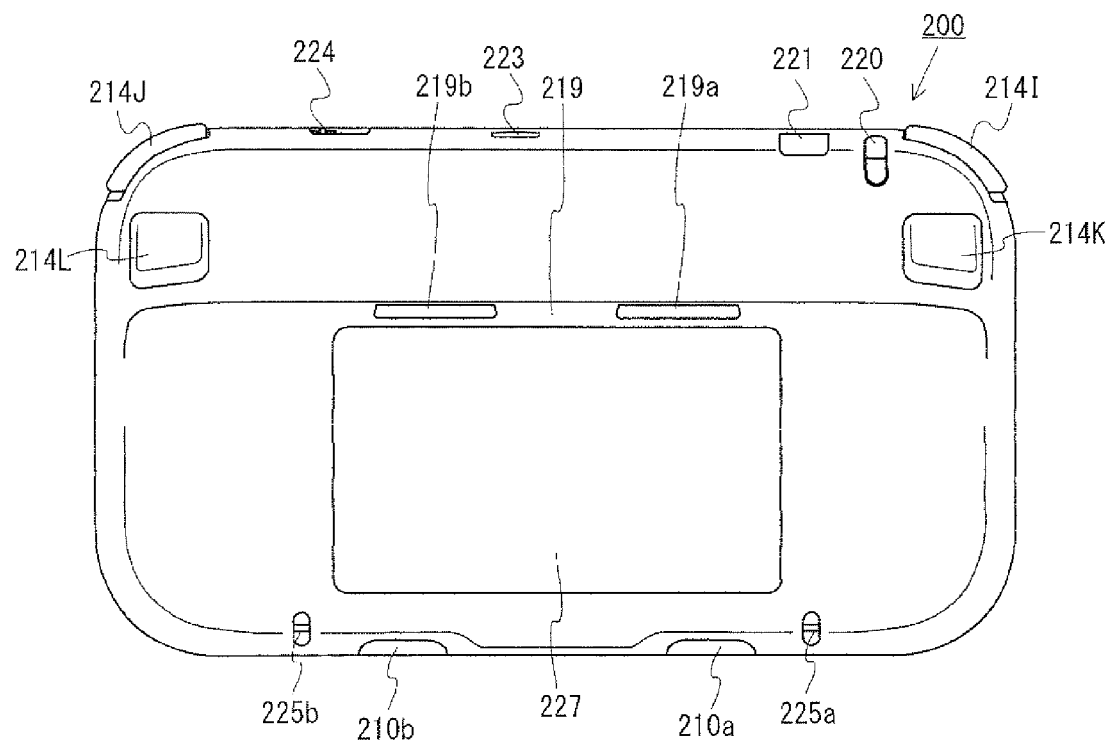
FIG. 23 is a view illustrating an external configuration of the example non-limiting terminal device in the variant of the embodiment.
Figure 24:
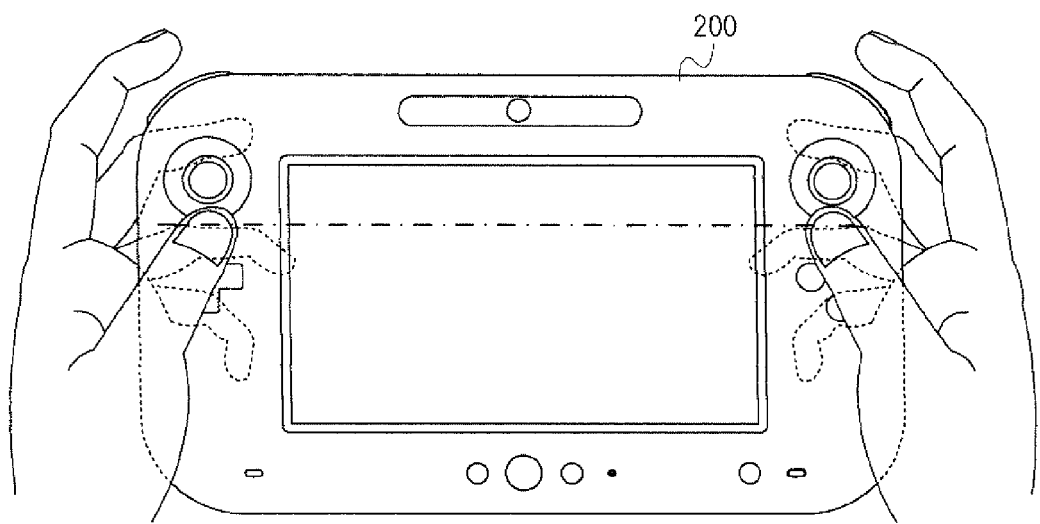
FIG. 24 is a diagram illustrating the example non-limiting terminal device being held horizontal by a user.
Figure 25:
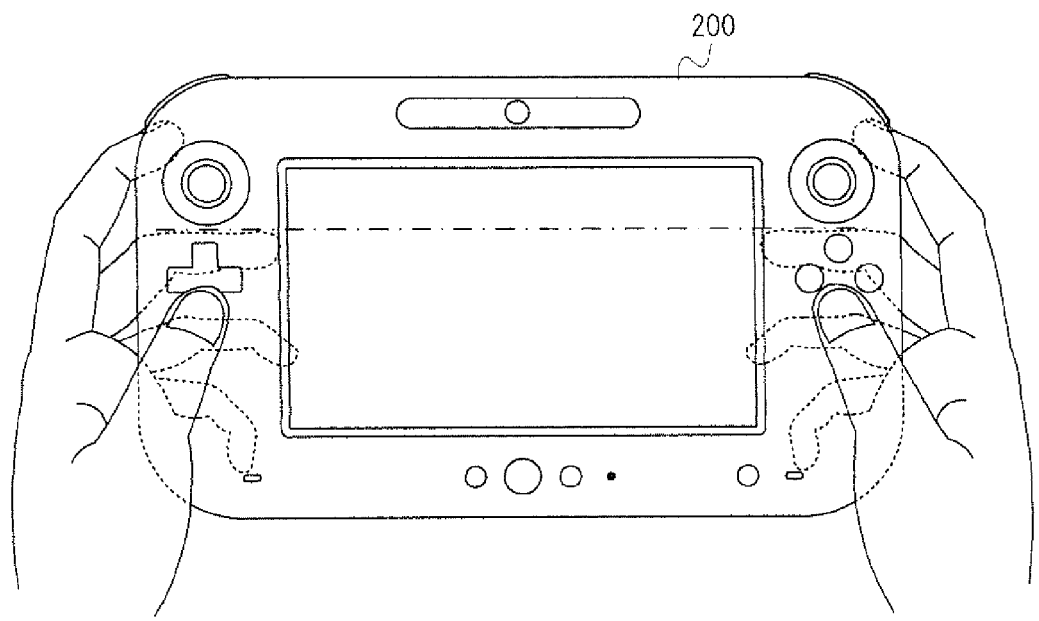
FIG. 25 is another diagram illustrating the example non-limiting terminal device being held horizontal by a user.
Figure 26:
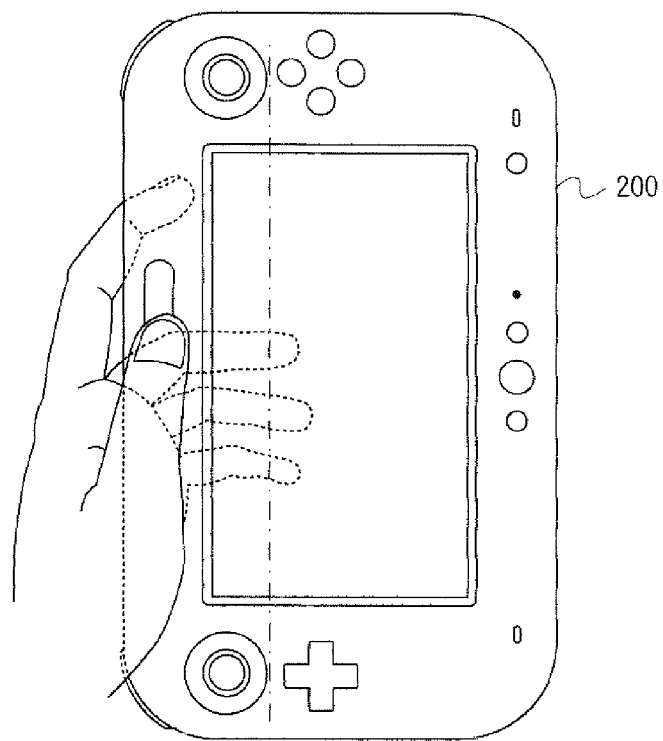
FIG. 26 is a diagram illustrating the example non-limiting terminal device being held vertical by a user.
Figure 27:
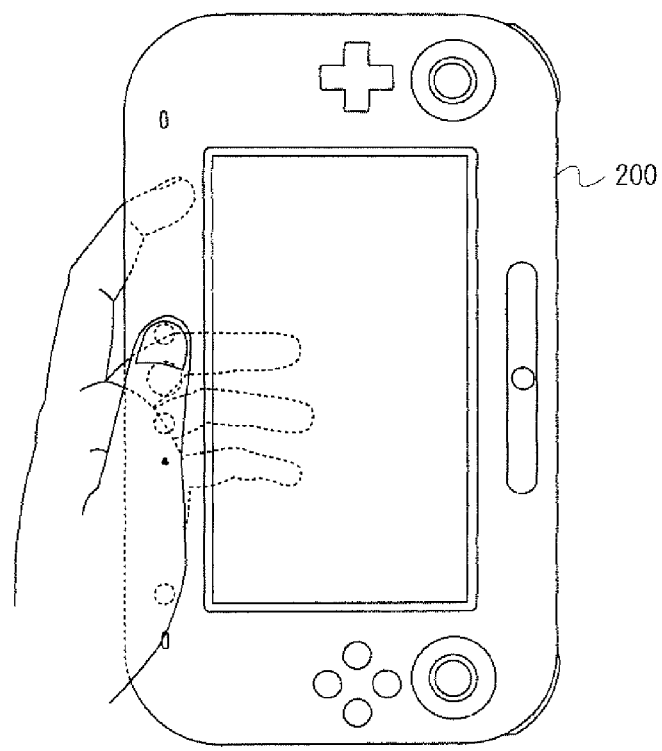
FIG. 27 is another diagram illustrating the example non-limiting terminal device being held vertical by a user.

First, referring to FIGS. 22 to 27, an external configuration of a terminal device according to a variant of the above embodiment will be described. FIG. 22 provides views illustrating an external configuration of a terminal device 200, in which part (a) is a front view, part (b) is a top view, part (c) is a right side view, and part (d) is a bottom view. FIG. 23 is a back view of the terminal device 200. FIGS. 24 and 25 are diagrams illustrating the terminal device 200 being held horizontal by the user. FIGS. 26 and 27 are diagrams illustrating the terminal device 200 being held vertical by the user.

As shown in FIG. 22, the terminal device 700 includes a housing 210 which is generally in the shape of a horizontally elongated rectangle. That is, it can be said that the terminal device 200 is a tablet-shaped information processing device. Note that the housing 210 may have a curved surface or may have protrusions or suchlike in its part, so long as it has a generally plate-like shape. The housing 210 is sized to be held by the user. Thus, the user can hold and move the terminal device 200, and can change the installation position of the terminal device 7. The vertical length (z-axis direction) of the terminal device 200 may be in the range of from 100 to 150 millimeters (mm), and 133.5 mm in the present embodiment. The horizontal length (x-axis direction) of the terminal device 200 may be in the range of from 200 to 250 mm, and 228.26 mm in the present embodiment. The thickness (the dimension in the y-axis direction) of the terminal device 200 may be in the range of from about 15 to about 30 mm in plate-like portions, from about 30 to about 50 mm including the thickest portion, and 23.6 mm (40.26 mm at the thickest portion) in the present embodiment. Also, the terminal device 200 weighs in the range of from about 400 to 600 grams (g), and 530 g in the present embodiment. As will be described in detail later, the terminal device 200 can be readily carried and operated by the user even though it is a relatively large-sized terminal device (operating device) as described above.

The terminal device 200 includes an LCD 211 on the (front-side) surface of the housing 210. Note that the screen size of the LCD 211 may be 5 inches or more, and 6.2 inches in present embodiment. The terminal device 200 of the present embodiment is designed to be readily carried and operated, even though the LCD is relatively large. Note that in another embodiment, the LCD 211 may be provided in a smaller size so that the terminal device 200 can be provided in a relatively small size. The LCD 211 is provided approximately at the center of the surface of the housing 210. Therefore, the user can hold and move the terminal device 200 while viewing the screen of the LCD 211 by holding the housing 210 by edges to the left and right of the LCD 211, as shown in FIGS. 24 and 25. While FIGS. 24 and 25 show examples where the user holds the terminal device 200 horizontal (horizontally long) by holding the housing 210 by edges to the left and right of the LCD 211, the user can hold the terminal device 200 vertical (vertically long) as shown in FIGS. 26 and 27.

As shown in FIG. 22(a), the terminal device 200 includes a touch panel 212 on the screen of the LCD 211 as an operating means. In the present embodiment, the touch panel 212 is a resistive touch panel. However, the touch panel is not limited to the resistive type, and may be of any type such as capacitive. The touch panel 212 may be single-touch or multi-touch. In the present embodiment, a touch panel having the same resolution (detection precision) as the LCD 211 is used as the touch panel 212. However, the touch panel 212 and the LCD 211 do not have to be equal in resolution. While a stylus 220 is usually used for providing input to the touch panel 212, input to the touch panel 212 can be provided not only by the stylus 220 but also by the user's finger. The housing 210 is provided with an accommodation hole 220a for accommodating the stylus 220 used for performing operations on the touch panel 212 (see FIG. 22(b)). Here, in order not to drop the stylus 220, the accommodation hole 220a is provided in the top surface of the housing 210, but it may be provided in a side or back surface. In this manner, the terminal device 200 includes the touch panel 212, and the user can operate the touch panel 212 while moving the terminal device 200. Specifically, the user can provide input directly to the screen of the LCD 211 (from the touch panel 52) while moving the screen.

As shown in FIG. 22, the terminal device 200 includes two analog sticks 213A and 213B and a plurality of buttons 214A to 214M, as operating means (operating sections). The analog sticks 213A and 213E are devices capable of directing courses. Each of the analog sticks 213A and 213E is configured such that its movable member (stick portion) to be operated with the user's finger is slidable in an arbitrary direction (at an arbitrary angle in any of the up, down, left, right, and oblique directions) with respect to the surface of the housing 210. That is, the analog sticks 213A and 213B are pointing devices which are also referred to as "slide pads". Note that the movable members of the analog sticks 213A and 213B may be of types that can tilt in an arbitrary direction with respect to the surface of the housing 210. In the present embodiment, the analog sticks are of a type with a movable member capable of sliding, and therefore the user can operate the analog sticks 213A and 213B without moving his/her thumbs substantially, and hence can securely hold the housing 210 during the operation. Note that in the case where the analog sticks 213A and 213B are of a type with a movable member capable of tilting, the user can readily perceive the degree of input (the degree of tilting), and therefore can readily perform detailed operations.

The left analog stick 213A is provided to the left of the screen of the LCD 211, and the right analog stick 213B is provided to the right of the screen of the LCD 211. Therefore, the user can provide a direction-specifying input by using the analog stick with either the left or the right hand. As shown in FIGS. 24 and 25, the analog sticks 213A and 213B are positioned so as to allow the user to operate them while holding the left and right sides of the terminal device 200 (holding the terminal device 200 by edges to the left and right of the LCD 211), and therefore the user can readily operate the analog sticks 213A and 213B even when holding and moving the terminal device 200.

The buttons 214A to 214L are pressable keys functioning as operating means (operating sections) for providing predetermined input. As will be discussed below, the buttons 214A to 214L are positioned so as to allow the user to operate them while holding the left and right sides of the terminal device 200 (see FIGS. 24 and 25), and therefore the user can readily operate the operating means even when holding and moving the terminal device 200.

As shown in FIG. 22(a), of all the operation buttons 214A to 214L, the cross button (direction input button) 214A and the buttons 214B to 214H and 214M are provided on the front surface of the housing 210. That is, these buttons 214A to 214H and 214M are positioned so as to allow the user to operate them with his/her thumbs (see FIGS. 24 and 25).

The cross button 214A is provided to the left of the LCD 211 and below the left analog stick 213A. That is, the cross button 214A is positioned so as to allow the user to operate it with his/her hand. The cross button 214A is a cross-shaped button which makes it possible to specify at least up, down, left and right directions.

Also, the buttons 214B to 214D are provided below the LCD 211. These three buttons 214B to 214D are provided at such positions as to allow the user to operate them with either hand. Furthermore, the terminal device 200 has a power button 214M for turning the terminal device 200 on/off. It is also possible to remotely turn the game apparatus 3 on/off by operating the power button 214M. As with the buttons 214B to 214D, the power button 214M is provided below the LCD 211. The power button 214M is provided to the right of the buttons 214B to 214D. Accordingly, the power button 214M is positioned so as to be (readily) operable with the right hand. Moreover, the four buttons 214E to 214H are provided to the right of the LCD 211 and below the right analog stick 213B. That is, the four buttons 214E to 214H are positioned so as to allow the user to operate them with the right hand. In addition, the four buttons 214E to 214H are positioned above, to the left of, to the right of, and below the central position among them. Therefore, the four buttons 214E to 214H of the terminal device 200 can be used to function as buttons for allowing the user to specify the up, down, left and right directions.

Note that in the present embodiment, the analog sticks 213A and 213B are positioned above the cross button 214A and the buttons 214E to 214H. Here, the analog sticks 213A and 213B protrude higher than the cross button 214A and the buttons 214E to 214H in the thickness direction (the y-axis direction). Therefore, if the analog stick 213A and the cross button 214A are switched in position, when the user operates the cross button 214A with the thumb, the thumb might hit the analog stick 213A, resulting in misoperation. Note that a similar problem might occur if the analog stick 213B and the buttons 214E and 214H are switched in position. On the other hand, in the present embodiment, the analog sticks 213A and 213B are positioned above the cross button 214A and the buttons 214E to 214H, and therefore when compared to the aforementioned case, it is less likely for the user's finger to hit the cross button 214A or any of the buttons 214E to 214H when the user operates the analog stick 213A or 213B. In this manner, the present embodiment makes it possible to reduce the possibility of misoperation, thereby improving operability of the terminal device 200. However, in another embodiment, the analog stick 213A and the cross button 214A may be switched in position, and the analog stick 213B and the buttons 214E to 214H may be switched in position.

Here, in the present embodiment, some operating sections (the analog sticks 213A and 213B, the cross button 214A, and the three buttons 214E to 214G) are provided either to the right or left of the display section (LCD 211) and above the center of the housing 210 in the vertical direction (the y-axis direction). When any of these operating sections is operated, the user holds the terminal device 200 mainly by its portions above the center in the vertical direction. Here, if the user holds the housing 210 by its lower portions, the terminal device 200 loses stability (particularly when the terminal device 200 is relatively large-sized as in the present embodiment), making it difficult for the user to hold the terminal device 200. On the other hand, in the present embodiment, when any of the operating sections is operated, the user holds the terminal device 200 mainly by its portions above the center in the vertical direction, and can also support the housing 210 with the palms from the sides. Accordingly, the user holds the housing 210 in a stabilized state, and can readily hold the terminal device 200, so that the operating sections can be readily operated. Note that in another embodiment, at least one operating section may be provided each to the right and left of the display section above the center of the housing 210. For example, only the analog sticks 213A and 213B may be provided above the center of the housing 210. Also, for example, when the cross button 214A is provided above the left analog stick 213A, and the four buttons 214E to 214H are provided above the right analog stick 213B, the cross button 214A and the four buttons 214E to 214H may be provided above the center of the housing 210.

Also, in the present embodiment, the housing 210 has a protrusion (projection 219) provided at its bottom side (opposite to the surface on which the LCD 211 is provided; see FIGS. 22(c) and 23). As shown in FIG. 22(c), the projection 219 is a ridge-like member provided to stick outward from the back surface of the housing 210 which has a generally plate-like shape. The protrusion has such a height (thickness) as to allow the user's fingers to be rested upon it when the user is holding the back surface of the housing 210. The protrusion may have a height of from 10 to 25 mm, and 16.66 mm in the present embodiment. Also, the protrusion may have the bottom surface slanted at 45° or more (alternatively, 60° or more) with respect to the back surface of the housing 210 such that the user's fingers can be readily placed on the protrusion. As shown in FIG. 22(c), the protrusion may be formed such that the bottom surface is slanted at a greater angle than the top surface. As shown in FIGS. 24 and 25, the user can hold the terminal device 200 with his/her fingers in contact with the projection 219 (the projection 219 being put on the fingers), and therefore the terminal device 200 can be held in a stabilized state without tiring the user, even if the terminal device 200 is relatively large-sized. That is, the projection 219 can be said to be a support for sustaining the housing 210 with fingers and can also said to be a finger rest.

Also, the projection 219 is provided above the center of the housing 210 with respect to the vertical direction. The projection 219 is positioned approximately opposite to the operating sections (the analog sticks 213A and 213B) provided on the front surface of the housing 210. Specifically, the protrusion is provided in an area including opposite positions to the operating sections provided to the right and left, respectively, of the display section. Accordingly, when manipulating the operating sections, the user can hold the terminal device 200 while supporting the projection 219 with his/her middle fingers or ring fingers (see FIGS. 24 and 25). Thus, the terminal device 200 can be readily held, and the operating sections can be manipulated more readily. Also, in the present embodiment, the protrusion is shaped like an overhang that extends side to side (at the projecting edge), and therefore the user can readily hold the terminal device 200 by placing his/her middle fingers or ring fingers along the bottom surface of the protrusion. Note that the projection 219 is not limited to the horizontally extending shape as shown in FIG. 23, so long as it is formed to extend toward the right and left sides (at the projecting edge). In another embodiment, the projection 219 may extend in a direction slightly slanted from the horizontal direction. For example, the projection 219 may be provided so as to be slanted upward (or downward) from both the right and left ends toward the center.

Note that in the present embodiment, the projection 219 having an overhang-like shape is employed as a protrusion to be formed on the back surface of the housing for the purpose of providing the projection 219 with a catch hole to be described later, but the protrusion may have any shape. For example, in another embodiment, two protrusions may be provided on the right and left sides of the back of the housing 210 (no protrusion is provided at the center in the horizontal direction; see FIG. 26). Also, in another embodiment, the protrusion may have a hooked shape (a shape with a concaved bottom surface) in cross section (perpendicular to the x-axis direction) such that the terminal device 200 can be securely supported by the user's fingers (the protrusion can have the fingers placed thereon in a more secure manner).

Note that the protrusions (projections 219) may be arbitrarily distanced from the top side and the bottom side of the housing 210. For example, the protrusions may be formed so as to project from the top side. Specifically, the top surfaces of the protrusions may be formed so as to be flush with the top surface of the housing 210. In this case, the housing 210 is configured in two terraced portions so as to be thinner in the lower portion and thicker in the upper portion. In this manner, the housing 210 may have downward-facing surfaces (the bottom surfaces of the protrusions) formed on the right side and the left side of the back surface. Thus, the user can easily hold the operating device by putting his/her fingers on the surfaces. Note that the "downward-facing surfaces" may be formed at any positions on the back surface of the housing 210, or they may be positioned above the center of the housing 210.

As shown in FIGS. 22(*a*), 22(*b*) and 22(*c*), the first L button 214I and the first R button 214J are provided at the left and right edges on the top surface of the housing 210. In the present embodiment, the first L button 214I and the first R button 214J are provided at the upper (left and right) corners of the housing 210. Specifically, the first L button 214I is provided at the left edge of the top surface of the plate-like housing 210 so as to be exposed from the upper left-side surface (i.e., exposed both from the top surface and the left-side surface). The first R button 214J is provided at the right edge of the top surface of the housing 210 so as to be exposed from the upper right-side surface (i.e., exposed both from the top surface and the right-side surface). Thus, the first L button 214I is provided at such a position as to be operable by the user's left index finger, and the first R button 214J is provided at such a position as to be operable by the user's right index finger (see FIG. 24). Note that in another embodiment, the operating sections provided on the left and right sides of the top surface of the housing 210 do not have to be provided at the left and right edges and may be provided in any portions other than the edges. Also, the operating sections may be provided on the left- and right-side surfaces of the housing 210.

As shown in FIGS. 22(*c*) and 23, the second L button 214K and the second R button 214L are positioned on the protrusion (projection 219). The second L button 214K is provided near the left edge of the projection 219. The second R button 214L is provided near the right edge of the projection 219. Specifically, the second L button 214K is provided at a comparatively high position on the right side of the back surface of the housing 210 (i.e., the left side as viewed from the front surface side), and the second R button 214L is provided at a comparatively high position on the left side of the back surface of the housing 210 (i.e., the right side as viewed from the front surface side). In other words, the second L button 214K is provided at a position approximately opposite to the left analog stick 213A provided on the front surface, and the second R button 214L is provided at a position approximately opposite to the right analog stick 213B provided on the front surface. Thus, the second L button 214K is provided at such a position as to be operable by the user's left middle finger or index finger, and the second R button 214L is provided at such a position as to be operable by the user's right middle finger or index finger (see FIGS. 24 and 25). The second L button 214K and the second R button 214L are provided on the top surface of the projection 219, as shown in FIG. 22(*c*). Therefore, the second L button 214K and the second R button 214L have button faces directed (obliquely) upward. When the user holds the terminal device 200, the middle fingers or the index fingers will probably be able to move in the up/down direction, and therefore the button surfaces directed upward will allow the user to readily press the second L button 214K and the second R button 214L.

As described above, in the present embodiment, operating sections (the analog sticks 213A and 213B) are provided to the left and right of the display section (the LCD 211) above the center of the housing 210, and furthermore, other operating sections (the second L button 214K and the second R button 214L) are provided on the back side of the housing 210 at opposite positions corresponding to the operating sections on the front side. As a result, the operating sections are positioned on the front and back sides of the housing 210 so as to oppose each other with respect to the housing 210, and therefore the user can manipulate the operating sections while holding the housing 210 both from the front and back sides. Also, when manipulating the operating sections, the user holds the housing 210 in places above the center in the vertical direction, and therefore the user can hold the upper portions of the terminal device 200 while supporting the terminal device 200 with the palms (see FIGS. 24 and 25). Thus, the user can manipulate at least four operating sections while stably holding the housing 210, which makes it possible to provide an operating device (terminal device 200) which can be readily held by the user and offer superior operability.

As described above, in the present embodiment, by holding the terminal device 200 with the fingers put on the bottom surface of the protrusion (projection 219), the user can hold the terminal device 200 with ease. Also, since the second L button 214K and the second R button 214L are provided on the top surface of the protrusion, the user can readily operate the buttons while in the aforementioned state. The user can readily hold the terminal device 200, for example, in the following fashion.

Specifically, the user can hold the terminal device 200 with the ring fingers put on the bottom surface (indicated by the dashed line in FIG. 24) of the projection 219 (so as to support the projection 219 with the ring fingers), as shown in FIG. 24. In this case, the user can manipulate four buttons (the first L button 214I, the first R button 214J, the second L button 214K, and the second R button 214L) with the index fingers and the middle fingers. For example, in the case where the game operation to be performed uses quite a few buttons and therefore is complicated, holding the device as shown in FIG. 24 enables easy manipulation of a number of buttons. Note that the analog sticks 213A and 213B are provided above the cross button 214A and the buttons 214E to 214H, and therefore where manipulation is relatively complicated, the user can conveniently manipulate the analog sticks 213A and 213B with the thumbs. Also, in FIG. 24, the user holds the terminal device 200 with the thumbs on the front surface of the housing 210, the index fingers on the top surface of the housing 210, the middle fingers on the top surface of the projection 219 on the back surface of the housing 210, the ring fingers on the bottom surface of the projection 219, and the little fingers on the back surface of the housing 210. In this manner, the user can securely hold the terminal device 200 so as to wrap the housing 210 from all sides.

Furthermore, the user can also hold the terminal device 200 with the middle fingers put on the bottom surface (indicated by the dashed line in FIG. 25) of the projection 219, as shown in FIG. 25. In this case, the user can readily manipulate two buttons (the second L button 214K and the second R button 214L) with the index fingers. For example, in the case where the game operation to be performed uses only a few buttons and therefore is relatively simple, the device may be held as shown in FIG. 25. In FIG. 25, the user can securely hold the terminal device 200 by holding the lower portion of the housing 210 with two pairs of fingers ring fingers and the little fingers).

Note that in the present embodiment, the projection 219 is provided so as to have its bottom surface positioned between the analog stick 213A and the cross button 214A and also between the analog stick 213B and the four buttons 214E to 214H (the bottom surface being positioned below the analog sticks 213A and 213E but above the cross button 214A and the four buttons 214E to 214H). Accordingly, in the case where the terminal device 200 is held with the ring fingers put on the projection 219 (FIG. 24), the analog sticks 213A and 213B can be readily manipulated with the thumbs, and in the case where the terminal device 200 is held with the middle fingers put on the projection 219 (FIG. 25), the cross button 214A and the four buttons 214E to 214H can be readily manipulated with the thumbs. Thus, in both of the above two cases, the user can perform operations of specifying directions while securely holding the terminal device 200.

Also, as described above, the user can hold the terminal device 200 lengthwise. Specifically, the user can hold the terminal device 200 longitudinally by holding the top side of the terminal device 200 with the left hand, as shown in FIG. 26. Moreover, the user can also hold the terminal device 200 longitudinally by holding the bottom side of the terminal device 200 with the left hand, as shown in FIG. 27. While the terminal device 200 is shown to be held by the left hand in FIGS. 26 and 27, it can be held by the right hand as well. In this manner, the user can hold the terminal device 200 with one hand, and therefore, for example, it is possible to perform an operation of providing input to the touch panel 212 with one hand while holding the terminal device 200 with the other hand.

Also, in the case where the terminal device 200 is held as shown in FIG. 26, the user can securely hold the terminal device 200 by putting fingers other than the thumb (in FIG. 26, the middle finger, the ring finger, and the little finger) on the bottom surface of the projection 219 (indicated by the dashed line in FIG. 26). Particularly in the present embodiment, since the projection 219 is formed so as to extend side to side (in FIG. 26, top to bottom), the user can put fingers other than the thumb on the projection 219 by holding the terminal device 200 with the hand in any position along the top side, which makes it possible to securely hold the terminal device 200. Accordingly, in the case where the terminal device 200 is used lengthwise, the projection 219 can be used as a handle. On the other hand, in the case where the terminal device 200 is held as shown in FIG. 27, the user can manipulate the buttons 214B to 214D with the left hand. Accordingly, for example, it is possible to provide input to the touch panel 212 with one hand while manipulating the buttons 214B to 214D with the hand holding the terminal device 200, which makes it possible to perform a larger number of operations.

Note that the terminal device 200 in the present embodiment has the protrusion (projection 219) provided at the back surface, and therefore when the terminal device 200 is placed with the screen of the LCD 211 (the front surface of the housing 210) facing up, the screen is set in slightly tilted state. As a result, the screen can be more readily viewed when the terminal device 200 is placed. In addition, it is also possible to readily perform an input operation on the touch panel 212 when the terminal device 200 is placed. Furthermore, in another embodiment, an additional protrusion about the same height as the projection 219 may be formed on the back surface of the housing 210. As a result, when the terminal device 200 is placed with the screen of the LCD 211 facing up, the protrusions contact the floor surface, so that the screen is kept horizontal. Furthermore, the additional protrusion may be of a detachable (or foldable) type. As a result, it becomes possible to place the terminal device with the screen being set either in slightly tilted state or in horizontal state. That is, when the terminal device 200 is placed and used, the projection 219 can be used as a leg.

The buttons 214A to 214L are each appropriately assigned a function in accordance with the game program. For example, the cross button 214A and the buttons 214E to 214H may be used for direction-specifying operations, selection operations, etc., whereas the buttons 214B to 214E may be used for setting operations, cancellation operations, etc. Also, the terminal device 200 may include a button for turning ON/OFF the screen display of the LCD 211, and a button for performing a connection setting (pairing) with the game device 3.

As shown in FIG. 22(a), the terminal device 200 has a marker section 215, including markers 215A and 215B, provided on the front surface of the housing 210. The marker section 215 is provided in the upper portion of the LCD 211. The markers 215A and 215B are each formed by one or more infrared LEDs, as are the markers 6R and 6L of the marker device 6. The infrared LEDs included in the markers 215A and 215B are disposed inside a window which transmits infrared light therethrough. The marker section 215 is used for the game device 3 to calculate the movement, etc., of the controller 5, as is the marker device 6 described above. The game device 3 can control the lighting of the infrared LEDs included in the marker section 215.

The terminal device 200 includes the camera 216 which is an image pickup means. The camera 216 includes an image pickup element (e.g., a CCD image sensor, a CMOS image sensor, or the like) having a predetermined resolution, and a lens. As shown in FIG. 22, the camera 216 is provided on the front surface of the housing 210 in the present embodiment. Therefore, the camera 216 can capture an image of the face of the user holding the terminal device 200, and can capture an image of the user playing a game while viewing the LCD 211, for example. In the present embodiment, the camera 216 is disposed between the two markers 215A and 215B.

Note that the terminal device 200 includes a microphone 239 which is a sound input means. A microphone hole 210c is provided in the front surface of the housing 210. The microphone 239 is provided inside the housing 210 behind the microphone hole 210c. The microphone 239 detects sounds around the terminal device 200 such as the voice of the user.

The terminal device 200 includes speakers 237 which are sound output means. As shown in FIG. 22(d), speaker holes 217 are provided in the lower portion of the front surface of the housing 210. Sound emitted by the speakers 237 is outputted from the speaker holes 217. In the present embodiment, the terminal device 200 includes two speakers, and the speaker hales 217 are provided at positions corresponding to the left and right speakers. Note that the terminal device 200 includes a knob 224 for controlling the volume of the speakers 237. Also, the terminal device 200 includes a sound output terminal 222 to be connected to a sound output member such as an earphone. Here, considering any additional device to be connected to the bottom surface of the housing, the sound output terminal 222 and the knob 224 are provided at the top surface of the housing 210, but they may be provided at the left- or right-side surface or the bottom surface.

Also, the housing 210 is provided with a window 223 for emitting an infrared signal derived from the infrared communication module 242 to the outside of the terminal device 200. Here, the window 223 is provided at the top surface of the housing 210, such that the infrared signal is emitted forward from the user holding both sides of the housing 210 just outside the LCD 211. However, in another embodiment, the window 223 may be provided in any other position such as the bottom surface.

Also, the terminal device 200 includes an expansion connector 218 for connecting another device to the terminal device 200. The expansion connector 218 is a communication terminal for transmitting/receiving data (information) to/from another device connected to the terminal device 200. In the present embodiment, the expansion connector 218 is provided at the bottom surface of the housing 210, as shown in FIG. 22(*d*). Any additional device may be connected to the expansion connector 218, including, for example, a game-specific controller (a gun-shaped controller or suchlike) or an input device such as a keyboard. The expansion connector 218 may be omitted if there is no need to connect any additional devices to terminal device 200. The expansion connector 218 may include a terminal for supplying power to an additional device and/or a charging terminal.

In addition to the expansion connector 218, the terminal device 200 also has a charging terminal 226 for obtaining power from an additional device. When the charging terminal 226 is connected to a predetermined charging stand, power is supplied from the charging stand to the terminal device 200. In the present embodiment, the charging terminal 226 is provided at the bottom surface of the housing 210. Accordingly, when the terminal device 200 and an additional device are connected, it is possible to supply power from one device to the other in addition to information exchange via the expansion connector 218. In this manner, by providing the charging terminal 226 around the expansion connector 218 (so as to sandwich the connector 218 from both the right and left sides), it becomes possible to, when the terminal device 200 and an additional device are connected, performs information exchange and power supply between them. Moreover, the terminal device 200 has a charging connector, and the housing 210 has a cover 221 to protect the charging connector. The charging connector is connectable to a charger 246 to be described later, and once the charging connector is connected to the charger, power is supplied from the charger 246 to the terminal device 200. In the present embodiment, the charging connector (cover 221) is provided at the top surface of the housing 210 considering that an additional device is connected to the bottom surface of the housing, but it may be provided at the right- or left-side surface or the bottom surface.

Also, the terminal device 200 has a battery lid 227 removable from the housing 210. A battery (battery 245 shown, in FIG. 28) is disposed under the battery lid 227. In the present embodiment, the battery lid 227 is provided below the protrusion (projection 219) on the back surface of the housing 210.

Also, the housing 210 of the terminal device 200 has holes 225*a* and 225*b* provided therein for tying straps. In the present embodiment, the holes 225*a* and 225*b* are provided in the bottom surface of the housing 210, as shown in FIG. 22(*d*). Furthermore, in the present embodiment, the two holes 225*a* and 225*b* are provided one at each of the right and left sides of the housing 210. Specifically, the holes 225*a* and 225*b* are positioned to the left and right, respectively of the center at the bottom surface of the housing 210. The user may tie a strap to either the hole 225*a* or 225*b*, and attach the strap to his/her own wrist. As a result, in case the user drops the terminal device 200 or in case the terminal device 200 slips from the hand, it is possible to prevent the terminal device 200 from falling on the ground or floor or from hitting anything. Note that in the present embodiment, since the holes are provided both on the right and left sides, the user can conveniently attach the strap to either hand.

Note that for the terminal device 200 shown in FIGS. 22 to 27, the shape of the operation buttons and the housing 210, the number and arrangement of components, etc., are merely illustrative, and other shape, number, and arrangement may be employed.

Figure 28:
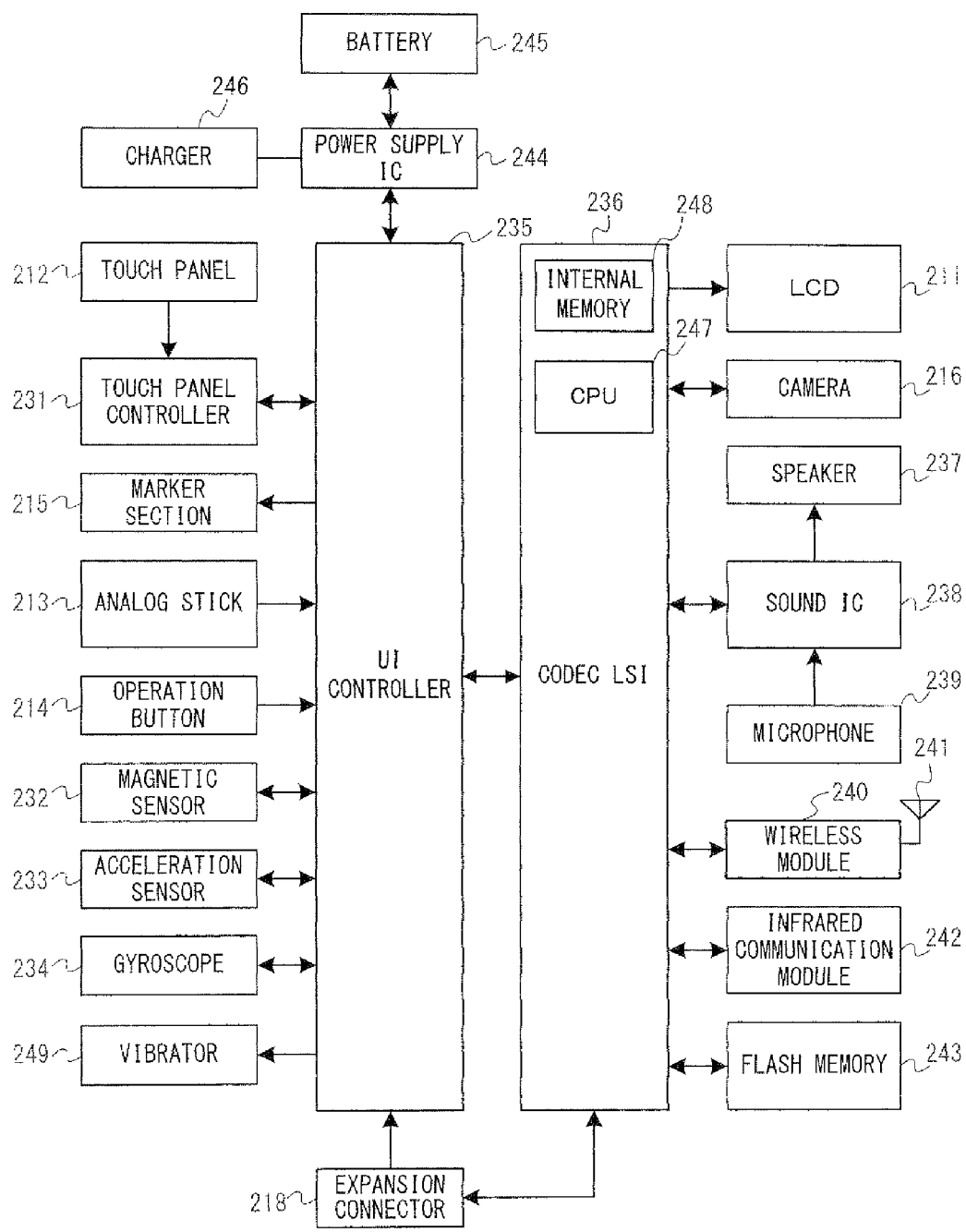
FIG. 28 is a block diagram illustrating an internal configuration of the example non-limiting terminal device shown in FIG. 22.

Next, an internal configuration of the terminal device 200 will be described with reference to FIG. 28. FIG. 28 is a block diagram illustrating an internal configuration of the terminal device 200. As shown in FIG. 28, in addition to the components shown in FIG. 22, the terminal device 200 includes a touch panel controller 231, a magnetic sensor 232, the acceleration sensor 233, the gyroscope 234, a user interface controller (UI controller) 235, a codec LSI 236, the speaker 237, a sound IC 238, the microphone 239, a wireless module 240, an antenna 241, an infrared communication module 242, flash memory 243, a power supply IC 244, a battery 245, and a vibrator 249. These electronic components are mounted on an electronic circuit board and accommodated in the housing 210.

The UI controller 235 is a circuit for controlling the input/output of data to/from various input/output sections. The UI controller 235 is connected to the touch panel controller 231, the analog sticks 213 (analog sticks 213A and 213B), the operation buttons 214 (operation buttons 214A to 214L), the marker section 215, the magnetic sensor 232, the acceleration sensor 233, the gyroscope 234, and the vibrator 249. The UI controller 235 is connected to the codec LSI 236 and the expansion connector 218. The power supply IC 244 is connected to the UI controller 235, and power is supplied to various sections via the UI controller 235. The built-in battery 245 is connected to the power supply IC 244 to supply power. A charger 246 or a cable with which power can be obtained from an external power source can be connected to the power supply IC 244 via a charging connector, and the terminal device 200 can be charged with power supplied from an external power source using the charger 246 or the cable. Note that the terminal device 200 can be charged by being placed in an unillustrated cradle having a charging function. Specifically, although not shown, the power supply IC 244 can be connected to a cradle which can obtain power from an external power supply, via the charging terminal 226, and the terminal device 200 can be charged with power supplied from the external power supply using the cradle.

The touch panel controller 231 is a circuit connected to the touch panel 212 for controlling the touch panel 212. The touch panel controller 231 generates touch position data of a predetermined format based on signals from the touch panel 212, and outputs it to the UI controller 235. The touch position data represents, for example, the coordinates of a position on the input surface of the touch panel 212 at which an input has been made. The touch panel controller 231 reads a signal from the touch panel 212 and generates touch position data once per a predetermined period of time. Various control instructions for the touch panel 212 are outputted from the UI controller 235 to the touch panel controller 231.

The analog stick 213 outputs, to the UI controller 235, stick data representing the direction and the amount of sliding (or tilting) of the stick portion operated with the user's finger. The operation button 214 outputs, to the UI controller 235, operation button data representing the input status of each of the operation buttons 214A to 214L (regarding whether it has been pressed).

The magnetic sensor 232 detects an azimuthal direction by sensing the magnitude and the direction of a magnetic field. Azimuthal direction data representing the detected azimuthal direction is outputted to the UI controller 235. Control instructions for the magnetic sensor 232 are outputted from the UI controller 235 to the magnetic sensor 232. While there are sensors using, for example, an MI (magnetic impedance) element, a fluxgate sensor, a Hall element, a GMR (giant magnetoresistance) element, a TMR (tunnel magnetoresistance) element, or an AMR (anisotropic magnetoresistance) element, the magnetic sensor 232 may be of any type so long as it is possible to detect the azimuthal direction. Strictly speaking, in a place where there is a magnetic field in addition to the geomagnetic field, the obtained azimuthal direction data does not represent the azimuthal direction. Nevertheless, if the terminal device 200 moves, the azimuthal direction data changes, and it therefore possible to calculate the change in the attitude of the terminal device 200.

The acceleration sensor 233 is provided inside the housing 210 for detecting the magnitude of linear acceleration along each direction of three axes (the x-, y- and z-axes shown in FIG. 22(a)). Specifically, the acceleration sensor 233 detects the magnitude of linear acceleration along each axis, where the longitudinal direction of the housing 210 is taken as the x-axis, a direction perpendicular to the front-side surface of the housing 210 as the y-axis, and the width direction of the housing 210 as the z-axis. Acceleration data representing the detected acceleration is outputted to the UI controller 235. Also, control instructions for the acceleration sensor 233 are outputted from the UI controller 235 to the acceleration sensor 233. While in the present embodiment, the acceleration sensor 233 is assumed to be a capacitive MEMS acceleration sensor, for example, in another embodiment, an acceleration sensor of another type may be employed. The acceleration sensor 233 may be an acceleration sensor for detection in one axial direction or two axial directions.

The gyroscope 234 is provided inside the housing 210 for detecting angular rates about the three axes, i.e., the x-, y-, and z-axes. Angular rate data representing the detected angular rates is outputted to the UI controller 235. Also, control instructions for the gyroscope 234 are outputted from the UI controller 235 to the gyroscope 234. Note that any number and combination of gyroscopes may be used for detecting angular rates about the three axes, and similar to the gyroscope unit 6, the gyroscope 234 may include a two-axis gyroscope and a one-axis gyroscope. Alternatively, the gyroscope 234 may be a gyroscope for detection in one axial direction or two axial directions.

The vibrator 249 is, for example, a vibration motor or a solenoid, and is connected to the UI controller 235. The terminal device 200 is vibrated by actuation of the vibrator 249 based on a command from the UI controller 235. Therefore, the vibration is conveyed to the player's hand holding the terminal device 200, and thus a so-called vibration-feedback game is realized.

The UI controller 235 outputs, to the codec LSI 236, operation data including touch position data, stick data, operation button data, azimuthal direction data, acceleration data, and angular rate data received from various components described above. If another device is connected to the terminal device 200 via the expansion connector 218, data representing an operation performed on that device may be further included in the operation data.

The codec LSI 236 is a circuit for performing a compression process on data to be transmitted to the game device 3, and a decompression process on data transmitted from the game device 3. The LCD 211, the camera 216, the sound IC 238, the wireless module 240, the flash memory 243, and the infrared communication module 242 are connected to the codec LSI 236. The codec LSI 236 includes a CPU 247 and internal memory 248. While the terminal device 200 does not perform any game process itself, the terminal device 200 needs to execute a minimal set of programs for its own management and communication purposes. Upon power-on, the CPU 247 executes a program loaded into the internal memory 248 from the flash memory 243, thereby starting up the terminal device 200. Also, some area of the internal memory 248 is used as VRAM for the LCD 211.

The camera 216 captures an image in response to an instruction from the game device 3, and outputs data for the captured image to the codec LSI 236. Also, control instructions for the camera 216, such as an image pickup instruction, are outputted from the codec LSI 236 to the camera 216. Note that the camera 216 can also record video. Specifically, the camera 216 can repeatedly capture images and repeatedly output image data to the codec LSI 236.

The sound IC 238 is a circuit connected to the speaker 237 and the microphone 239 for controlling input/output of sound data to/from the speaker 237 and the microphone 239. Specifically, when sound data is received from the codec LSI 236, the sound IC 238 outputs to the speaker 237 a sound signal obtained by performing D/A conversion on the sound data so that sound is outputted from the speaker 237. The microphone 239 detects sound propagated to the terminal device 200 (e.g., the user's voice), and outputs a sound signal representing the sound to the sound IC 238. The sound IC 238 performs A/D conversion on the sound signal from the microphone 239 to output sound data of a predetermined format to the codec LSI 236.

The codec LSI 236 transmits, as terminal operation data, image data from the camera 216, sound data from the microphone 239 and operation data from the UI controller 235 to the game device 3 via the wireless module 240. In the present embodiment, the codec LSI 236 subjects the image data and the sound data to a compression process as the image compression section 27 does. The terminal operation data, along with the compressed image data and sound data, is outputted to the wireless module 240 as transmission data. The antenna 241 is connected to the wireless module 240, and the wireless module 240 transmits the transmission data to the game device 3 via the antenna 241. The wireless module 240 has a similar function to that of the high-speed wireless communication module 28 of the game device 3. Specifically, the wireless module 240 has a function of connecting to a wireless LAN by a scheme in conformity with the IEEE 802.11n standard, for example. Data to be transmitted may or may not be encrypted.

As described above, the transmission data to be transmitted from the terminal device 200 to the game device 3 includes operation data (terminal operation data), image data, and sound data. In the case where another device is connected to the terminal device 200 via the expansion connector 218, data received from that device may be further included in the transmission data. In addition, the infrared communication module 242 performs infrared communication with another device in accordance with, for example, the IRDA standard. Data received via infrared communication may be included in the transmission data to be transmitted to the game device 3 by the codec LSI 236.

As described above, compressed image data and sound data are transmitted from the game device 3 to the terminal device 200. These data items are received by the codec LSI 236 via the antenna 241 and the wireless module 240. The codec LSI 236 decompresses the received image data and sound data. The decompressed image data is outputted to the LCD 211, and images are displayed on the LCD 211. The decompressed sound data is outputted to the sound IC 238, and the sound IC 238 outputs sound from the speaker 237.

Also, in the case where control data is included in the data received from the game device 3, the codec LSI 236 and the UI controller 235 give control instructions to various sections in accordance with the control data. As described above, the control data is data representing control instructions for the components of the terminal device 200 the present embodiment, the camera 216, the touch panel controller 231, the marker section 215, sensors 222 to 224, and the infrared communication module 242) the present embodiment, the control instructions represented by the control data are conceivably instructions to activate or deactivate (suspend) the components. Specifically, any components that are not used in a game may be deactivated in order to reduce power consumption, and in such a case, data from the deactivated components is not included in the transmission data to be transmitted from the terminal device 200 to the game device 3. Note that the marker section 215 is configured by infrared LEDs, and therefore is simply controlled for power supply to be ON/OFF.

While the terminal device 200 includes operating means such as the touch panel 212, the analog stick 213 and the operation button 214, as described above, in another embodiment, other operating means may be included in place of or in addition to these operating means.

Also, while the terminal device 200 includes the magnetic sensor 232, the acceleration sensor 233 and the gyroscope 234 as sensors for calculating the movement of the terminal device 200 (including its position and attitude or changes in its position and attitude), in another embodiment, only one or two of the sensors may be included. Furthermore, in another embodiment, any other sensor may be included in place of or in addition to these sensors.

Also, while the terminal device 200 includes the camera 216 and the microphone 239, in another embodiment, the terminal device 200 may or may not include the camera 216 and the microphone 239 or it may include only one of them.

Also, while the terminal device 200 includes the marker section 215 as a feature for calculating the positional relationship between the terminal device 200 and the controller 5 (e.g., the position and/or the attitude of the terminal device 200 as seen from the controller 5), in another embodiment, it may not include the marker section 215. Furthermore, in another embodiment, the terminal device 200 may include another means as the aforementioned feature for calculating the positional relationship. For example, in another embodiment, the controller 5 may include a marker section, and the terminal device 200 may include an image pickup element.

Moreover, in such a case, the marker device 6 may include an image pickup element in place of an infrared LED.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs.

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

As described above, the present embodiment can be applied to, for example, a game system, apparatus, or program for the purpose of, for example, allowing players' operations to be fully reflected in a multiplayer game.

While some embodiments have been described in detail, the foregoing description is in all aspects illustrative and not restrictive. It is understood that numerous other modifications and variations can be devised.

What is claimed is:

1. A game system comprising a game apparatus, an operating device, and a hand-held device, wherein
the game apparatus includes:
  a first reception section for receiving data transmitted from the operating device and the hand-held device;
  a game process section for performing a game control process for a multiplayer game in which a first player uses the operating device while a second player uses the hand-held device;
  a first image generation section for generating a first game image of a virtual game space based on a first virtual camera set in the game virtual space, the virtual game space representing a result of the game control process;
  a second image generation section for generating a second game image of the game space based on a second virtual camera set in the game space;
  a first image output section for outputting the first game image to a first display device provided independently of the hand-held device; and
  a second image output section for outputting the second game image to the hand-held device,
the operating device includes:
  a first operation data output section for outputting first operation data representing manipulation by the first player on the operating device; and
  a first operation data transmission section for transmitting the first operation data to the game apparatus, and
the hand-held device includes:
  a second operation data output section for outputting second operation data representing manipulation by the second player on the hand-held device;
  a second operation data transmission section for transmitting the second operation data to the game apparatus;
  a second reception section for receiving the second game image from the game apparatus; and
  a display process section for displaying the second game image on a second display device provided in the hand-held device, and
the game process section performs, as the game control process for the multiplayer game, control of a position of the second virtual camera based on the first operation data in concert with control of an attitude of the second virtual camera based on the second operation data.

2. The game system according to claim 1, wherein the game process section further performs, as the game control process for the multiplayer game, control of the first virtual camera based on the first operation data.

3. The game system according to claim 2, wherein the game process section at least controls a position of the first virtual camera based on the first operation data such that the first virtual camera moves simultaneously with movement of the second virtual camera.

4. The game system according to claim 2, wherein
the first operation data output section includes a sensor for outputting data whose value changes in accordance with movement of the operating device,
the first operation data includes data outputted by the sensor included in the first operation data output section, and
the game process section controls the position of the second virtual camera based on the movement of the operating device.

5. The game system according to claim 1, wherein
the second operation data output section includes a sensor for outputting data whose value changes in accordance with movement of the hand-held device,
the second operation data includes data outputted by the sensor included in the second operation data output section, and
the game process section controls the attitude of the second virtual camera in accordance with the movement of the hand-held device.

6. The game system according to claim 5, wherein
the second operation data output section includes an acceleration sensor and/or a gyroscope, and
the second operation data includes acceleration data sensed by the acceleration sensor included in the second operation data output section and/or angular rate data sensed by the gyroscope included in the second operation data output section.

7. The game system according to claim 5, wherein
the first operation data output section includes a sensor for outputting data whose value changes in accordance with movement of the operating device,
the first operation data includes data outputted by the sensor included in the first operation data output section, and
the game process section controls the position of the second virtual camera based on the movement of the operating device.

8. The game system according to claim 7, wherein
the first operation data output section includes an acceleration sensor and/or a gyroscope, and
the first operation data includes acceleration data sensed by the acceleration sensor included in the first operation data output section and/or angular rate data sensed by the gyroscope included in the first operation data output section.

9. The game system according to claim 1, wherein the game process section further performs, as the game control process for the multiplayer game, control of the action of an object arranged in the game space based on the first operation data, and also controls the second virtual camera to be positioned in accordance with a position of the object.

10. The game system according to claim 9, wherein the game process section controls the first virtual camera based on the first operation data such that a first game image including the object is generated, and also controls the position of the second virtual camera based on the first operation data such that a second game image as viewed from the position of the object is generated.

11. The game system according to claim 1, wherein the game process section further performs, as the game control process for the multiplayer game, shooting toward a position within the game space that corresponds to a position on a screen of the second display device.

12. The game system according to claim 1, wherein
the second operation data output section includes a touch panel provided on a screen of the second display device,
the second operation data includes touch data representing a touch position on the touch panel, and
the game process section further performs, as the game control process for the multi-player game, a game process based on a position within the game space that corresponds to the touch position.

13. The game system according to claim 1, wherein the game process section sets a reference attitude and calculates a degree and a direction of tilt of the second virtual camera from the reference attitude based on the second operation data, thereby calculating aspects of the attitude of the second virtual camera.

14. The game system according to claim 1, wherein the game process section sets an attitude determined based on the first operation data as a reference attitude, and calculates a degree and a direction of tilt of the second virtual camera from the reference attitude based on the second operation data, thereby calculating aspects of the attitude of the second virtual camera.

15. The game system according to claim 1, wherein the first image generation section generates as the first game image a game image representing the game space as viewed from the first virtual camera and having the second game image superimposed on a part thereof.

16. A game system comprising a game apparatus, an operating device, and a hand-held device, wherein
the system includes:
a first operation data output section for outputting first operation data representing manipulation by a first player on the operating device;
a second operation data output section for outputting second operation data representing manipulation by a second player on the hand-held device;
a game process section for performing a game control process for a multiplayer game;
a first image generation section for generating a first game image of a virtual game space based on a first virtual camera set in the virtual game space, the virtual game space representing a result of the game control process;
a second image generation section for generating a second game image of the game space based on a second virtual camera set in the game space;
a first image output section for outputting the first game image to a first display device provided independently of the hand-held device; and
a display process section for displaying the second game image on a second display device provided in the hand-held device, and
the game process section performs, as the game control process for the multiplayer game, control of a position of the second virtual camera based on the first operation data in concert with control of an attitude of the second virtual camera based on the second operation data.

17. A game apparatus capable of communicating with an operating device and a hand-held device, the apparatus comprising:
a first reception section for receiving first operation data transmitted from the operating device and second operation data transmitted from the hand-held device;
a game process section for performing a game control process for a multiplayer game in which a first player uses the operating device while a second player uses the hand-held device;
a first image generation section for generating a first game image of a virtual game space based on a first virtual camera set in the virtual game space, the virtual game space representing a result of the game control process;
a second image generation section for generating a second game image of the game space based on a second virtual camera set in the game space;
a first image output section for outputting the first game image to a first display device provided independently of the hand-held device; and
a second image output section for outputting the second game image to the hand-held device so as to be displayed on a second display device provided in the hand-held device, wherein
the game process section performs, as the game control process for the multiplayer game, control of a position of the second virtual camera based on the first operation data in concert with control of an attitude of the second virtual camera based on the second operation data.

18. A non-transitory computer-readable storage medium having stored therein a game program executable in a computer of a game apparatus capable of communicating with an operating device and a hand-held device, the program causing the computer to perform operations comprising:
receiving first operation data transmitted from the operating device and second operation data transmitted from the hand-held device;
performing a game control process for a multiplayer game in which a first player uses the operating device while a second player uses the hand-held device;
generating a first game image of a virtual game space based on a first virtual camera set in the virtual game space, the virtual game space representing a result of the game control process;
generating a second game image of the game space based on a second virtual camera set in the game space;
outputting the first game image to a first display device provided independently of the hand-held device; and
outputting the second game image to the hand-held device so as to be displayed on a second display device provided in the hand-held device, wherein
the game control process for the multiplayer game controls a position of the second virtual camera based on the first operation data in concert with an attitude of the second virtual camera based on the second operation data.

19. A game process method to be executed in a game system including a game apparatus, an operating device, and a hand-held device, wherein
the game apparatus performs:
receiving first operation data transmitted from the operating device and second operation data transmitted from the hand-held device;
performing a game control process for a multiplayer game in which a first player uses the operating device while a second player uses the hand-held device;

generating a first game image of a virtual game space based on a first virtual camera set in the virtual game space, the virtual game space representing a result of the game control process;

generating a second game image of the game space based on a second virtual camera set in the game space;

outputting the first game image to a first display device provided independently of the hand-held device; and outputting the second game image to the hand-held device, the operating device performs:
 outputting the first operation data; and
 transmitting the first operation data to the game apparatus, the hand-held device performs:
 outputting the second operation data;
 transmitting the second operation data to the game apparatus;
 receiving the second game image from the game apparatus; and
 displaying the second game image on a second display device provided in the hand-held device, and the game control process for the multiplayer game controls a position of the second virtual camera based on the first operation data in concert with an attitude of the second virtual camera based on the second operation data.

* * * * *